US007827817B2

(12) United States Patent
Inoue et al.

(10) Patent No.: US 7,827,817 B2
(45) Date of Patent: Nov. 9, 2010

(54) ABSORPTION HEAT PUMP

(75) Inventors: Naoyuki Inoue, Tokyo (JP); Kiichi Irie, Tokyo (JP); Yukihiro Fukusumi, Tokyo (JP)

(73) Assignee: Ebara Corporation, Tokyo (JP)

( * ) Notice: Subject to any disclaimer, the term of this patent is extended or adjusted under 35 U.S.C. 154(b) by 205 days.

(21) Appl. No.: 12/191,680

(22) Filed: Aug. 14, 2008

(65) Prior Publication Data
US 2008/0302122 A1 Dec. 11, 2008

Related U.S. Application Data

(62) Division of application No. 11/247,599, filed on Oct. 12, 2005, now Pat. No. 7,464,562.

(30) Foreign Application Priority Data

| Oct. 13, 2004 | (JP) | ............................. 2004-299168 |
| Oct. 13, 2004 | (JP) | ............................. 2004-299169 |
| Dec. 3, 2004 | (JP) | ............................. 2004-351751 |
| Dec. 6, 2004 | (JP) | ............................. 2004-352744 |

(51) Int. Cl.
*F25B 13/00* (2006.01)
(52) U.S. Cl. ..................... 62/324.2; 62/485
(58) Field of Classification Search .............. 62/324.2, 62/494, 497, 485, 476, 304, 238.3, 271, 171, 62/141, 94, 93; 261/140.2, 148
See application file for complete search history.

(56) References Cited

U.S. PATENT DOCUMENTS

| 3,292,385 A | 12/1966 | Murray |
| 3,367,134 A | 2/1968 | Bourne |
| 3,605,432 A | 9/1971 | Wada |
| 3,648,481 A | 3/1972 | Ando et al. |
| 3,750,416 A | 8/1973 | Kuhlenschmidt |

(Continued)

FOREIGN PATENT DOCUMENTS

CN          11 56807 A      8/1997

(Continued)

OTHER PUBLICATIONS

Office Action dated May 9, 2008 issued in corresponding Chinese Application No. 2005-1011 35952.

*Primary Examiner*—Mohammad M Ali
(74) *Attorney, Agent, or Firm*—Westerman, Hattori, Daniels & Adrian, LLP

(57) ABSTRACT

An absorption heat pump, including: an evaporator which takes in a first heat source and evaporates refrigerant liquid into refrigerant vapor; an absorber which has a heat receiving medium passage and which takes in heat receiving medium liquid through a heat receiving medium inlet of the heat receiving medium passage, heats the heat receiving medium liquid with the heat of absorption generated when the refrigerant vapor generated in the evaporator is absorbed into solution, and discharges the heat receiving medium in the form of vapor or mixture of vapor and liquid through a heat receiving medium outlet of the heat receiving medium passage; a generator which takes in a second heat source and evaporates the refrigerant from the solution having absorbed the refrigerant vapor; and a condenser which takes in a cooling source and the refrigerant vapor generated in the generator to condense the refrigerant vapor.

5 Claims, 32 Drawing Sheets

U.S. PATENT DOCUMENTS

| | | | |
|---|---|---|---|
| 3,949,566 A | 4/1976 | Hopkins | |
| 4,007,606 A | 2/1977 | Yoshio | |
| 4,078,399 A | 3/1978 | Sugimoto et al. | |
| 4,100,755 A * | 7/1978 | Leonard | 62/104 |
| 4,246,762 A | 1/1981 | Bourne | |
| 4,343,159 A | 8/1982 | Vardi et al. | |
| 4,467,623 A | 8/1984 | Reimann | |
| 4,474,025 A | 10/1984 | Alefeld | |
| 4,532,778 A | 8/1985 | Clark et al. | |
| 4,542,628 A * | 9/1985 | Sarkisian et al. | 62/335 |
| 4,593,531 A | 6/1986 | Fujimoto | |
| 4,732,008 A * | 3/1988 | DeVault | 62/79 |
| 5,237,839 A | 8/1993 | Dehne | |
| 5,271,246 A | 12/1993 | Yamauchi | |
| 5,426,955 A | 6/1995 | Modahl | |
| 5,572,884 A * | 11/1996 | Christensen et al. | 62/476 |
| 5,673,569 A | 10/1997 | Inoue | |
| 5,761,925 A | 6/1998 | Maeda | |
| 5,846,450 A | 12/1998 | Atkinson | |
| 5,946,937 A * | 9/1999 | Kujak | 62/476 |
| 6,122,930 A * | 9/2000 | Nishiguchi et al. | 62/476 |
| 6,230,517 B1 | 5/2001 | Ishiguro et al. | |
| 6,233,968 B1 * | 5/2001 | Nishiguchi et al. | 62/476 |
| 6,318,117 B1 | 11/2001 | Jandal et al. | |
| 6,539,738 B2 | 4/2003 | Gonzalez-Cruz et al. | |
| 6,550,272 B2 | 4/2003 | Nakajima et al. | |

FOREIGN PATENT DOCUMENTS

| | | |
|---|---|---|
| JP | 52-76758 | 6/1977 |
| JP | 52-78150 | 7/1977 |
| JP | 58-18574 | 4/1983 |
| JP | 58-18575 | 4/1983 |
| JP | 4-313653 A | 11/1992 |
| JP | 06-235531 A | 8/1994 |
| JP | 2000-283588 A | 10/2000 |

* cited by examiner

*FIG. 27A* *FIG. 27B*
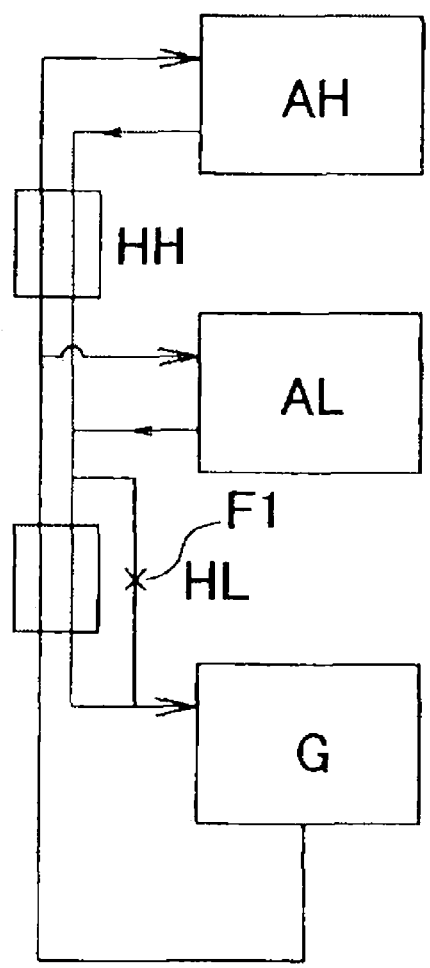
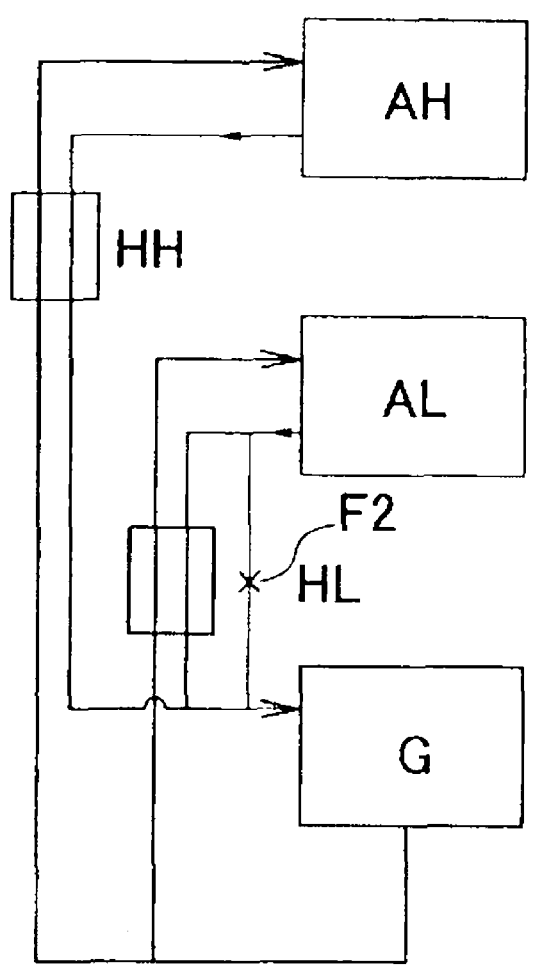

ABSORPTION HEAT PUMP

This application is a divisional of U.S. patent application Ser. No. 11/247,599, filed on Oct. 12, 2005, which claims the priority of Japanese Application No. 2004-299168; 2004-299169; 2004-351751 and 2004-352744 filed on Oct. 13, 2004; Oct. 13, 2004; Dec. 3, 2004 and Dec. 6, 2004, respectively, all of which are incorporated herein by reference.

BACKGROUND OF THE INVENTION

1. Technical Field

The present invention relates to an absorption heat pump for converting heat of a heat source such as waste hot water, exhaust gas or waste steam (waste heat energy) into heat of a high-temperature medium (such as high-temperature water or high-temperature steam). In particular, the present invention relates to an absorption heat pump for obtaining a high-temperature heat receiving medium vapor using a heating source as above. The present invention also relates to an absorption heat pump with improved thermal efficiency, and, in particular, to a two-stage absorption heat pump with improved start-up characteristics.

2. Related Art

There are the following types of absorption heat pumps which use waste hot water as a heat source to generate hot water with a temperature higher than that of the waste heat source. FIG. 31 is a view illustrating an example of the constitution of a single-stage absorption heat pump. As shown in the drawing, the single-stage absorption heat pump has an absorber A, an evaporator E, a generator G, a condenser C and a solution heat exchanger X as primary components. A cooling water pipe 101, a hot water pipe 102, a hot water pipe 103 and a high-temperature hot water pipe 104 are disposed in the condenser C, the evaporator E, the generator G and the absorber A, respectively.

Dilute solution (working medium dilute solution) is heated by heat source hot water flowing through the hot water pipe 103 in the generator G and concentrated into concentrated solution (working medium concentrated solution). The concentrated solution is delivered to the solution heat exchanger X through a concentrated solution pipe 106 by a solution pump 105, heated therein, and fed to the absorber A. Vapor (working medium vapor) generated in the generator G is fed to the condenser C through a vapor pipe 110, cooled by cooling water flowing through the cooling water pipe 101 and condensed into refrigerant liquid (working medium refrigerant liquid) in the condenser C. The refrigerant liquid is fed to the evaporator E through a refrigerant pipe 108 by a refrigerant pump 107. The refrigerant liquid is heated by heat source hot water flowing through the hot water pipe 102 and evaporated into refrigerant vapor (working medium refrigerant vapor) in the evaporator E. The refrigerant vapor is fed to the absorber A through a vapor pipe 109 and absorbed into the concentrated solution supplied from the generator G in the absorber A.

In the absorber A, the concentrated solution is heated by the heat of absorption generated when the refrigerant vapor is absorbed into the concentrated solution, rises in temperature to the degree corresponding to the boiling point elevation and heats the high-temperature hot water pipe 104. Therefore, water flowing through the high-temperature hot water pipe 104 is heated, and hot water with a temperature higher than that of the heat source hot water can be obtained. Dilute solution into which the concentrated solution turns upon the absorption of the refrigerant vapor in the absorber A is supplied to the solution heat exchanger X through a dilute solution pipe 112 to heat the concentrated solution in the heating side of the solution heat exchanger X and returns to the generator G through a pressure reducing valve 113. The refrigerant vapor generated in the generator G is directed to the condenser C, and cooled and condensed by cooling water flowing through the cooling water pipe 101 as described before. Then, the same cycle is repeated.

FIG. 32 is a view illustrating an example of the constitution of a two-stage absorption heat pump. As shown in FIG. 32, the two-stage absorption heat pump has a high-temperature absorber A2, a low-temperature absorber A1, a high-temperature evaporator E2, a low-temperature evaporator E1, a generator G, a condenser C, a high-temperature solution heat exchanger X2, and a low-temperature solution heat exchanger X1 as primary components.

As equipment on the solution side, there are a solution pump 205 for feeding the concentrated solution in the generator G to the high-temperature absorber A2, a concentrated solution pipe 206, a dilute solution pipe 215, a medium-concentration dilute solution pipe 214, a first pressure reducing valve 216, a second pressure reducing valve 226, a first hot water pipe 203 disposed in the generator G, a control valve 228 disposed in the first hot water pipe 203 at a position near the inlet thereof, a second hot water pipe 204 disposed in the high-temperature absorber A2, a temperature sensor 229 disposed in the second hot water pipe 204 at a position near the outlet thereof for detecting the outlet temperature of the second hot water pipe 204, a liquid level sensor 227 for detecting the liquid level in the low-temperature absorber A1, a first spray 224 opening in the low-temperature absorber A1, and a second spray 223 opening in the high-temperature absorber A2.

As equipment on the refrigerant side, there are a refrigerant pump 208 for feeding a refrigerant from the condenser C to the low-temperature evaporator E1 and the high-temperature evaporator E2, refrigerant pipes 209, 210 and 211, a spray 218 opening in the low-temperature evaporator E1, a spray 219 opening in the high-temperature evaporator E2, a liquid level sensor 220 for detecting the liquid level in the low-temperature evaporator E1, a liquid level sensor 230 for detecting the liquid level in the high-temperature evaporator E2, a control valve 221 for controlling the flow rate of the refrigerant to be supplied to the spray 218, a control valve 222 for controlling the flow rate of the refrigerant to be supplied to the spray 219, a cooling water pipe 201 disposed in the condenser C, a third hot water pipe 202 disposed in the low-temperature evaporator E1, and a control valve 225 disposed at the inlet of the third hot water pipe 202.

As equipment for connecting the solution side and the refrigerant side, there are a vapor pipe 207 for directing refrigerant vapor generated in the generator G to the condenser C, a vapor pipe 212 for directing refrigerant vapor generated in the low-temperature evaporator E1 to the low-temperature absorber A1, a vapor pipe 213 for directing refrigerant vapor generated in the high-temperature evaporator E2 to the high-temperature absorber A2, and a heat transporting pipe 217 connecting the low-temperature absorber A1 and the high-temperature evaporator E2 and having a loop passage for supplying heat obtained in the low-temperature absorber A1 to the high-temperature evaporator E2 with water circulating in it. The control valves 228 and 225 are controlled based on a detection signal from the temperature sensor 229 disposed in the second hot water pipe 204 at an outlet side position thereof.

Hot water such as waste hot water is supplied as heat source hot water to the first hot water pipe 203 and the third hot water pipe 202, and the temperature of a heat transfer medium is increased in two stages using thermal energy derived from the difference in temperature between the hot water and cooling water supplied to the cooling water pipe 201 in the condenser C and utilizing heat of absorption and boiling point elevation of solution to increase the temperature in the high-temperature absorber A2 to a considerably high level. Then, hot water separately supplied to the second hot water pipe 204 is heated and high-temperature hot water with a great deal of potential, which cannot be obtained in a conventional cycle, can be obtained.

In the generator G, the dilute solution (working medium dilute solution) is heated by the heat source hot water flowing through the first hot water pipe 203 and concentrated into concentrated solution (working medium concentrated solution). The concentrated solution is delivered by the solution pump 205 through the concentrate solution pipe 206, heated in the heated side of the low-temperature solution heat exchanger X1 and the heated side of the high-temperature solution heat exchanger X2 and fed to the high-temperature absorber A2. Refrigerant vapor (working medium vapor) generated in the generator G is fed to the condenser C through a vapor pipe 207, cooled by cooling water flowing through the cooling water pipe 201 and condensed into refrigerant liquid (working medium cooling liquid) in the condenser C. The refrigerant liquid is delivered to the low-temperature evaporator E1 and the high-temperature evaporator E2 through the refrigerant pipes 209, 210 and 211 by the refrigerant pump 208. The refrigerant liquid in the low-temperature evaporator E1 is heated by heat source hot water flowing through the third hot water pipe 202 and evaporated into refrigerant vapor (working medium vapor). The refrigerant vapor is fed to the low-temperature absorber A1 through the vapor pipe 212. The refrigerant liquid in the high-temperature evaporator E2 is heated by the heat transported from the low-temperature absorber A1 through the heat transporting pipe 217 and evaporated into refrigerant vapor (working medium vapor). The refrigerant vapor is fed to the high-temperature absorber A2 through the vapor pipe 213.

In the high-temperature absorber A2, the refrigerant vapor from the high-temperature evaporator E2 is absorbed into the concentrated solution from the generator G. The concentrated solution is heated by the heat of absorption generated when the refrigerant vapor is absorbed into the concentrated solution, rises in temperature to the degree corresponding to the boiling point elevation and heats the second hot water pipe 204. Therefore, water flowing through the second hot water pipe 204 is heated, and hot water with a temperature higher than that of the heat source hot water can be obtained. Medium-concentration solution into which the concentrated solution turns upon the absorption of the refrigerant vapor in the high-temperature absorber A2 flows to the high-temperature solution heat exchanger X2 through a medium-concentration solution pipe 214 to heat the concentrated solution from the generator G and is fed to the low-temperature absorber A1. In the low-temperature absorber A1, the medium-concentration solution absorbs the refrigerant vapor from the low-temperature evaporator E1 and turns into dilute solution. The dilute solution flows to the low-temperature solution heat exchanger X1 through a dilute solution pipe 215, heats the concentrated solution from the generator G in the low-temperature solution heat exchanger X1, and returns to the generator G through the first pressure reducing valve 216. The heat of absorption generated in the low-temperature absorber A1 when the medium-concentration solution absorbs the refrigerant vapor is transported to the high-temperature evaporator E2 through the heat transporting pipe 217. The vapor generated in the generator G is directed to the condenser C, and cooled and condensed by cooling water flowing through the cooling water pipe 201 as described before. Then, the same cycle is repeated.

The graph of absorption cycle of the flow on the solution side (which is hereinafter referred to as "series flow") in the two-stage absorption heat pump constituted as described above is shown in FIG. 33. In the series flow, when a pressure distribution as a heat pump is achieved in every component after the start-up has been completed and normal operation has begun, a normal solution circulation system is established. That is, the concentrated solution generated in the generator G is fed to the high-temperature absorber A2 with a high refrigerant vapor pressure by the pump 205, the medium-concentration solution flows from the high-temperature absorber A2 to the low-temperature absorber A1 by the difference in refrigerant vapor pressure between the high-temperature absorber A2 and the low-temperature absorber A1, and the dilute solution generated in the low-temperature absorber A1 flows from the low-temperature absorber A1 to the generator G by the difference in refrigerant vapor pressure between the low-temperature absorber A1 and the generator G.

FIG. 34 and FIG. 35 show the graph of absorption cycle in the case of a reverse flow pattern (which is hereinafter referred to as "reverse flow") and the graph of absorption cycle in the case of a parallel flow pattern (which is hereinafter referred to as "parallel flow"). In these cases, since solution is introduced into the low-temperature absorber A1 at the start of operation, the refrigerant in the low-temperature absorber A1 becomes higher in temperature than the refrigerant in the low-temperature evaporator E1 and circulation of the solution can be achieved.

However, since the absorption heat pumps obtain high-temperature heat in the form of high-temperature water (sensible heat) as heat receiving fluid, high pump power is necessary to circulate the high-temperature water. Also, in the known absorption heat pumps, the heat receiving medium liquid is heated, but they are not to produce vapor of the receiving medium. Thus, preheating of the heat receiving medium is not taken into account.

In addition, in the conventional single-stage absorption heat pumps and two-stage absorption heat pumps, preheating of the condensed medium (working medium condensed solution) to be fed from the condenser C to the evaporators E, E1, and E2 is not taken into account. Thus, an absorption heat pumps with high efficiency cannot be obtained.

Moreover, in the series flow, since no solution has been supplied to the low-temperature absorber at start-up, the cooling medium in the low-temperature absorber A1 is heated by the heat of condensation of the refrigerant vapor from the low-temperature evaporator E1. Thus, the temperature of the cooling medium is lower than the evaporation temperature in the low-temperature evaporator E1. The cooling medium is used as a heat source to generate refrigerant vapor or the cooling medium itself turns into refrigerant vapor in the high-temperature evaporator E2, and the refrigerant vapor is absorbed into the concentrated solution in the high-temperature absorber A2. Thus, the refrigerant vapor pressure in the high-temperature absorber A2 is lower than the vapor pressure in the low-temperature absorber A1 (equal to the vapor pressure in the low-temperature evaporator E1), and the medium-concentration solution cannot flow from the high-temperature absorber A2 to the low-temperature absorber A1 without reliance on the potential head difference. Therefore, when the height of the high-temperature absorber A2 is not high enough, the absorption heat pump cannot be started or it takes a long time to start the absorption heat pump.

In the reverse flow shown in FIG. 34, two solution pumps are required. In the parallel flow shown in FIG. 35, only one solution pump may be enough. However, the concentration ranges in the low-temperature absorber A1 and the high-temperature absorber A2 are wide and the concentrations at the outlets of the absorbers are generally equal to the concentration of the dilute solution. Thus, the solution temperature at the outlets of the absorbers is lower than those in the series flow shown in FIG. 33 and the flow shown in FIG. 34. That is, the temperature raising performance as a heat pump is low.

The present invention has been made in view of the above points. It is, therefore, an object of the present invention to provide an absorption heat pump in which waste hot water, exhaust gas or waste steam is used as a heat source for heating heat receiving medium liquid to produce vapor of the heat receiving medium in order to reduce the auxiliary machine power and in which the heat receiving medium liquid is preheated to improve the efficiency in converting the heat receiving medium liquid into vapor.

Another object of the present invention is to provide an absorption heat pump in which a condensed refrigerant (working medium condensed solution) to be supplied from a condenser to an evaporator is preheated to improve the efficiency.

Another object of the present invention is to provide a two-stage absorption heat pump which is low in height and excellent in the temperature raising performance and start-up characteristics and with which a high-temperature medium can be obtained in the form of high-temperature vapor.

SUMMARY OF THE INVENTION (1) To achieve the above object, an absorption heat pump according to the present invention comprises, as shown in FIG. 1, for example, an evaporator E which takes in a first heat source 301 and evaporates refrigerant liquid into refrigerant vapor; an absorber A which has a heat receiving medium passage 28A and which takes in heat receiving medium liquid 303 through a heat receiving medium inlet of the heat receiving medium passage 28A, heats the heat receiving medium liquid 303 with the heat of absorption generated when the refrigerant vapor generated in the evaporator E is absorbed into solution, and discharges the heat receiving medium 304 in the form of vapor or mixture of vapor and liquid through a heat receiving medium outlet of the heat receiving medium passage; and a generator G which takes in a second heat source 301 and evaporates the refrigerant from the solution having absorbed the refrigerant vapor.

The present invention may be an absorption heat pump which has an absorber, an evaporator, a generator, a condenser and a solution heat exchanger as primary components and pipes connecting the components with each other and in which a heat source is introduced into the evaporator and the generator and a cooling source is introduced into the condenser to obtain a high-temperature heat receiving medium in the absorber, wherein liquid of the heat receiving medium is introduced through a heat receiving medium inlet of the absorber and vapor or mixture of vapor and liquid of the heat receiving medium is discharged through a heat receiving medium outlet of the absorber.

In the present invention, liquid of a heat receiving medium is introduced into the absorber through the heat receiving medium inlet and vapor or mixture of vapor and liquid of the heat receiving medium is discharged from the absorber through the heat receiving medium outlet. Thus, pump power to supply the heat receiving medium liquid to the absorber can be reduced. For example, when the heat receiving medium is water ($H_2O$) and the difference between the temperatures at the inlet and outlet of the absorber is 5K where the high-temperature heat is obtained in the form of high-temperature water, if the high-temperature heat is obtained in the form of steam, the flow rate of water in the present invention can be approximately one-hundredth of that in the case of the form of high-temperature water. Thus, the pump power can be low. Even when the flow rate of heat receiving medium liquid is increased to improve the heat transfer efficiency and a vapor-liquid separation is carried out at the outlet, the flow rate of water is approximately one-fiftieth of that in the case where the high-temperature heat is obtained in the form of high-temperature water.

(2) The absorption heat pump according to the present invention may be that of (1) further comprising, as shown in FIG. 1, for example, a heat receiving medium liquid introduction flow rate control means 18 for controlling a flow rate of the heat receiving medium liquid 303 to be introduced into the heat receiving medium inlet of the absorber A so that the degree of superheat of the vapor 304 at the heat receiving medium outlet can be a target value.

Then, since the heat receiving medium liquid introduction flow rate control means for controlling the flow rate of the heat receiving medium liquid to be introduced into the heat receiving medium inlet of the absorber so that the degree of superheat of the vapor at the heat receiving medium outlet can be a target value is provided, heat receiving medium vapor free of liquid droplets can be obtained.

(3) The absorption heat pump according to the present invention may be that of (1) further comprising, as shown in FIG. 2, for example, a vapor-liquid separator 36 disposed at the heat receiving medium outlet of the absorber A for separating the heat receiving medium liquid 303 to be introduced into the heat receiving medium inlet of the absorber A.

In the present invention, the absorption heat pump as described in above (1) may have a vapor-liquid separator at the heat receiving medium outlet of the absorber so that heat receiving medium liquid separated in the vapor-liquid separator can be introduced into the heat receiving medium inlet of the absorber.

Then, since a vapor-liquid separator is disposed at the heat receiving medium outlet of the absorber, the flow rate of heat receiving medium liquid can be increased to improve the heat transfer coefficient of the heat receiving medium. Therefore, vapor with a higher temperature can be obtained. For example, the flow rate of the heat receiving medium liquid is one to two times the evaporation rate of heat receiving medium to be evaporated, the heat transfer coefficient of the heat receiving medium can be improved.

(4) The absorption heat pump according to the present invention may be any one of those described in (1)-(3) above, wherein the heat receiving medium liquid to be supplied to the absorber is heated by at least one of a heat source medium, the refrigerant vapor from the evaporator, an absorption solution and the heat of condensation generated in the condenser.

Then, since the heat receiving medium liquid to be supplied to the absorber is heated by at least one of a heat source medium, the refrigerant vapor from the evaporator, an absorption solution and the heat of condensation generated in the condenser, the heat receiving medium liquid is preheated before being supplied to the absorber. Therefore, the efficiency in converting the heat receiving medium from liquid to vapor can be improved.

(5) The absorption heat pump according to the present invention may be any one of those described in (1)-(3) above, as shown in FIG. 4, for example, wherein a plurality of sets of an absorber and an evaporator are provided so that the temperature raising process can be carried out in a plurality of stages.

Then, since a plurality of sets of an absorber and an evaporator are provided and the temperature raising process is carried out in a plurality of stages, heat receiving medium vapor with a higher temperature can be obtained.

(6) To achieve the above object, an absorption heat pump according to the present invention comprises, as shown in FIGS. 12 and 13, for example, an absorber A for heating a heat receiving medium with the heat of absorption generated when working medium concentrated solution absorbs vapor of working medium refrigerant; a generator G which takes in and heats the solution having absorbed the vapor of working medium refrigerant and evaporates the working medium refrigerant to convert the solution into working medium concentrated solution;

a condenser C which takes in the working medium refrigerant vapor generated in the generator G and cools to condense the working medium refrigerant vapor into working medium refrigerant liquid;

an evaporator E which takes in, heats and evaporates the working medium refrigerant liquid condensed in the condenser C into working medium refrigerant vapor, and allows the generated working medium refrigerant vapor to be absorbed into the working medium concentrated solution in the absorber A; and a heat exchanger 5 for heating the working medium refrigerant liquid being fed from the condenser C to the evaporator E with the working medium refrigerant vapor flowing from the generator G to the condenser C.

The present invention may be a single-stage or multi-stage absorption heat pump having a single-stage or multi-stage absorber, a single-stage or multi-stage evaporator, a generator, and a condenser as primary components, pipes connecting the components with each other, and a heat exchanger for heating working medium refrigerant liquid being fed from the condenser to the evaporator or evaporators with working medium refrigerant vapor flowing from the generator to the condenser.

(7) The absorption heat pump according to the present invention may be that as described in (6) above, as shown in FIGS. 12 and 13, for example, wherein the heat exchanger 5 is disposed in a passage 13 through which the working medium refrigerant vapor flows from the generator G to the condenser C or at the inlet of the condenser so that the working medium refrigerant liquid being fed from the condenser C to the evaporator E, EH can be heated with the working medium refrigerant vapor.

Then, since the heat exchanger for heating the working medium refrigerant liquid being fed from the condenser to the evaporator with the working medium refrigerant vapor flowing from the generator to the condenser is provided, the working medium refrigerant liquid from the condenser can be heated by the refrigerant vapor generated in the generator and having a temperature close to that of the heat source (waste water, waste steam or the like) before it is introduced into the evaporator. Thus, the heat of the hot water is not consumed to preheat the working medium condensed liquid, and the amount of heat to be transferred to the cooling water in the condenser can be reduced. It is, therefore, possible to provide a single-stage or multi-stage absorption heat pump with high efficiency.

(8) The absorption heat pump according to the present invention comprises, as shown in FIG. 14-17, for example, a high-temperature evaporator EH for heating and evaporating working medium refrigerant liquid into working medium refrigerant vapor; a low-temperature evaporator E for heating and evaporating working medium refrigerant liquid into working medium refrigerant vapor; a high-temperature absorber AH for heating a heat receiving medium with the heat of absorption which is generated when working medium concentrated solution absorbs the working medium refrigerant vapor generated in the high-temperature evaporator EH and turns into a solution with a concentration lower than that of the working medium concentrated solution; a low-temperature absorber A which takes in solution with a concentration lower than that of the working medium concentrated solution and heats working medium refrigerant liquid of an evaporator with an operation temperature higher than that of the low-temperature evaporator with the heat of absorption which is generated when the solution absorbs the working medium refrigerant vapor generated in the low-temperature evaporator E and turns into dilute solution with a concentration lower than that of the solution; a generator G which takes in and heats the dilute solution, and evaporates the working medium refrigerant to convert the dilute solution into working medium concentrated solution; a condenser C which takes in the working medium refrigerant vapor generated in the generator G and cools to condense the working medium refrigerant vapor into working medium refrigerant liquid; and a heat exchanger 23, 41, 42 for heating the working medium refrigerant liquid from the condenser C to be introduced into at least one of the high-temperature evaporator EH and the low-temperature evaporator E with a heating source.

The present invention may be a two-stage or three- or more stage absorption heat pump having a multi-stage absorber (a plurality of absorbers), a multi-stage evaporator (a plurality of evaporators), a generator, and a condenser as primary components, pipes connecting the components with each other, and a heat exchanger for hating working medium refrigerant liquid flowing from the condenser to the evaporator or evaporators with a heating source.

(9) The absorption heat pump according to the present invention may be that of (8) described above, wherein the heating source for the heat exchanger is the heating source for the generator, the heating source for the evaporator, or the working medium refrigerant vapor or working medium refrigerant liquid in the evaporator.

(10) The absorption heat pump according to the present invention may be that of (8) described above, wherein the heating source for the heat exchanger is working medium solution in the generator, working medium solution returning to the generator, or working medium solution flowing from the generator to the absorber.

Then, since the heat exchanger for heating the working medium refrigerant liquid from the condenser to be introduced into the evaporator or evaporators with a heating source is provided, the working medium refrigerant liquid to be fed from the condenser to the evaporator can be heated. It is, therefore, possible to provide a two-stage or three- or more stage absorption heat pump with high efficiency.

(11) An absorption heat pump according to the present invention comprises, as shown in FIG. 18, for example, a high-temperature evaporator EH for heating and evaporating working medium refrigerant liquid into working medium refrigerant vapor; a low-temperature evaporator E for heating and evaporating working medium refrigerant liquid into working medium refrigerant vapor; an high-temperature absorber AH for heating heat receiving medium with the heat of absorption which is generated when working medium concentrated solution absorbs the working medium refrigerant vapor generated in the high-temperature evaporator EH and turns into solution with a concentration lower than that of the working medium concentrated solution; a low-temperature absorber A which takes in solution with a concentration lower than that of the working medium concentrated solution and heats working medium refrigerant liquid of an evaporator with an operation temperature higher than that of the low-temperature evaporator E with the heat of absorption which is generated when the solution absorbs the working medium refrigerant vapor generated in the low-temperature evaporator E and turns into a dilute solution with a concentration lower than that of the solution; a generator G which takes in and heats the dilute solution and evaporates the working medium refrigerant to convert the dilute solution into working medium concentrated solution; and a condenser C which takes in the working medium refrigerant vapor generated in the generator G and cools to condense the working medium refrigerant vapor into working medium refrigerant liquid; wherein the working medium refrigerant liquid from the condenser C is introduced into the low-temperature evaporator E and heated therein, and a portion of the working medium refrigerant liquid of the low-temperature evaporator E is introduced into an evaporator on the high-temperature side from the low-temperature evaporator.

The present invention may be a two-stage or three- or more stage absorption heat pump having a multi-stage absorber (a plurality of absorbers), a multi-stage evaporator (a plurality of evaporators), a generator, and a condenser as primary components, and pipes connecting the components with each other, in which working medium refrigerant liquid from the condenser is introduced into an evaporator on the low-temperature side and heated therein, and a portion of the working medium refrigerant liquid in the evaporator on the low-temperature side is introduced into an evaporator on the high-temperature side.

Then, since the working medium refrigerant liquid from the condenser is introduced into an evaporator on the low-temperature side and heated therein, and a portion of the working medium refrigerant liquid in the evaporator on the low-temperature side is introduced into an evaporator on the high-temperature side, the working medium refrigerant liquid from the condenser is heated in the evaporator and the heated working medium liquid is introduced into another evaporator. It is, therefore, possible to provide a two-stage or multi-stage absorption heat pump with high efficiency.

(12) To achieve the above object, an absorption heat pump according to the present invention comprises, as shown in FIGS. 28, 30, for example, a generator G for generating a refrigerant vapor; a condenser C for taking in the refrigerant vapor generated in the generator G; a high-temperature evaporator EH for taking in condensed refrigerant liquid from the condenser C; a low-temperature evaporator E for taking in condensed refrigerant liquid from the condenser C; a high-temperature absorber AH for taking in concentrated solution from the generator G through the heated side of a low-temperature solution heat exchanger X1 and the heated side of a high-temperature solution heat exchanger X2 and taking in refrigerant vapor generated in the high-temperature evaporator EH; and a low-temperature absorber A for taking in medium-concentration solution with a medium concentration into which the concentrated solution turns upon absorption of the refrigerant vapor in the high-temperature absorber AH through the heating side of the high-temperature solution heat exchanger X2 and taking in refrigerant vapor generated in the low-temperature evaporator E, wherein the generator G takes in dilute solution into which the medium-concentration solution turns upon absorption of the refrigerant vapor in the low-temperature absorber A through the heating side of the low-temperature heat exchanger X1, and a portion of the concentrated solution from the generator G heated in the low-temperature heat exchanger X1 and to be introduced into the high-temperature absorber AH is separated and introduced into the low-temperature absorber A.

The present invention may be a two-stage absorption heat pump with two temperature raising stages, comprising a high-temperature absorber, a low-temperature absorber, a high-temperature evaporator, a low-temperature evaporator, a generator, a condenser, a high-temperature solution heat exchanger, and a low-temperature solution heat exchanger as primary components, wherein concentrated solution in the generator is introduced into the high-temperature absorber through the heated side of the low-temperature solution heat exchanger and the heated side of the high-temperature solution heat exchanger, condensed refrigerant liquid in the condenser is introduced into the low-temperature evaporator and the high-temperature evaporator, refrigerant vapor generated in the low-temperature evaporator is introduced into the low-temperature absorber, refrigerant vapor generated in the high-temperature evaporator is introduced into the high-temperature absorber, medium-concentration solution into which the concentrated solution turns upon absorption of the refrigerant vapor in the high-temperature absorber is introduced into the low-temperature absorber through the heating side of the high-temperature solution heat exchanger, dilute solution into which the medium-concentration solution turns upon absorption of the refrigerant vapor in the low-temperature absorber is introduced into the generator through the heating side of the low-temperature solution heat exchanger, and refrigerant vapor generated in the generator is introduced into the condenser. A portion of the concentrated solution from the generator heated in the low-temperature heat exchanger and to be introduced into the high-temperature absorber is separated and introduced into the low-temperature absorber.

Then, since a portion of the concentrated solution from the generator heated in the low-temperature heat exchanger and to be introduced into the high-temperature absorber is separated and introduced into the low-temperature absorber, the temperature of the solution in the low-temperature absorber can be higher than the temperature of the refrigerant in the low-temperature evaporator even at start-up. Thus, since the difference between the vapor pressure in the high-temperature absorber and the vapor pressure in the low-temperature absorber can be large, the medium-concentration solution in the high-temperature absorber can easily flow to the low-temperature absorber. It is, therefore, possible to provide a two-stage absorption heat pump which is low in height and excellent in temperature raising performance and start-up characteristics.

(13) The absorption heat pump according to the present invention may be that of (12) described above, wherein the low-temperature absorber and the high-temperature evaporator are integrated with each other so that the refrigerant in the high-temperature evaporator can be directly heated by the solution in the low-temperature absorber.

Then, since the low-temperature absorber and the high-temperature evaporator are integrated with each other so that the refrigerant in the high-temperature evaporator can be directly heated by the solution in the low-temperature absorber, the two-stage absorption heat pump can be simple in structure.

(14) The absorption heat pump according to the present invention may be that as described in (12) or (13), wherein the heat receiving medium 303 is heated by the solution in the high-temperature absorber AH and converted into vapor 304.

Then, since the heat receiving medium is heated by the solution in the high-temperature absorber and converted into vapor, high-temperature medium can be obtained with a low flow rate of the heat receiving medium. Therefore, the power to supply the heat receiving medium can be reduced.

(15) The absorption heat pump according to the present invention may be any one of those as described in (12)-(14) above, wherein the flow rate of concentrated solution to be separated and introduced into the low-temperature absorber is 5 to 50% of a total flow rate of the concentrated solution from the generator.

Then, since the flow rate of concentrated solution to be separated and introduced into the low-temperature absorber is 5 to 50% of the total flow rate of the concentrated solution from the generator, the start-up does not take a long time and the decrease of the temperature raising performance can be negligible even if the introduction of concentrated solution is still continued after the completion of the start-up.

According to the present invention, when liquid of a heat receiving medium is introduced into the heat receiving medium inlet of the absorber and vapor or a mixture of vapor or liquid of the heat receiving medium is discharged from the heat receiving medium outlet of the absorber, pump power to supply the heat receiving medium liquid to the absorber can be reduced.

According to the present invention, when a heat exchanger for heating the working medium refrigerant liquid being fed from the condenser to the evaporator is heated with the working medium refrigerant vapor flowing from the generator to the condenser is provided, the working medium refrigerant liquid can be heated by the refrigerant vapor generated in the generator and having a temperature close to that of the heat source (waste water, waste steam or the like) before it is introduced into the evaporator. Thus, the heat of the hot water is not consumed to preheat the working medium condensed liquid, and the amount of heat to be transferred to the cooling water in the condenser can be reduced.

According to the present invention, when a portion of the concentrated solution from the generator heated in the low-temperature heat exchanger and to be introduced into the high-temperature absorber is separated and introduced into the low-temperature absorber, the temperature of the solution in the low-temperature absorber can be higher than the temperature of the refrigerant in the low-temperature evaporator even at start-up. Thus, since the difference between the vapor pressure in the high-temperature absorber and the vapor pressure in the low-temperature absorber can be large, the medium-concentration solution in the high-temperature absorber can easily flow to the low-temperature absorber. It is, therefore, possible to provide a two-stage absorption heat pump which is low in height and excellent in temperature raising performance and start-up characteristics.

This application is based on the Patent Applications No. 2004-299168 filed on Oct. 13, 2004, 2004-299169 filed on Oct. 13, 2004, 2004-351751 filed on Dec. 3, 2004 and 2004-352744 filed on Dec. 6, 2004 in Japan, the contents of which are hereby incorporated in its entirety by reference into the present application, as part thereof.

The present invention will become more fully understood from the detailed description given hereinbelow. However, the detailed description and the specific embodiment are illustrated of desired embodiments of the present invention and are described only for the purpose of explanation. Various changes and modifications will be apparent to those ordinary skilled in the art on the basis of the detailed description.

The applicant has no intention to give to public any disclosed embodiment. Among the disclosed changes and modifications, those which may not literally fall within the scope of the patent claims constitute, therefore, a part of the present invention in the sense of doctrine of equivalents.

The use of the terms "a" and "an" and "the" and similar referents in the context of describing the invention (especially in the context of the following claims) are to be construed to cover both the singular and the plural, unless otherwise indicated herein or clearly contradicted by context. The use of any and all examples, or exemplary language (e.g., "such as") provided herein, is intended merely to better illuminate the invention and does not pose a limitation on the scope of the invention unless otherwise claimed.

BRIEF DESCRIPTION OF THE DRAWINGS

FIG. 27 is a view illustrating the location of a heating source solution heat exchanger in the parallel flow patterns of solution in the two-stage absorption heat pump according to the present invention.

DETAILED DESCRIPTION OF THE PREFERRED EMBODIMENT

Description will be hereinafter made of an embodiment of the present invention with reference to the drawings. Although waste hot water or waste steam is used as a heat source for a generator G and an evaporator E in this embodiment, the heat source may be exhaust gas or the like. A first heat source to be introduced into the evaporator and a second heat source to be introduced into the generator may be the same or different. Also, although cooling water is used as a cooling source for a condenser C, the cooling source may be air (air-cooled system) or the like.

Figure 1:
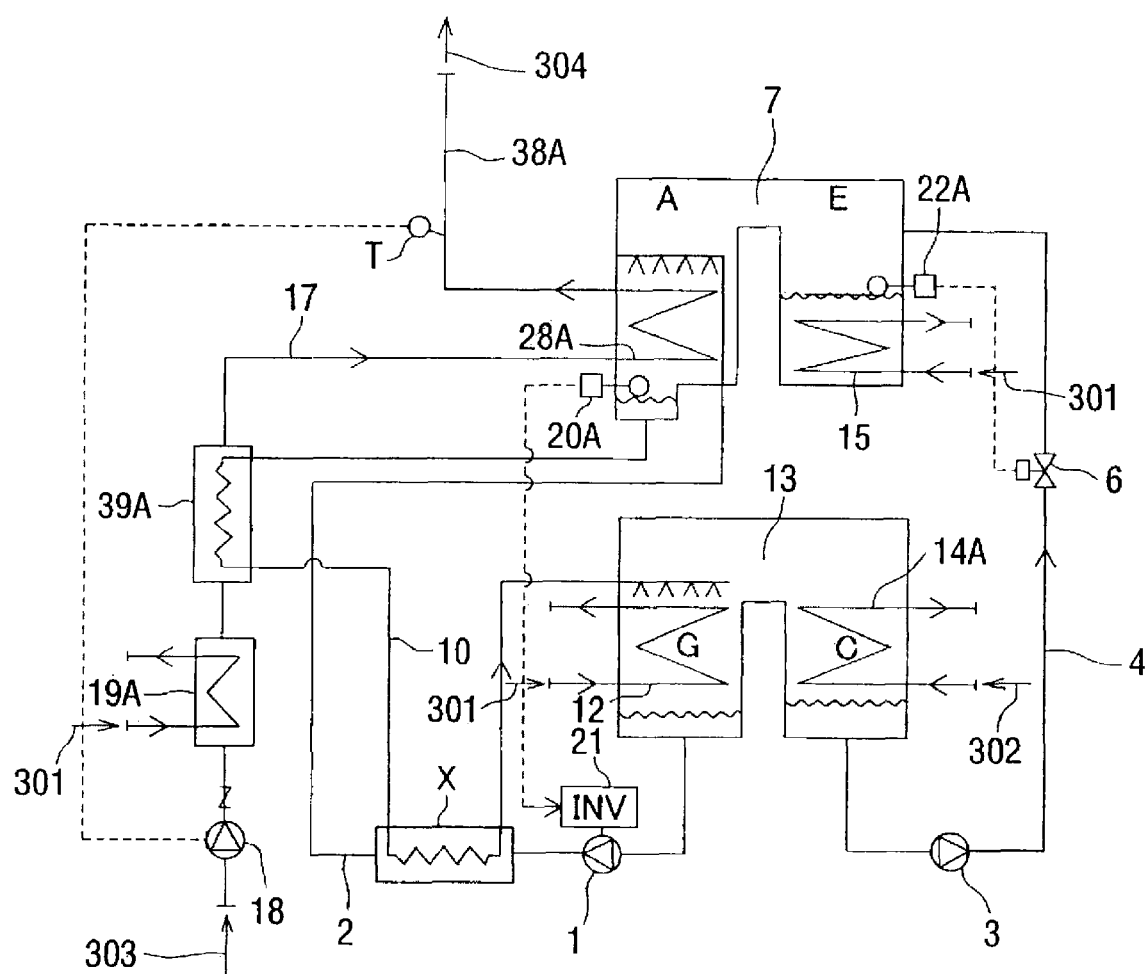
FIG. 1 is a view illustrating an example of the constitution of an absorption heat pump according to the present invention.

FIG. 1 is a view illustrating an example of the constitution of an absorption heat pump according to the present invention. As shown in the drawing, the absorption heat pump has an absorber A, an evaporator E, a generator G, a condenser C and a solution heat exchanger X as primary components. A concentrated solution pipe 2 through which concentrated solution is supplied from the generator G to the absorber A by a solution pump 1, a dilute solution pipe 10 through which dilute solution is supplied from the absorber A to the generator G, a refrigerant pipe 4 through which refrigerant liquid is supplied to the evaporator E by a refrigerant pump 3, a passage 7 through which refrigerant vapor generated in the evaporator E is supplied to the absorber A, and a passage 13 through which refrigerant vapor generated in the generator G is supplied to the condenser C are provided and connect the components.

The condenser C is provided with a cooling water pipe 14A for directing cooling water 302. The evaporator E and the generator G are provided with hot water pipes 15 and 12, respectively, for directing heat source hot water 301. The absorber A is provided with an evaporation pipe 28A as a heat receiving medium passage to obtain desired high-temperature steam. The evaporation pipe 28A has an inlet to which a water supply pipe 17 for supplying water 303 as heat receiving medium liquid is connected and an outlet to which a steam pipe 38A for discharging steam 304 is connected. Designated as 39A is a heat exchanger for heating (preheating) the water 303 to be supplied to the absorber A through the water supply pipe 17 by a water supply pump 18 with dilute solution from the absorber A, and designated as 19A is a heat exchanger for heating (preheating) the water 303 with heat source hot water 301.

In the absorption heat pump constituted as described above, when heat source hot water 301 is supplied to the hot water pipe 12 in the generator G, the solution in the generator G is evaporated and concentrated into concentrated solution. The concentrated solution is delivered by the solution pump 1, heated in the solution heat exchanger X, fed to the absorber A, and sprayed onto a heat transfer surface of the evaporation pipe 28A. The refrigerant delivered to the evaporator E by the refrigerant pump 3 is heated by heat source hot water 301 flowing through the hot water pipe 15 and evaporates. The refrigerant vapor flows into the absorber A through the passage 7 and is absorbed into the sprayed concentrated solution, whereupon the concentrated solution turns into dilute solution. The concentrated solution is heated by the heat of absorption generated when the refrigerant vapor is absorbed into the concentrated solution and rises in temperature to the degree corresponding to the boiling point elevation. Then, the heat transfer surface of the evaporation pipe 28A is heated to heat the water 303 flowing through the evaporation pipe 28A, and steam 304 is generated and discharged through the steam pipe 38A.

The dilute solution in the absorber A flows through the dilute solution pipe 10, heats the water 303 flowing through the water supply pipe 17 in the heat exchanger 39A, heats the concentrated solution flowing through the concentrated solution pipe 2 in the solution heat exchanger X, and returns to the generator G. When the water 303 is superheated to a temperature corresponding to the evaporating pressure or heated to a temperature high enough to generate steam in the heat exchanger 39A, the heat transfer efficiency in the vicinity of the inlet of the absorber A can be significantly improved. The vapor generated in the generator G flows into the condenser C through the passage 13, and is cooled to be condensed by the cooling water 302 flowing through the cooling water pipe 14A. Then, the same cycle is repeated. The heat exchanger 39A may be disposed in the absorber A so that the water 303 can be heated by the solution in the absorber A. In this case, the heat exchanger 39A may be located at the inlet or outlet of the absorber A or in an intermediate position in the absorber A.

The absorber A is provided with a liquid level meter 20A for detecting the liquid level at the outlet thereof. The detection output from the liquid level meter 20A is transmitted to an inverter 21 for driving the solution pump 1 to control it. The flow rate of the concentrated solution to be supplied from the generator G to the absorber A is thereby controlled and the liquid level at the outlet of the absorber A is maintained at a predetermined level. The evaporator E is also provided with a liquid level meter 22A for detecting the liquid level therein. The detection output from the liquid level meter 22A is transmitted to a control valve 6 to control it. The flow rate of the refrigerant to be supplied from the condenser C is thereby controlled and the liquid level in the evaporator E is maintained. The steam pipe 38A is provided with a thermometer T for detecting the temperature of the steam flowing therethrough. The water supply pump 18 is controlled based on the detection output from the thermometer T to control the flow rate of the water 303 so that the degree of superheat of the steam flowing through the steam pipe 38A can be a target value. Therefore, the steam 304 can be free of water droplets.

Since the water 303 as heat receiving medium liquid supplied through the water supply pipe 17 is heated into high-temperature steam 304 in the evaporation pipe 28A in the absorber A as described above, the flow rate of water as heat receiving medium liquid can be small. For example, when the water is converted into steam, the flow rate of water can be approximately one-hundredth of that in the case in which the water is converted into high-temperature water when the difference between the temperatures at the inlet and outlet of the evaporation pipe 28A is 5K. Even when the flow rate of the water 303 as heat receiving medium liquid is increased to improve the heat transfer efficiency and a vapor-liquid separator 36 is provided as shown in FIG. 2 to separate vapor and liquid, the flow rate of water can be approximately one-fiftieth. Therefore, the power for the water supply pump 18 can be significantly reduced.

Figure 2A:
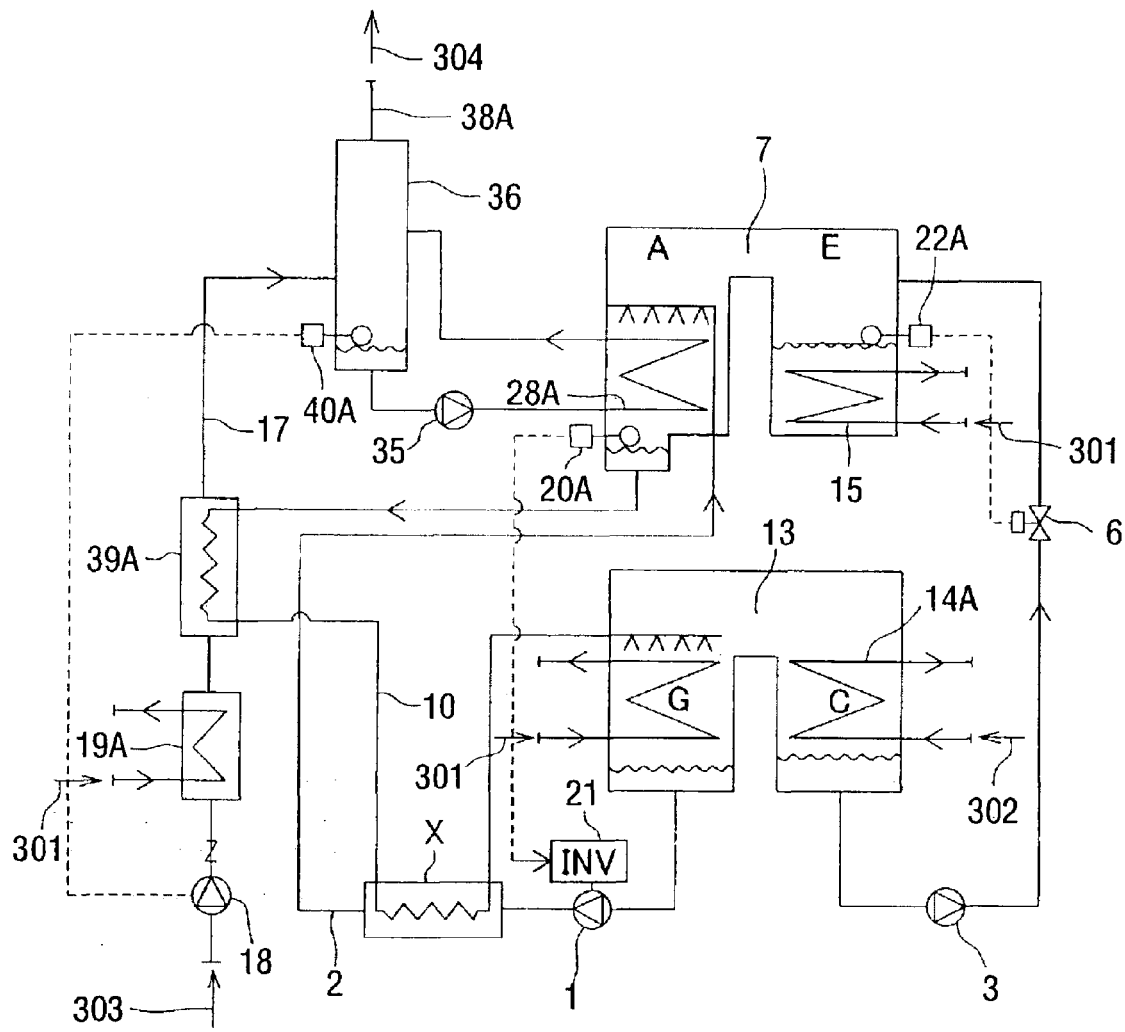
FIG. 2 is a view illustrating an example of the constitution of an absorption heat pump according to the present invention.

FIG. 2 is a view illustrating another example of the constitution of an absorption heat pump according to the present invention. In FIG. 2, parts that are the same or equivalent to the components of FIG. 1 are identified with the same numerals. The same applies to the other drawings. In the absorption heat pump, a vapor-liquid separator 36 is connected to the outlet of the evaporation pipe 28A of the absorber A and the water supply pipe 17 is connected to the vapor-liquid separator 36 as shown in FIG. 2(a). The water 303 supplied to the vapor-liquid separator 36 and water separated from steam-water mixture are supplied to the evaporation pipe 28A by a pump 35. The vapor-liquid separator 36 is provided with a liquid level meter 40A, and the water supply pump 18 is controlled based on the detection output from the liquid level meter 40A to maintain the liquid level in the vapor-liquid separator 36 at a predetermined level.

When the vapor-liquid separator 36 is provided as described above and the water 303 as heat receiving medium liquid is supplied to the evaporation pipe 28A of the absorber A in an flow rate about one to two times the evaporation rate of water to be evaporated, the heat transfer coefficient on the side of the heat receiving medium can be increased and steam with a higher temperature can be obtained. In this case, however, two pumps (the water supply pump 18 and the pump 35) are required. When the liquid level in the vapor-liquid separator 36 is raised, a bubble pump can be used instead of the pump 35.

Figure 2B:
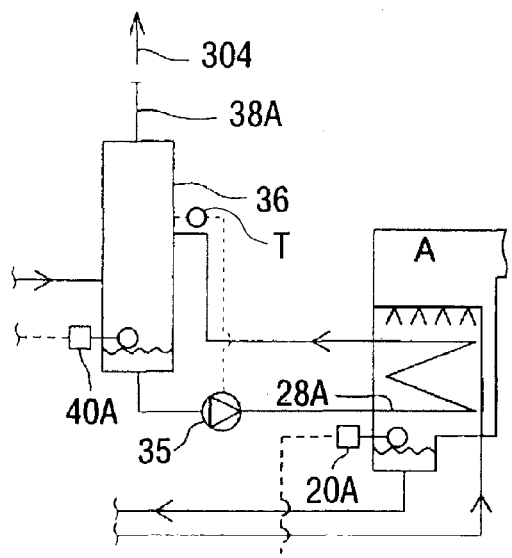

A thermometer T for detecting the temperature of steam may be disposed at an upper part of the vapor-liquid separator 36 as shown in FIG. 2(b), and the flow rate of water to be supplied to the evaporation pipe 28A may be controlled by controlling the rotational speed of the pump 35 based on the detection output from the thermometer T so that the degree of superheat of the steam in the vapor-liquid separator 36 can be a target value. The thermometer T may be disposed on the steam pipe 38A instead of on the vapor-liquid separator 36 to control the degree of superheat of the steam flowing through the steam pipe 38A to a target value. A flow control valve (not shown) may be disposed between the pump 35 and the evaporation pipe 28A so that the flow rate of water to be introduced into the evaporation pipe 28A can be controlled by controlling the opening of the flow control valve (not shown), instead of controlling the rotational speed of the pump 35, based on the detection output from the thermometer T. The control of the flow rate of water to be supplied to the evaporation pipe 28A in the case where the vapor-liquid separator 36 is provided is also applicable to the embodiments described below.

Figure 3:
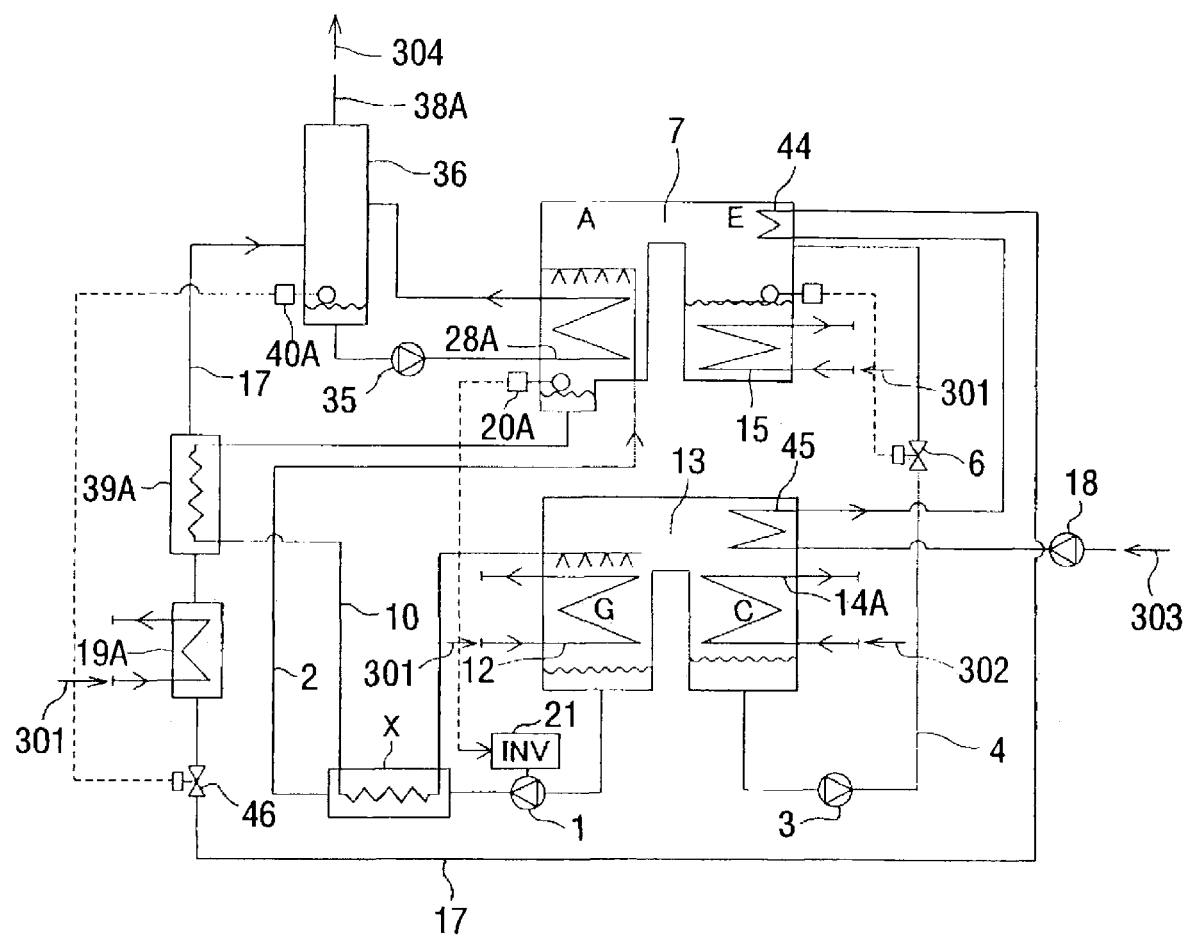
FIG. 3 is a view illustrating an example of the constitution of an absorption heat pump according to the present invention.

FIG. 3 is a view illustrating another example of the constitution of an absorption heat pump according to the present invention. In the absorption heat pump, a preheat pipe 45 is disposed in the condenser C, and the water supply pipe 17 is connected to the preheat pipe 45 as shown in FIG. 3. The water 303 as heat receiving medium liquid delivered by the pump 18 is heated by the refrigerant vapor in the condenser C, heated by the refrigerant vapor generated in the evaporator E as it passes through a heat transfer pipe 44 in the evaporator E, heated by the heat source hot water 301 in the heat exchanger 19A, and heated by the dilute solution from the absorber A in the heat exchanger 39A before being fed to the vapor-liquid separator 36. A control valve 46 is controlled based on the detection output from the liquid level meter 40A in the vapor-liquid separator 36 to control the flow rate of the water 303 so that the liquid level in the vapor-liquid separator 36 can be maintained at a predetermined level. Since the water 303 as heat receiving medium liquid is first directed to the preheat pipe 45 in the condenser C to allow it to exchange heat with the refrigerant vapor from the generator G, the refrigerant vapor is condensed and the water 303 as heat receiving medium liquid is heated when the temperature of the water 303 is lower than the saturation temperature of the refrigerant vapor. The heat exchanger 19A may be omitted and the water 303 may be heated by the refrigerant vapor from the evaporator E as it flows through the heat transfer pipe 44 in the evaporator E. In this case, the heat exchanging system can be simplified than the heat exchanger 19A. The preheat pipe 45 is preferably located closer to the generator G than the cooling water pipe 14A. Since superheated vapor with a temperature equal to that of the solution heated in the generator G is generated from the solution, the supplied water can be heated more efficiently.

Figure 4:
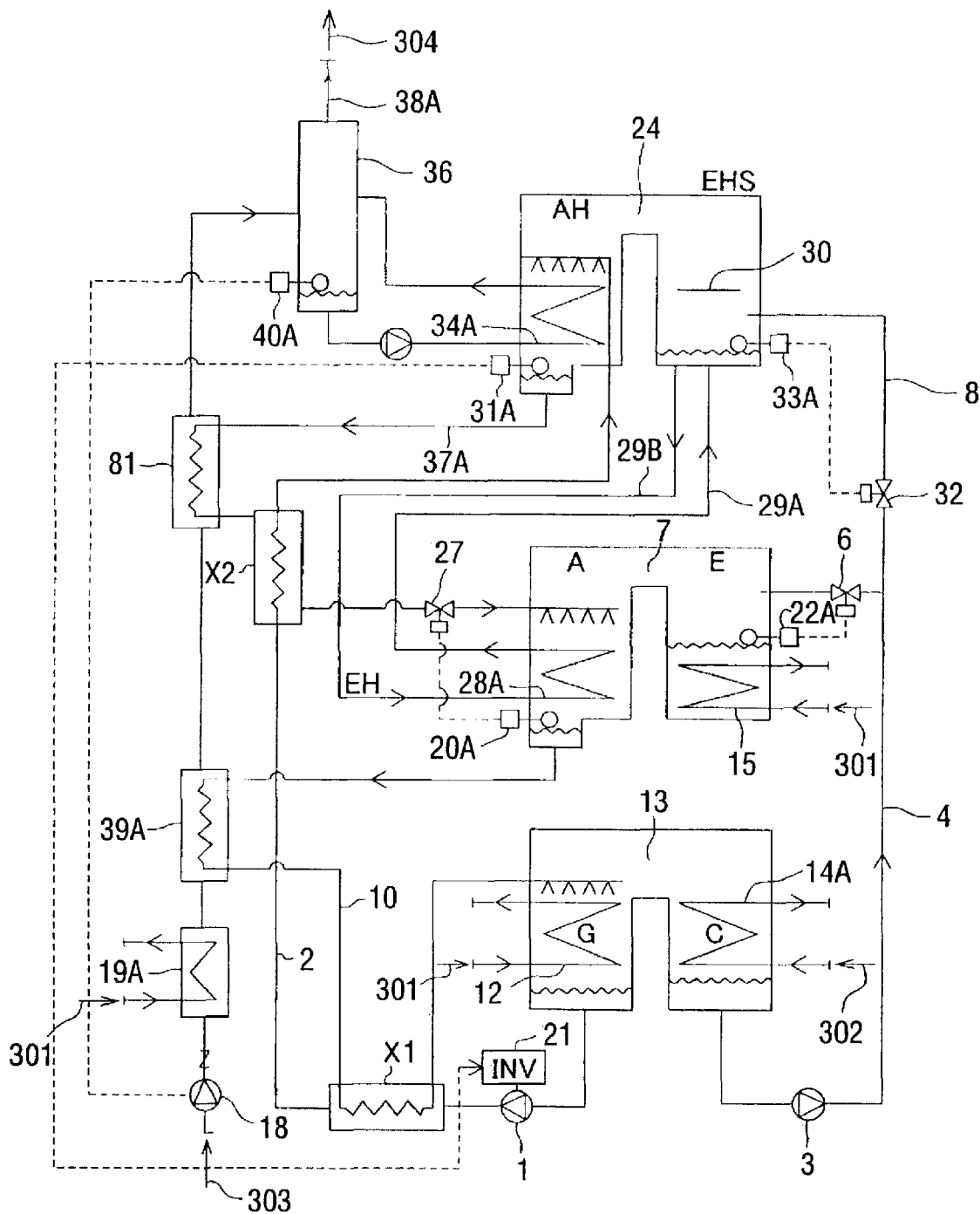
FIG. 4 is a view illustrating an example of the constitution of an absorption heat pump according to the present invention.

FIG. 4 is a view illustrating another example of the constitution of an absorption heat pump according to the present invention. This indicates an example of a two-stage absorption heat pump. As shown in FIG. 4, the absorption heat pump has a high-temperature absorber AH and a vapor-liquid separator EHS. The absorber A and the evaporator E shown in FIG. 1 and FIG. 3 function as a low-temperature absorber and a low-temperature evaporator, respectively. The heated side of the low-temperature absorber A functions as a high-temperature evaporator EH. The refrigerant liquid fed from the condenser C through the refrigerant pipe 4 is supplied to the vapor-liquid separator EHS through a control valve 32 and a refrigerant branch pipe 8. The refrigerant vapor from the high-temperature evaporator EH is fed to the vapor-liquid separator EHS through a refrigerant pipe 29A. The refrigerant liquid from the condenser C is thereby heated and evaporated in the vapor-liquid separator EHS. The refrigerant liquid separated from the refrigerant vapor is returned to the low-temperature absorber A through a refrigerant pipe 29B. A baffle plate 30 is disposed in the vapor-liquid separator EHS. Although the heat exchanger 39A uses the solution discharged from the low-temperature absorber A as heating fluid, the heat exchanger 39A may be disposed in the low-temperature absorber A so that it can use the solution in the low-temperature absorber A as heating fluid. The heat exchanger 39A may use the refrigerant vapor from the high-temperature evaporator EH as a heating source instead of the solution in the low-temperature absorber A.

The concentrated solution delivered from the generator G by the solution pump 1 is heated (preheated) as it flows through a solution heat exchanger X1 and a heat exchanger X2 and fed to the high-temperature absorber AH. In the high-temperature absorber AH, the refrigerant vapor from the vapor-liquid separator EHS is absorbed into the concentrated solution, whereupon the concentrated solution turns into dilute solution. The concentrated solution is heated by the heat of absorption generated when the refrigerant vapor is absorbed into the concentrated solution and rises in temperature to the degree corresponding to the boiling point elevation. Then, the heat transfer surface of the evaporation pipe 34A is heated to heat the water 303 flowing through the evaporation pipe 34A into steam. The steam is introduced into the vapor-liquid separator 36 and undergoes vapor-liquid separation, and steam 304 is discharged through the steam pipe 38A.

The dilute solution in the high-temperature absorber AH is supplied to a heat exchanger 81 through a dilute solution pipe 37A and heats the water 303 to be supplied to the vapor-liquid separator 36 in the heat exchanger 81. Then, the dilute solution heats the concentrated solution to be fed to the high-temperature absorber AH in the heat exchanger X2, and flows into the low-temperature absorber A through a control valve 27. The control valve 27 is controlled based on the detection output from the liquid level meter 20A for detecting the liquid level at the outlet of the low-temperature absorber A to maintain the liquid level at the outlet of the low-temperature absorber A at a predetermined level. The high-temperature absorber AH is provided with a liquid level meter 31A for detecting the liquid level at the outlet thereof. The detection output from the liquid level meter 31A is transmitted to the inverter 21 for driving the solution pump 1 to control it. The flow rate of concentrated solution to be supplied to the high-temperature absorber AH is thereby controlled and the liquid level at the outlet of the high-temperature absorber AH is maintained at a predetermined level. The vapor-liquid separator EHS is provided with a liquid level meter 33A. The control valve 32 is controlled based on the detection output from the liquid level meter 33A to maintain the liquid level in the vapor-liquid separator EHS at a predetermined level. The liquid level in the low-temperature evaporator E is maintained at a predetermined level by controlling the control valve 6 based on the detection output from the liquid level meter 22A to control the flow rate of refrigerant to be supplied from the condenser C.

Figure 5:
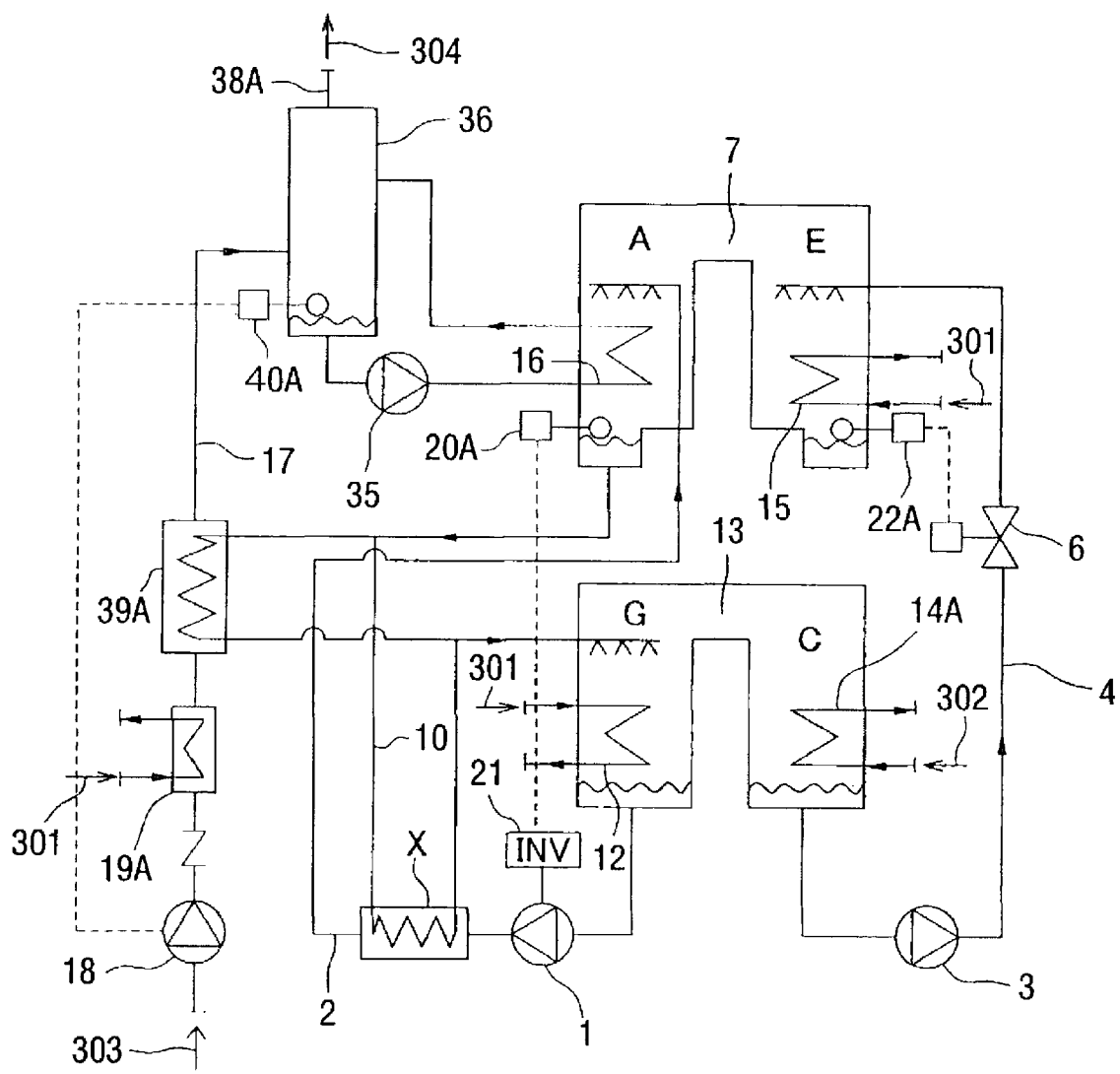
FIG. 5 is a view illustrating an example of the constitution of an absorption heat pump according to the present invention.

Although the evaporator E has the hot water pipe 15 for directing the heat source hot water 301 through the refrigerant liquid therein in the absorption heat pump constituted as shown in any one of FIG. 1 to FIG. 4, it is needles to say that the evaporator E may be a spray-type evaporator in which the refrigerant liquid from the condenser C is sprayed onto the hot water pipe 15 for directing the heat source hot water 301 as shown in FIG. 5.

FIG. 5 is a view illustrating another example of the constitution of an absorption heat pump according to the present invention. The absorption heat pump is different from the heat pumps shown in FIG. 1 to FIG. 4 in the following respect: The dilute solution from the absorber A is supplied in parallel to the heat exchanger 39A and the solution heat exchanger X in the absorption heat pump shown in FIG. 5 whereas the dilute solution from the absorber A is supplied in series to the heat exchanger 39A and the solution heat exchanger X(X1) in the absorption heat pumps shown in FIG. 1 to FIG. 4. The dilute solution used to heat the water 303 flowing through the water supply pipe 17 in the heat exchanger 39A and the dilute solution used to heat the concentrated solution flowing through the concentrated solution pipe 2 in the solution heat exchanger X are joined together, supplied to the generator G and sprayed onto the hot water pipe 12 through which the heat source hot water 301 is flowing.

Although a spray-type evaporator, in which the refrigerant liquid from the condenser C is sprayed onto the hot water pipe 15 for directing the heat source hot water 301 as the evaporator E in the absorption heat pump as shown in FIG. 5, it is needles to say that the evaporator E may be an evaporator having a hot water pipe 15 passing through the refrigerant liquid as shown in FIG. 1 to FIG. 4.

In the absorption heat pumps shown in FIG. 1 to FIG. 5, the water 303 as heat receiving medium liquid to be fed to the absorber A or the high-temperature absorber AH is heated (preheated) by the heat source hot water 301 in the heat exchanger 19A and by the dilute solution (absorbent solution) from the absorber A or the high-temperature absorber AH in the heat exchanger 39A and introduced into the absorber A, the high-temperature absorber AH or the vapor-liquid separator 36. Here, the amount of heat transferred to the heat receiving medium/the amount of heat of the heat source is represented as COP, and the amount of heat transferred in the absorber A or the high-temperature absorber AH/the amount of heat of the heat source is represented as COPX. The COPX is approximately 0.4 to 0.5 in the single-stage absorption heat pumps shown in FIG. 1 to FIG. 3 and FIG. 5 and approximately 0.26 to 0.33 in the two-stage absorption heat pump shown in FIG. 4. When the water 303 as heat receiving medium liquid is preheated by the heat source hot water 301, the COP can be greater than the COPX since the amount of heat of the heat receiving medium/the amount of heat of heat source equals to 1 in the preheating section. When the water 303 is preheated by the sensible heat of the solution in the absorber A or the high-temperature absorber AH, the value of the amount of heat of the heat receiving medium/the amount of heat of heat source can be greater than the COPX, and the COP can be improved. A similar effect can be obtained when the water 303 as a heat receiving medium is preheated by the refrigerant vapor from the evaporator E.

Figure 6:
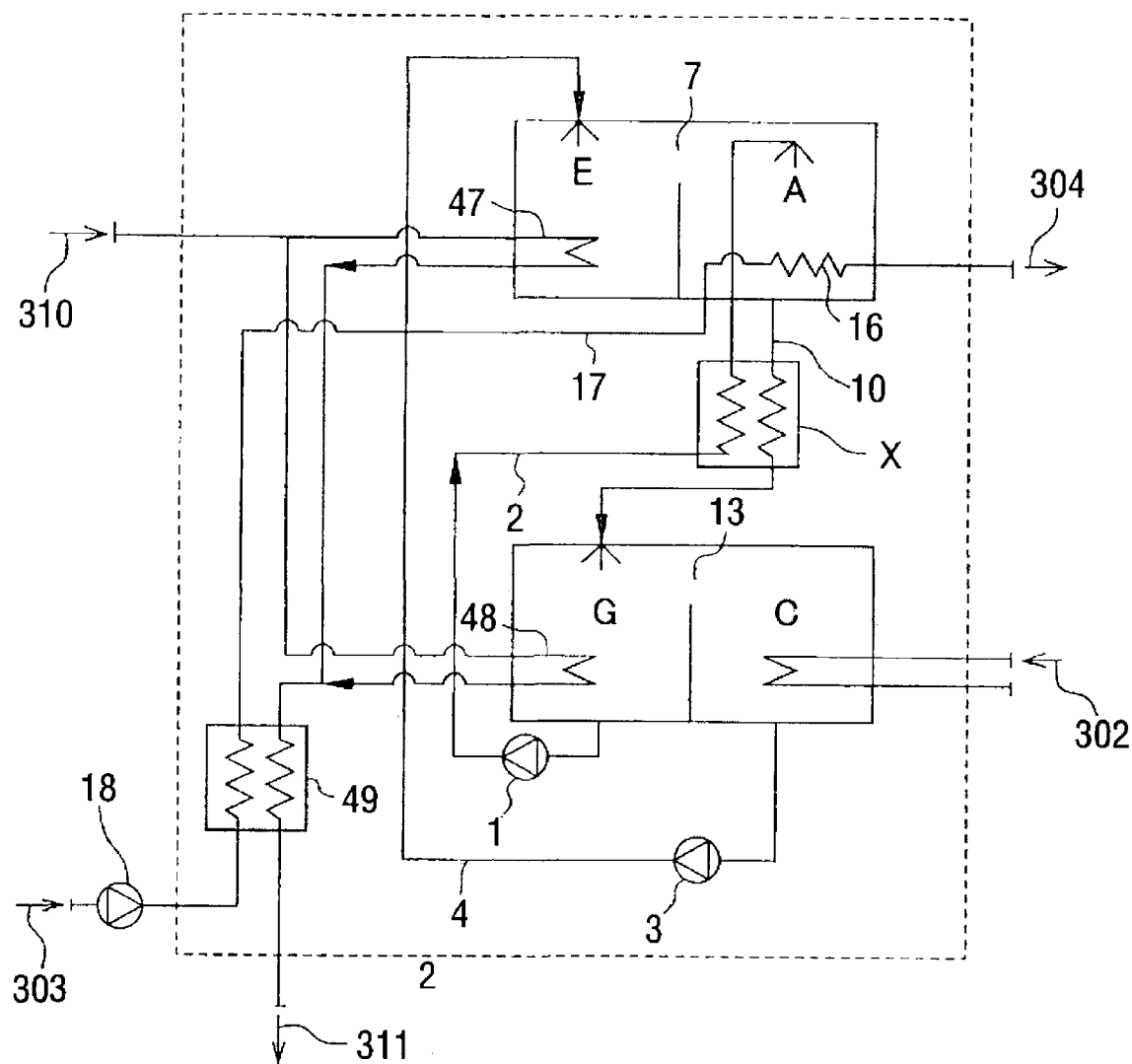
FIG. 6 is a view illustrating an example of the constitution of an absorption heat pump according to the present invention.

FIG. 6 is a view illustrating another example of the constitution of an absorption heat pump according to the present invention. The absorption heat pump is different from the absorption heat pump shown in FIG. 1 in that waste steam 310 is used as a heat source for the generator G and the evaporator E. As shown in the drawing, the waste steam 310 is supplied in parallel to a steam pipe 47 in the evaporator E and a steam pipe 48 in the generator G to heat the refrigerant liquid in the evaporator E and the dilute solution in the generator G. The waste steam 310 loses heat in the steam pipe 47 and the steam pipe 48 and condenses into drain water. Since the drain water has a high temperature generally equal to the saturation temperature of steam, it is used to preheat the water 303 flowing through the water supply pipe 17 in a drain heat exchanger 49 and discharged as drain water 311. An effect similar to that of the absorption heat pump shown in FIG. 1 can be obtained when waste steam is used as a heat source as described above.

Figure 7A:
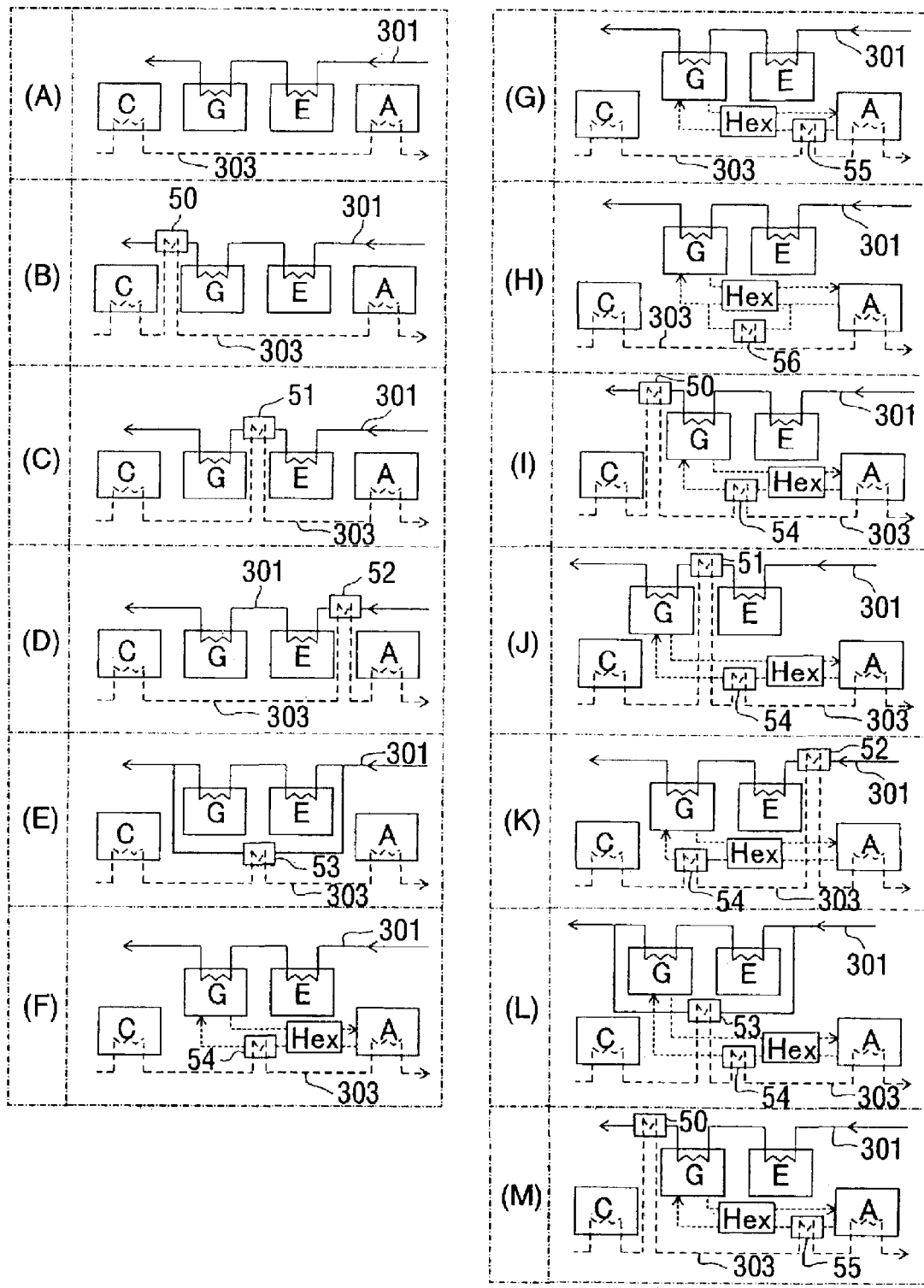
FIG. 7A is a view illustrating examples of the preheating pattern in the absorption heat pump according to the present invention.
Figure 7B:
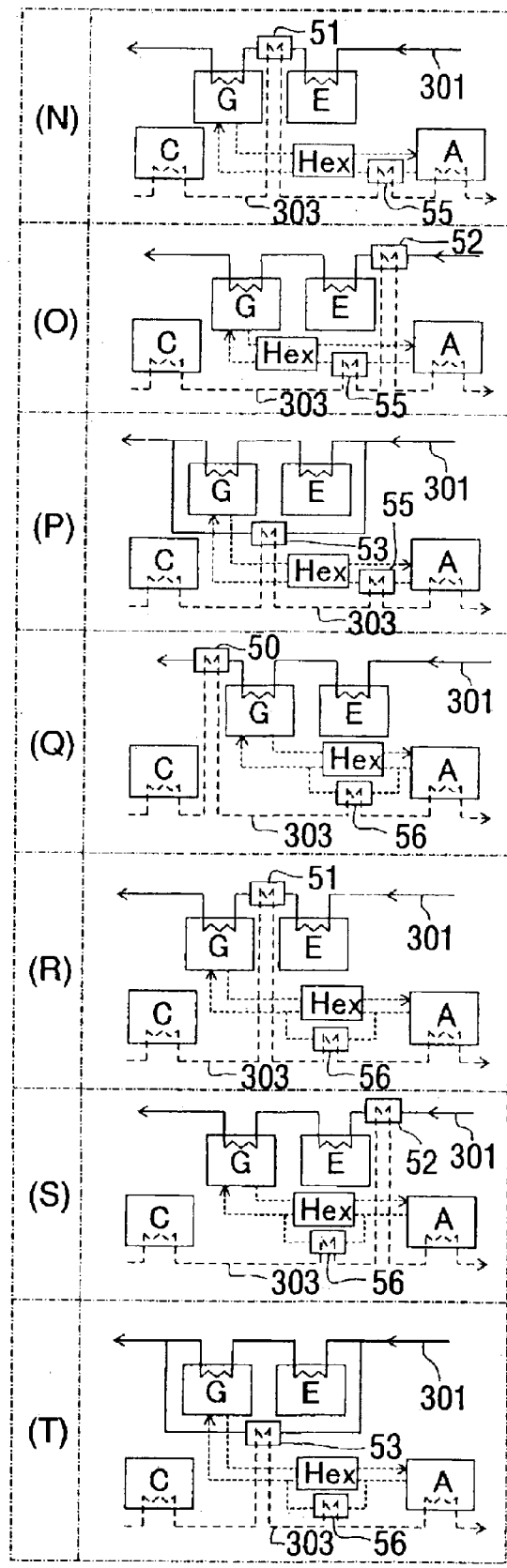
FIG. 7B is a view illustrating examples of the preheating pattern in the absorption heat pump according to the present invention.

FIG. 7 is a view illustrating the patterns of preheating the water 303 as a heat receiving medium in the absorption heat pump according to the present invention, in which the heat source hot water 301 is used as a heat source for the generator G and the evaporator E and the heat source hot water 301 flows from the evaporator E to the generator G connected in series. FIG. 7(A) shows a case in which the water 303 is preheated by the heat of condensation in the condenser C and is supplied to the absorber A. FIG. 7(B) shows a case in which the water 303 is preheated by the heat of condensation in the condenser C and then in a heat exchanger 50 by the heat source hot water 301 which has passed through the evaporator E and the generator G connected with each other in series and is supplied to the absorber A. FIG. 7(C) shows a case in which the water 303 is preheated by the heat of condensation in the condenser C and then in a heat exchanger 51 by the heat source hot water 301 which has passed through the evaporator E and is supplied to the absorber A. FIG. 7(D) shows a case in which the water 303 is preheated by the heat of condensation in the condenser C and then in a heat exchanger 52 by the heat source hot water 301 which will pass through the evaporator E and the generator G connected with each other in series and is supplied to the absorber A. FIG. 7(E) shows a case in which the water 303 is preheated by the heat of condensation in the condenser C and then in a heat exchanger 53 by a portion of the heat source hot water 301 bypassing the evaporator E and the generator G connected with each other in series and is supplied to the absorber A.

FIG. 7(F) to FIG. 7(T) show cases in which the absorption heat pump has a solution heat exchanger Hex in which the concentrated solution being supplied from the generator G to the absorber A exchanges heat with the dilute solution being supplied from the absorber A to the generator G (the solution heat exchanger Hex is disposed in not only the cases F to T but in any absorption heat pump) and the water 303 is preheated by the heat of condensation in the condenser C. FIG. 7(F) shows a case in which the water 303 preheated by the heat of condensation in the condenser C is preheated in a heat exchanger 54 by the dilute solution from the absorber A which has passed through the solution heat exchanger Hex to heat the concentrated solution being supplied from the generator G to the absorber A and is supplied to the absorber A. FIG. 7(G) shows a case in which the water 303 preheated by the heat of condensation in the condenser C is preheated in a heat exchanger 55 by the dilute solution from the absorber A which will pass through the solution heat exchanger Hex and is supplied to the absorber A. FIG. 7(H) shows a case in which the water 303 preheated by the heat of condensation in the condenser C is preheated in a heat exchanger 56 by a portion of the dilute solution from the absorber A bypassing the solution heat exchanger Hex and is supplied to the absorber A.

FIG. 7(I) shows a case in which the water 303 preheated by the heat of condensation in the condenser C is preheated in a heat exchanger 50 by the heat source hot water 301 which has passed through the evaporator E and the generator G connected with each other in series and then in a heat exchanger 54 by the dilute solution from the absorber A which has passed through the solution heat exchanger Hex to heat the concentrated solution being supplied from the generator G to the absorber A and is supplied to the absorber A. FIG. 7(J) shows a case in which the water 303 preheated by the heat of condensation in the condenser C is preheated in a heat exchanger 51 by the heat source hot water 301 which has passed through the evaporator E and then in a heat exchanger 54 by the dilute solution from the absorber A which has passed through the solution heat exchanger Hex to heat the concentrated solution being supplied from the generator G to the absorber A and is supplied to the absorber A. FIG. 7(K) shows a case in which the water 303 preheated by the heat of condensation in the condenser C is preheated in a heat exchanger 54 by the dilute solution from the absorber A which has passed through the solution heat exchanger Hex to heat the concentrated solution being supplied from the generator G to the absorber A and then in a heat exchanger 52 by the heat source hot water 301 which will pass through the evaporator E and the generator G connected with each other in series and is supplied to the absorber A. FIG. 7(L) shows a case in which the water 303 preheated by the heat of condensation in the condenser C is preheated in a heat exchanger 53 by the heat source hot water 301 bypassing the evaporator E and the generator G connected with each other in series and then in a heat exchanger 54 by the dilute solution from the absorber A which has passed through the solution heat exchanger Hex to heat the concentrated solution being supplied from the generator G to the absorber A and is supplied to the absorber A.

FIG. 7(M) shows a case in which the water 303 preheated by the heat of condensation in the condenser C is preheated in a heat exchanger 50 by the heat source hot water 301 which has passed through the evaporator E and the generator G connected with each other in series and then in a heat exchanger 55 by the dilute solution from the absorber A which will pass through the solution heat exchanger Hex and is supplied to the absorber A. FIG. 7(N) shows a case in which the water 303 preheated by the heat of condensation in the condenser C is preheated in a heat exchanger 51 by the heat source hot water 301 which has passed through the evaporator E and then in a heat exchanger 55 by the dilute solution from the absorber A which will pass through the solution heat exchanger Hex and is supplied to the absorber A. FIG. 7(O) shows a case in which the water 303 preheated by the heat of condensation in the condenser C is preheated in a heat exchanger 55 by the dilute solution from the absorber A which will pass through the solution heat exchanger Hex and then in a heat exchanger 52 by the heat source hot water 301 which will pass through the evaporator E and the generator G connected with each other in series and is supplied to the absorber A. FIG. 7(P) shows a case in which the water 303 preheated by the heat of condensation in the condenser C is preheated in a heat exchanger 53 by a portion of the heat source hot water 301 bypassing the evaporator E and the generator G connected with each other in series and then in a heat exchanger 55 by the dilute solution from the absorber A which will pass through the solution heat exchanger Hex and is supplied to the absorber A.

FIG. 7(Q) shows a case in which the water 303 preheated by the heat of condensation in the condenser C is preheated in a heat exchanger 50 by the heat source hot water 301 which has passed through the evaporator E and the generator G connected with each other in series and then in a heat exchanger 56 by a portion of the dilute solution from the absorber A bypassing the solution heat exchanger Hex and is supplied to the absorber A. FIG. 7(R) shows a case in which the water 303 preheated by the heat of condensation in the condenser C is preheated in a heat exchanger 51 by the heat source hot water 301 which has passed through the evaporator E and then in a heat exchanger 56 by the dilute solution from the absorber A bypassing the solution heat exchanger Hex and is supplied to the absorber A. FIG. 7(S) shows a case in which the water 303 preheated by the heat of condensation in the condenser C is preheated in a heat exchanger 56 by the dilute solution from the absorber A bypassing the solution heat exchanger Hex and then in a heat exchanger 52 by the heat source hot water 301 which will pass through the evaporator E and the generator G connected with each other in series and is supplied to the absorber A. FIG. 7(T) shows a case in which the water 303 preheated by the heat of condensation in the condenser C is preheated in a heat exchanger 53 by a portion of the heat source hot water 301 bypassing the evaporator E and the generator G connected with each other in series and then in a heat exchanger 56 by the dilute solution from the absorber A bypassing the solution heat exchanger Hex and is supplied to the absorber A.

Figure 8A:
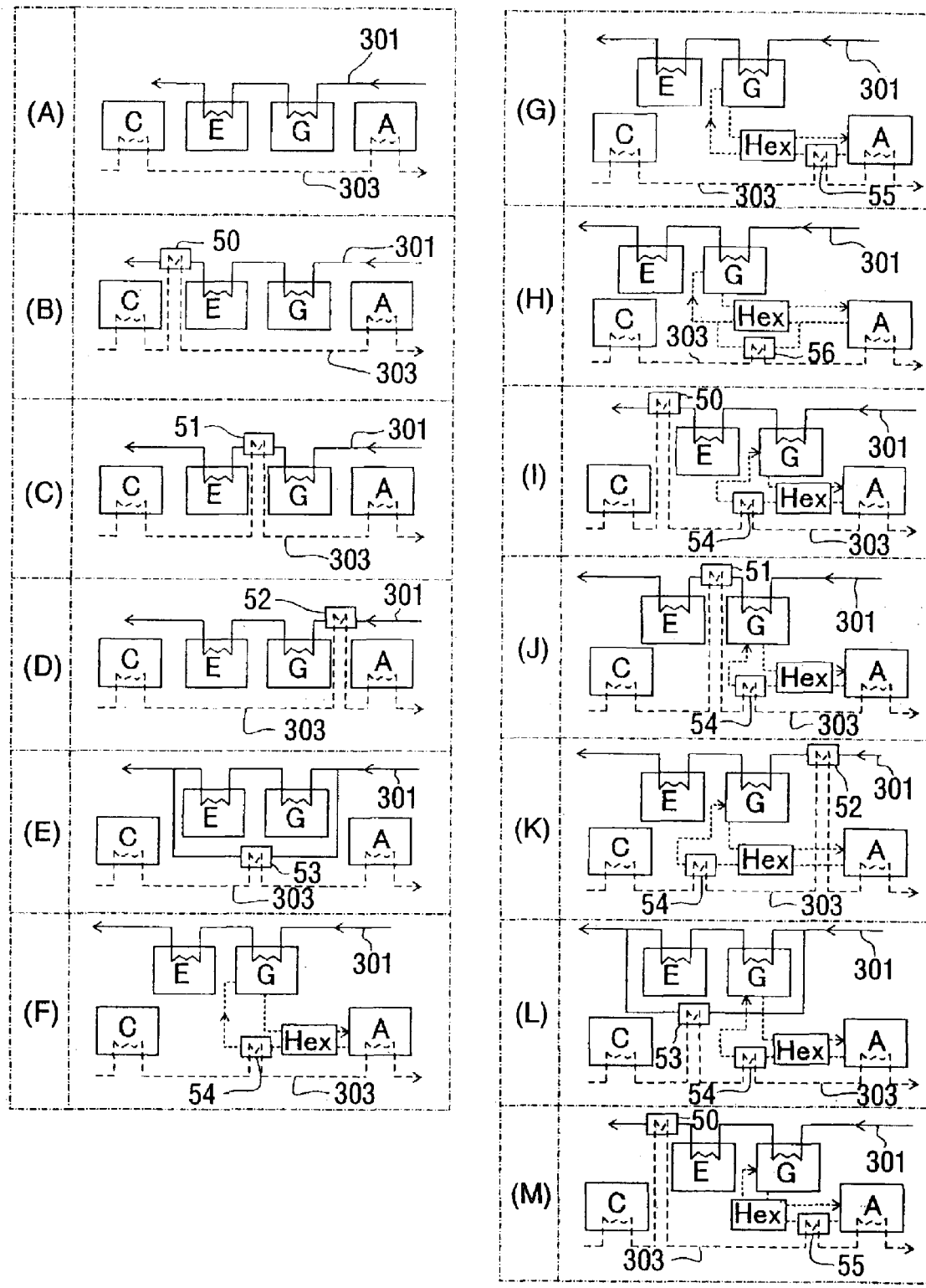
FIG. 8A is a view illustrating examples of the preheating pattern in the absorption heat pump according to the present invention.
Figure 8B:
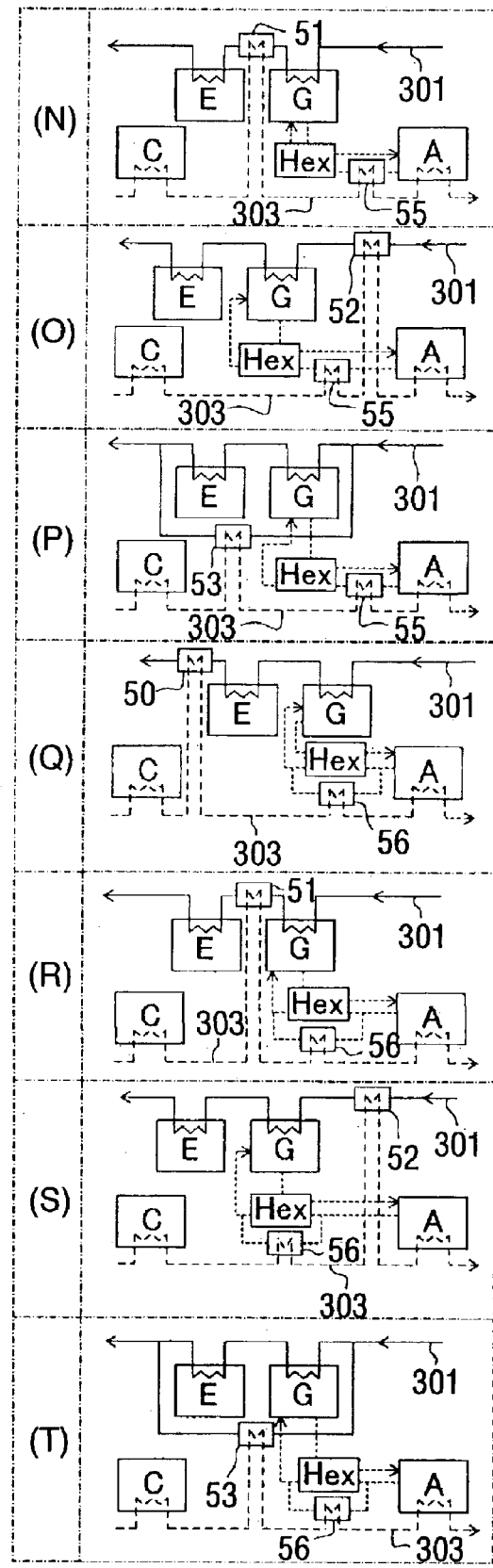
FIG. 8B is a view illustrating examples of the preheating pattern in the absorption heat pump according to the present invention.

FIG. 8 is a view illustrating the patterns of preheating the water 303 in the absorption heat pump according to the present invention, in which the heat source hot water 301 is used as a heat source for the generator G and the evaporator E and the heat source hot water 301 flows from the generator G to the evaporator E connected with each other in series. FIG. 8(A) shows a case in which the water 303 is preheated by the heat of condensation in the condenser C and is supplied to the absorber A. FIG. 8(B) shows a case in which the water 303 is preheated by the heat of condensation in the condenser C and then in a heat exchanger 50 by the heat source hot water 301 which has passed through the generator G and the evaporator E connected with each other in series and is supplied to the absorber A. FIG. 8(C) shows a case in which the water 303 is preheated by the heat of condensation in the condenser C and then in a heat exchanger 51 by the heat source hot water 301 which has passed through the generator G and is supplied to the absorber A. FIG. 8(D) shows a case in which the water 303 is preheated by the heat of condensation in the condenser C and then in a heat exchanger 52 by the heat source hot water 301 which will pass through the generator G and the evaporator E connected with each other in series and is supplied to the absorber A. FIG. 8(E) shows a case in which the water 303 is preheated by the heat of condensation in the condenser C and then in a heat exchanger 53 by a portion of the heat source hot water 301 bypassing the generator G and the evaporator E connected with each other in series and is supplied to the absorber A.

FIG. 8(F) to FIG. 8(T) show cases in which the absorption heat pump has a solution heat exchanger Hex in which the concentrated solution being supplied from the generator G to the absorber A exchanges heat with the dilute solution being supplied from the absorber A to the generator G (the solution heat exchanger Hex is disposed in not only the cases F to T but in any absorption heat pumps) and the water 303 is preheated by the heat of condensation in the condenser C. FIG. 8(F) shows a case in which the water 303 preheated by the heat of condensation in the condenser C is preheated in a heat exchanger 54 by the dilute solution from the absorber A which has passed through the solution heat exchanger Hex to heat the concentrated solution being supplied from the generator G to the absorber A and is supplied to the absorber A. FIG. 8(G) shows a case in which the water 303 preheated by the heat of condensation in the condenser C is preheated in a heat exchanger 55 by the dilute solution from the absorber A which will pass through the solution heat exchanger Hex and is supplied to the absorber A. FIG. 8(H) shows a case in which the water 303 preheated by the heat of condensation in the condenser C is preheated in a heat exchanger 56 by a portion of the dilute solution from the absorber A bypassing the solution heat exchanger Hex and is supplied to the absorber A.

FIG. 8(I) shows a case in which the water 303 preheated by the heat of condensation in the condenser C is preheated in a heat exchanger 50 by the heat source hot water 301 which has passed through the generator G and the evaporator E connected with each other in series and then in a heat exchanger 54 by the dilute solution from the absorber A which has passed through the solution heat exchanger Hex to heat the concentrated solution being supplied from the generator G to the absorber A and is supplied to the absorber A. FIG. 8(J) shows a case in which the water 303 preheated by the heat of condensation in the condenser C is preheated in a heat exchanger 51 by the heat source hot water 301 which has passed through the generator G and then in a heat exchanger 54 by the dilute solution from the absorber A which has passed through the solution heat exchanger Hex to heat the concentrated solution being supplied from the generator G to the absorber A and is supplied to the absorber A. FIG. 8(K) shows a case in which the water 303 preheated by the heat of condensation in the condenser C is preheated in a heat exchanger 54 by the dilute solution from the absorber A which has passed through the solution heat exchanger Hex to heat the concentrated solution being supplied from the generator G to the absorber A and then in a heat exchanger 52 by the heat source hot water 301 which will pass through the generator G and the evaporator E connected with each other in series and is supplied to the absorber A. FIG. 8(L) shows a case in which the water 303 preheated by the heat of condensation in the condenser C is preheated in a heat exchanger 53 by a portion of the heat source hot water 301 bypassing the generator G and the evaporator E connected with each other in series and then in a heat exchanger 54 by the dilute solution from the absorber A which has passed through the solution heat exchanger Hex to heat the concentrated solution being supplied from the generator G to the absorber A and is supplied to the absorber A.

FIG. 8(M) shows a case in which the water 303 preheated by the heat of condensation in the condenser C is preheated in a heat exchanger 50 by the heat source hot water 301 which has passed through the generator G and the evaporator E connected with each other in series and then in a heat exchanger 55 by the dilute solution from the absorber A which will pass through the solution heat exchanger Hex and is supplied to the absorber A. FIG. 8(N) shows a case in which the water 303 preheated by the heat of condensation in the condenser C is preheated in a heat exchanger 51 by the heat source hot water 301 which has passed through the generator G and then in a heat exchanger 55 by the dilute solution from the absorber A which will pass through the solution heat exchanger Hex and is supplied to the absorber A. FIG. 8(O) shows a case in which the water 303 preheated by the heat of condensation in the condenser C is preheated in a heat exchanger 55 by the dilute solution from the absorber A which will pass through the solution heat exchanger Hex and then in a heat exchanger 52 by the heat source hot water 301 which will pass through the generator G and the evaporator E connected with each other in series and is supplied to the absorber A. FIG. 8(P) shows a case in which the water 303 preheated by the heat of condensation in the condenser C is preheated in a heat exchanger 53 by the heat source hot water 301 bypassing the generator G and the evaporator E connected with each other in series and then in a heat exchanger 55 by the dilute solution from the absorber A which will pass through the solution heat exchanger Hex and is supplied to the absorber A.

FIG. 8(Q) shows a case in which the water 303 preheated by the heat of condensation in the condenser C is preheated in a heat exchanger 50 by the heat source hot water 301 which has passed through the generator G and the evaporator E connected with each other in series and then in a heat exchanger 56 by a portion of the dilute solution from the absorber A bypassing the solution heat exchanger Hex and is supplied to the absorber A. FIG. 8(R) shows a case in which the water 303 preheated by the heat of condensation in the condenser C is preheated in a heat exchanger 51 by the heat source hot water 301 which has passed through the generator G and then in a heat exchanger 56 by the dilute solution from the absorber A bypassing the solution heat exchanger Hex and is supplied to the absorber A. FIG. 8(S) shows a case in which the water 303 preheated by the heat of condensation in the condenser C is preheated in a heat exchanger 56 by the dilute solution from the absorber A bypassing the solution heat exchanger Hex and then in a heat exchanger 52 by the heat source hot water 301 which will pass through the generator G and the evaporator E connected with each other in series and is supplied to the absorber A. FIG. 8(T) shows a case in which the water 303 preheated by the heat of condensation in the condenser C is preheated in a heat exchanger 53 by a portion of the heat source hot water 301 bypassing the generator G and the evaporator E connected with each other in series and then in a heat exchanger 56 by the dilute solution from the absorber A bypassing the solution heat exchanger Hex and is supplied to the absorber A.

Figure 9A:
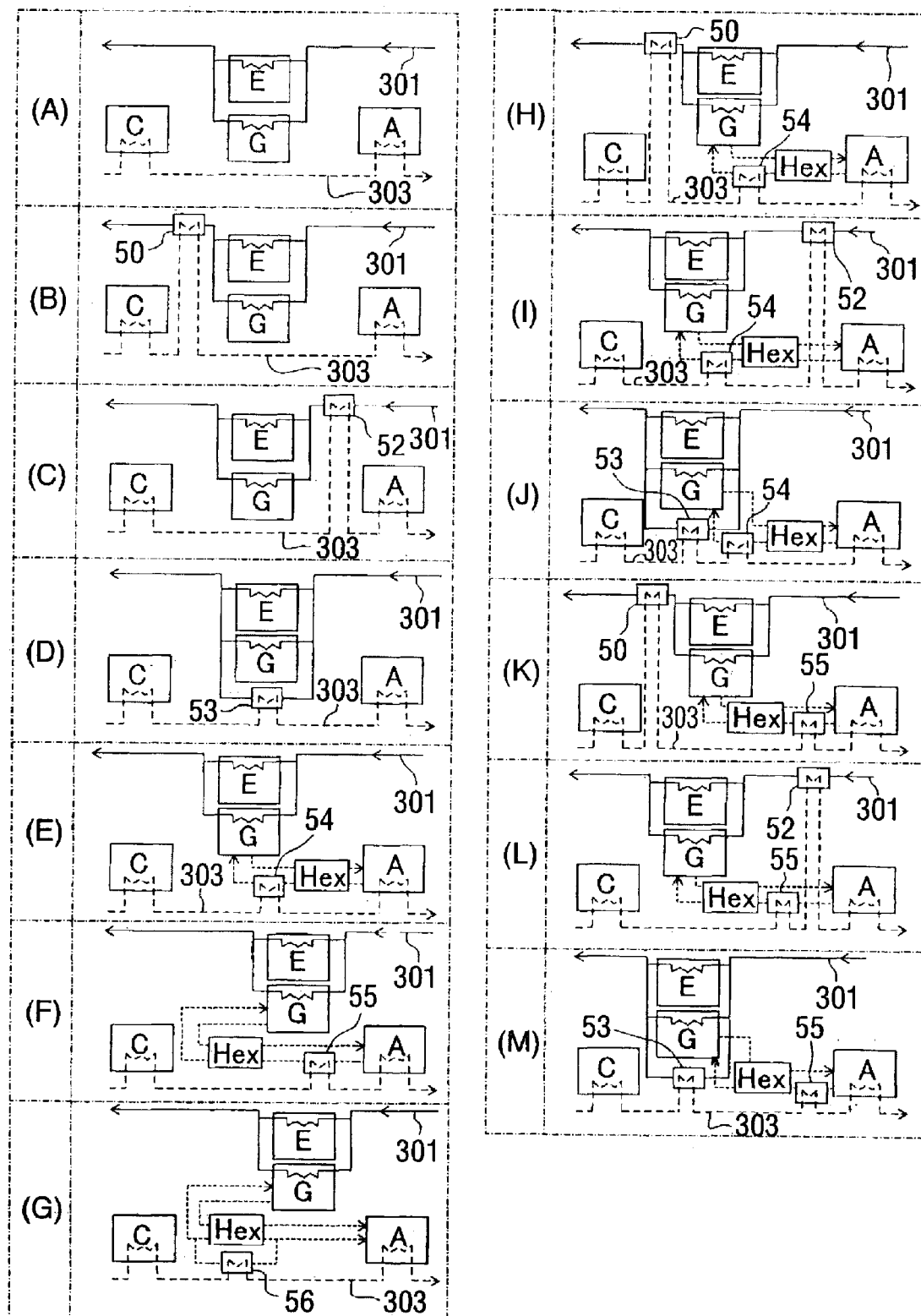
FIG. 9A is a view illustrating examples of the preheating pattern in the absorption heat pump according to the present invention.
Figure 9B:
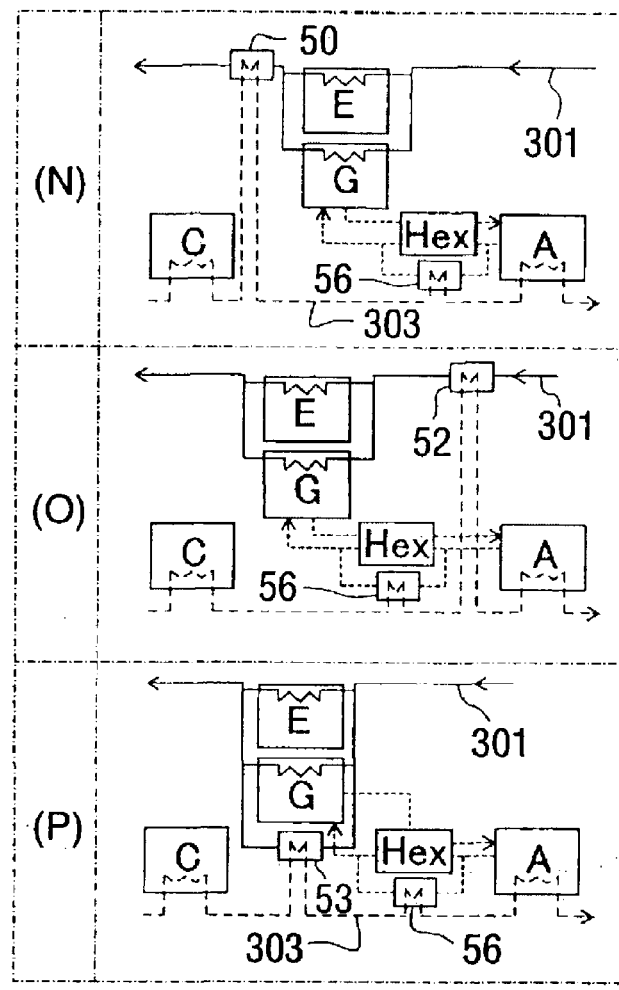
FIG. 9B is a view illustrating examples of the preheating pattern in the absorption heat pump according to the present invention.

FIG. 9 is a view illustrating the patterns of preheating the water 303 in the absorption heat pump according to the present invention, in which the heat source hot water 301 is used as a heat source for the generator G and the evaporator E and the heat source hot water 301 flows through the generator G and the evaporator E connected with each other in parallel. FIG. 9(A) shows a case in which the water 303 is preheated by the heat of condensation in the condenser C and is supplied to the absorber A. FIG. 9(B) shows a case in which the water 303 is preheated by the heat of condensation in the condenser C and then in a heat exchanger 50 by the heat source hot water 301 which has passed through the evaporator E and the generator G connected with each other in parallel and rejoined together and is supplied to the absorber A. FIG. 9(C) shows a case in which the water 303 is preheated by the heat of condensation in the condenser C and then in a heat exchanger 52 by the heat source hot water 301 which will pass through the generator G and the evaporator E connected with each other in parallel and is supplied to the absorber A. FIG. 9(D) shows a case in which the water 303 is preheated by the heat of condensation in the condenser C and then in a heat exchanger 53 by the heat source hot water 301 bypassing the evaporator E and the generator G connected with each other in parallel and is supplied to the absorber A.

FIG. 9(E) to FIG. 9(P) show cases in which the absorption heat pump has a solution heat exchanger Hex in which the concentrated solution being supplied from the generator G to the absorber A exchanges heat with the dilute solution being supplied from the absorber A to the generator G (the solution heat exchanger Hex is disposed in not only the cases E to P but in any absorption heat pumps) and the water 303 is preheated by the heat of condensation in the condenser C. FIG. 9(E) shows a case in which the water 303 preheated by the heat of condensation in the condenser C is preheated in a heat exchanger 54 by the dilute solution from the absorber A which has passed through the solution heat exchanger Hex to heat the concentrated solution being supplied from the generator G to the absorber A and is supplied to the absorber A. FIG. 9(F) shows a case in which the water 303 preheated by the heat of condensation in the condenser C is preheated in a heat exchanger 55 by the dilute solution from the absorber A which will pass through the solution heat exchanger Hex and is supplied to the absorber A. FIG. 9(G) shows a case in which the water 303 preheated by the heat of condensation in the condenser C is preheated in a heat exchanger 56 by a portion of the dilute solution from the absorber A bypassing the solution heat exchanger Hex and is supplied to the absorber A.

FIG. 9(H) shows a case in which the water 303 preheated by the heat of condensation in the condenser C is preheated in a heat exchanger 50 by the heat source hot water 301 which has passed through the generator G and the evaporator E connected with each other in parallel and rejoined together and then in a heat exchanger 54 by the dilute solution from the absorber A which has passed through the solution heat exchanger Hex to heat the concentrated solution being supplied from the generator G to the absorber A and is supplied to the absorber A. FIG. 9(I) shows a case in which the water 303 preheated by the heat of condensation in the condenser C is preheated in a heat exchanger 54 by the dilute solution from the absorber A which has passed through the solution heat exchanger Hex to heat the concentrated solution being supplied from the generator G to the absorber A and then in a heat exchanger 52 by the heat source hot water 301 which will pass through the generator G and the evaporator E connected with each other in parallel and is supplied to the absorber A. FIG. 9(J) shows a case in which the water 303 preheated by the heat of condensation in the condenser C is preheated in a heat exchanger 53 by the heat source hot water 301 bypassing the evaporator E and the generator G connected with each other in parallel and then in a heat exchanger 54 by the dilute solution from the absorber A which has passed through the solution heat exchanger Hex to heat the concentrated solution being supplied from the generator G to the absorber A and is supplied to the absorber A.

FIG. 9(K) shows a case in which the water 303 preheated by the heat of condensation in the condenser C is preheated in a heat exchanger 50 by the heat source hot water 301 which has passed through the generator G and the evaporator E connected with each other in parallel and rejoined together and then in a heat exchanger 55 by the dilute solution from the absorber A which will pass through the solution heat exchanger Hex and is supplied to the absorber A. FIG. 9(L) shows a case in which the water 303 preheated by the heat of condensation in the condenser C is preheated in a heat exchanger 55 by the dilute solution from the absorber A which will pass through the solution heat exchanger Hex and then in a heat exchanger 52 by the heat source hot water 301 which will pass through the generator G and the evaporator E connected with each other in parallel and is supplied to the absorber A. FIG. 9(M) shows a case in which the water 303 preheated by the heat of condensation in the condenser C is preheated in a heat exchanger 53 by a portion of the heat source hot water 301 bypassing the generator G and the evaporator E connected with each other in parallel and then in a heat exchanger 55 by the dilute solution from the absorber A which will pass through the solution heat exchanger Hex and is supplied to the absorber A.

FIG. 9(N) shows a case in which the water 303 preheated by the heat of condensation in the condenser C is preheated in a heat exchanger 50 by the heat source hot water 301 which has passed through the generator G and the evaporator E connected with each other in parallel and rejoined together and then in a heat exchanger 56 by the dilute solution from the absorber A bypassing the solution heat exchanger Hex and is supplied to the absorber A. FIG. 9(O) shows a case in which the water 303 preheated by the heat of condensation in the condenser C is preheated in a heat exchanger 56 by a portion of the dilute solution from the absorber A bypassing the solution heat exchanger Hex and then in a heat exchanger 52 by the heat source hot water 301 which will pass through the evaporator E and the generator G connected with each other in parallel and is supplied to the absorber A. FIG. 9(P) shows a case in which the water 303 preheated by the heat of condensation in the condenser C is preheated in a heat exchanger 53 by the heat source hot water 301 bypassing the generator G and the evaporator E connected with each other in parallel and then in a heat exchanger 56 by the dilute solution from the absorber A bypassing the solution heat exchanger Hex and is supplied to the absorber A.

Figure 10:
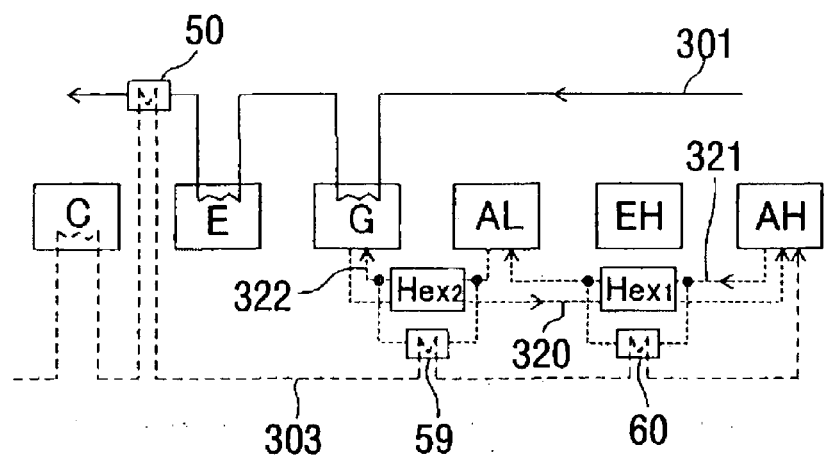
FIG. 10 is a view illustrating examples of the preheating pattern in the two-stage absorption heat pump according to the present invention.

FIG. 10 is a view illustrating a pattern of preheating in a two-stage absorption heat pump according to the present invention. The absorption heat pump has a condenser C, an evaporator E, a generator G, a low-temperature absorber AL, a high-temperature evaporator EH and a high-temperature absorber AH, and uses heat source hot water 301 as a heat source for the generator G and the evaporator E. The absorption heat pump also has solution heat exchangers Hex1 and Hex2 in which concentrated solution 320 being supplied from the generator G to the high-temperature absorber AH exchanges heat with dilute solution 321 being supplied from the high-temperature absorber AH to the low-temperature absorber AL and with dilute solution 322 being supplied from the low-temperature absorber AL to the generator G, respectively. Water 303 is preheated by the heat of condensation in the condenser C, preheated in a heat exchanger 50 by the heat source hot water 301 which has passed through the generator G and the evaporator E connected with each other in series, preheated in a heat exchanger 59 by the dilute solution 322 being supplied from the low-temperature absorber AL to the generator G which bypasses the solution heat exchangers Hex2, and preheated in a heat exchanger 60 by the dilute solution 321 being supplied from the high-temperature absorber AH to the low-temperature absorber AL which bypasses the solution heat exchangers Hex1, and is supplied to the high-temperature absorber AH.

Figure 11:
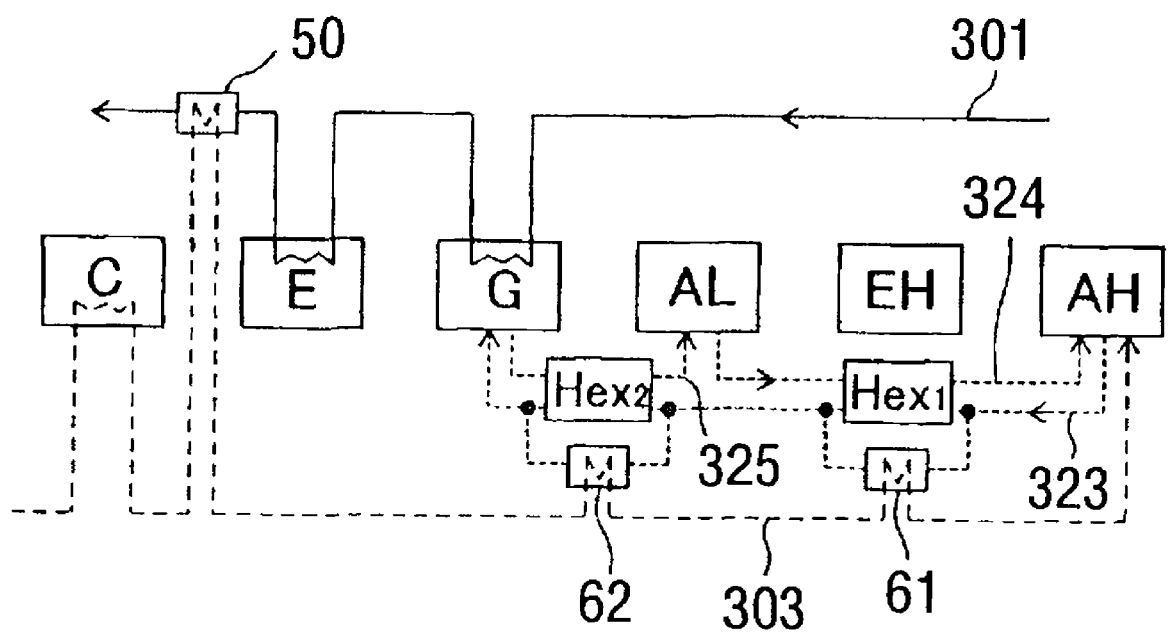
FIG. 11 is a view illustrating examples of the preheating pattern in the two-stage absorption heat pump according to the present invention.

FIG. 11 is a view illustrating a pattern of preheating in a two-stage absorption heat pump according to the present invention. The absorption heat pump has a condenser C, an evaporator E, a generator G, a low-temperature absorber AL, a high-temperature evaporator EH and a high-temperature absorber AH, and uses heat source hot water 301 as a heat source for the generator G and the evaporator E. The absorption heat pump also has solution heat exchangers Hex1 and Hex2 in which dilute solution 323 being supplied from the high-temperature absorber AH to the generator G exchanges heat with concentrated solution 324 being supplied from the low-temperature absorber AL to the high-temperature absorber AH and with concentrated solution 325 being supplied from the generator G to the low-temperature absorber AL, respectively. Water 303 is preheated by the heat of condensation in the condenser C, preheated in a heat exchanger 50 by the heat source hot water 301 which has passed through the generator G and the evaporator E connected with each other in series, preheated in a heat exchanger 62 by the dilute solution 323 which has passed through the solution heat exchangers Hex1 and the heat exchanger 61 connected with each other in parallel and rejoined together which bypasses the solution heat exchanger Hex2, and preheated in a heat exchanger 61 by the dilute solution 323 from the high-temperature absorber AH bypassing the solution heat exchanger Hex1, and is supplied to the high-temperature absorber.

As shown in FIG. 7(A), FIG. 8(A) and FIG. 9(A), the absorption heat pump uses heat released from the condenser C, that is, the heat of condensation of a refrigerant, to preheat the water 303 as a heat receiving medium. Since the heat of condensation of the refrigerant is heat which is usually discharged into a cooling tower or the like as waste heat, it is preferred to recover the heat and use it as a preheating source for the water 303. The heat can be used when the temperature of the water 303 is lower than that of the condenser C. For example, when the temperature of cooling water in a cooling tower is 35° C. and the temperature of the water 303 is 25° C., the temperature of the water 303 can be increased by about 10° C. The heat may be obtained directly from the condenser C or obtained from the cooling water.

As the heat source for the absorption heat pump according to the present invention, various types of heat sources such as waste hot water, exhaust gas and waste steam can be used. Here, heat source hot water 301 as waste hot water is used. In general, waste hot water is lower in temperature than that of the heat of absorption which can be generated in the absorber A but has a large amount of heat. Thus, when waste hot water is used as a preheating source, the water 303 can be preheated to a temperature higher than that of the condenser C. As the locations of preheating and the combination of heat sources, various patterns as shown in FIG. 7(B) to FIG. 7(T), FIG. 8(B) to FIG. 8(T), and FIG. 9(B) to FIG. 9(P) can be conceivable.

Also in a multi-stage absorption heat pump, the effect of increasing the amount of heat which can be generated in the low-temperature absorber AL and the high-temperature absorber AH can be achieved by preheating the water 303 as a heat receiving medium. In the case of a two-stage absorption heat pump or a multi-stage absorption heat pump, a preheating cycle using a solution can be conceivable. FIG. 10 and FIG. 11 show examples in a two-stage absorption heat pump.

Figure 12:
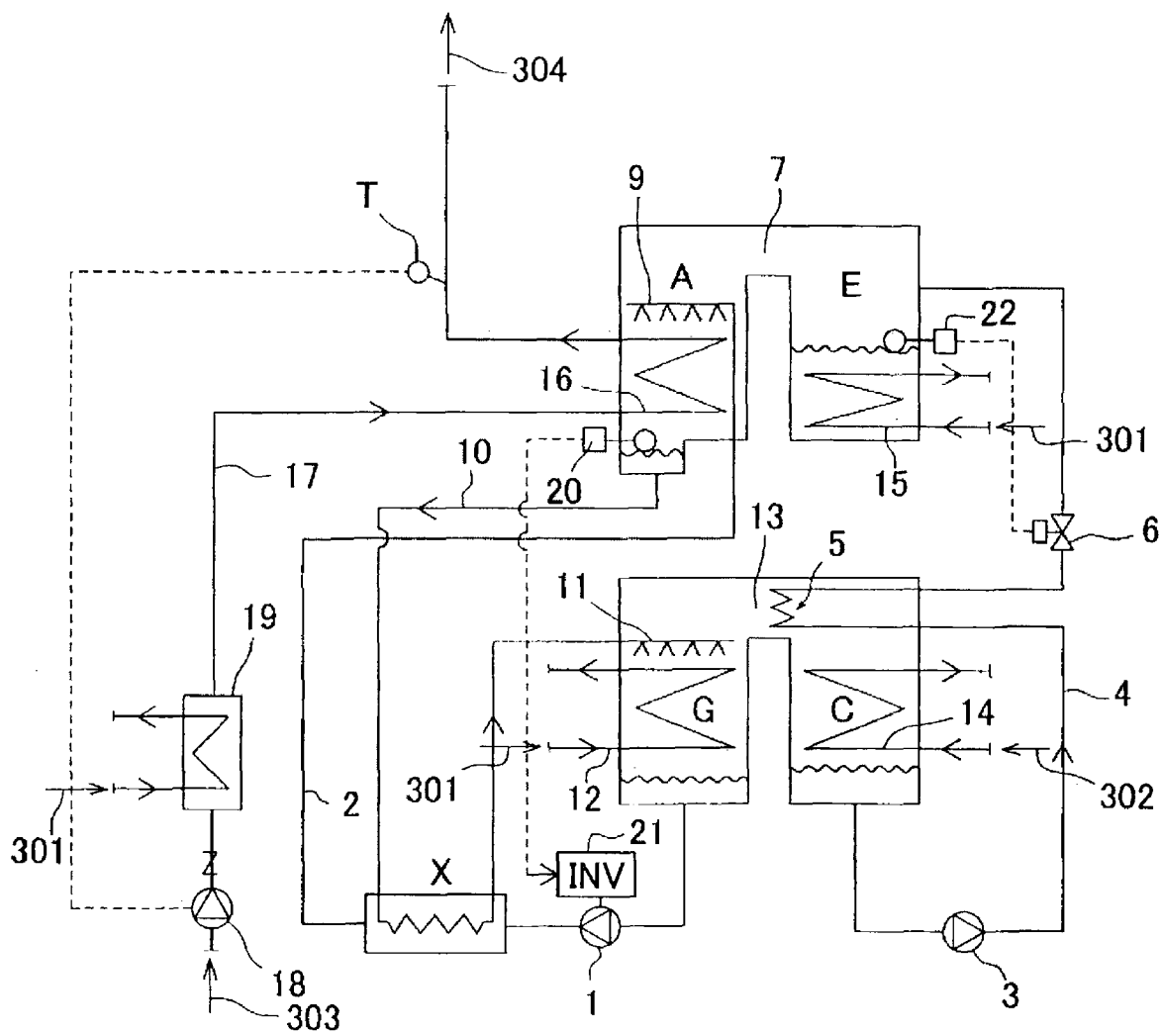
FIG. 12 is a view illustrating an example of the constitution of a single-stage absorption heat pump according to the present invention.

FIG. 12 is a view illustrating an example of the constitution of a single-stage absorption heat pump according to the present invention. As shown in the drawing, the absorption heat pump has an absorber A, an evaporator E, a generator G, a condenser C and a solution heat exchanger X as primary components.

Concentrated solution (working medium concentrated solution) in the generator G is introduced into the absorber A through a concentrated solution pipe 2 and the heated side of the solution heat exchanger X by a solution pump 1. Refrigerant liquid (working medium refrigerant liquid) in the condenser C is introduced into the evaporator E through a refrigerant pipe 4, a refrigerant heat exchanger 5 and a control valve 6 by a refrigerant pump 3. A hot water pipe 15 is disposed in the evaporator E, and the refrigerant liquid is heated by hot water 301 supplied to the hot water pipe 15, and generated refrigerant vapor (working medium refrigerant vapor) is introduced into the absorber A through a passage 7.

The absorber A is provided therein with a spray 9, and the concentrated solution supplied through the concentrated solution pipe 2 is sprayed into the absorber A from the spray 9. The refrigerant vapor from the evaporator E is absorbed into the sprayed concentrated solution, whereupon the concentrated solution turns into dilute solution with a lower concentration. The dilute solution flows through a dilute solution pipe 10 and the heating side of the solution heat exchanger X to heat the concentrated solution flowing through the concentrated solution pipe 2 and flows into the generator G. The generator G is provided therein with a spray 11, and the dilute solution is sprayed from the spray 11 onto a hot water pipe 12 in the generator G. The sprayed dilute solution is heated by the hot water 301 supplied to the hot water pipe 12, whereupon refrigerant vapor (working medium refrigerant vapor) is generated and the dilute solution is concentrated into concentrated solution. The generated refrigerant vapor flows to the condenser C through a passage 13, and is cooled by cooling water 302 flowing through a cooling water pipe 14 in the condenser C and condensed into refrigerant liquid.

In the absorber A, the concentrated solution is heated by the heat of absorption generated when the refrigerant vapor from the evaporator E is absorbed into the concentrated solution, rises in temperature to the degree corresponding to the boiling point elevation and heats a high-temperature water pipe 16 as a heat receiving medium passage in the absorber A. A water supply pipe 17 is connected to the high-temperature water pipe 16, and water 303 as a heat receiving medium is supplied to the high-temperature water pipe 16 through the water supply pipe 17 by a water supply pump 18. Thus, the water 303 is heated and evaporated, and discharged as steam 304. Designated as 19 is a supply water preheater for heating the water 303 flowing through the water supply pipe 17 with hot water 301. The temperature of the steam 304 is detected by a temperature sensor T. A detection signal from the temperature sensor T is inputted into an inverter (not shown) for driving the water supply pump 18 and the pump rotational speed is controlled to control the temperature of the steam 304 to a predetermined value. When steam is not generated in the high-temperature water pipe 16 and high-temperature water is obtained by heating the water 303, the water supplied by the supply water pump 18 may be directly supplied to the high-temperature water pipe 16 and heated by the heat of absorption without using the supply water preheater 19.

The absorber A is provided with a liquid level sensor 20 for detecting the level of the dilute solution therein. A detection signal from the liquid level sensor 20 is inputted into an inverter 21 to control the rotational speed of the solution pump 1 so that the liquid level at the outlet of the absorber A can be maintained at a predetermined level. The evaporator E is provided with a liquid level sensor 22 for detecting the level of the refrigerant liquid therein. A detection signal from the liquid level sensor 22 is inputted into a control valve 6 to control the opening of the control valve 6 so that the liquid level in the evaporator E can be maintained at a predetermined level.

The refrigerant heat exchanger 5 is provide in a passage 13 through which the refrigerant vapor generated in the generator G flows to the condenser C, and the refrigerant liquid to be delivered from the condenser C to the evaporator E by the refrigerant pump 3 is heated by the refrigerant vapor from the generator G in the refrigerant heat exchanger 5. From the dilute solution heated in the generator G, refrigerant vapor with the same temperature as the dilute solution is generated. Since the refrigerant vapor has a temperature higher than that of the condenser C and has become superheated refrigerant vapor with a temperature close to that of the hot water 301 to be supplied to the hot water pipe 12 in the generator G, it can heat the refrigerant liquid from the condenser C. Since the refrigerant liquid to be supplied from the condenser C to the evaporator E is heated by the refrigerant vapor introduced from the generator G to the condenser C as described above, the refrigerant liquid can be heated without consuming the heat of the hot water 301 to preheat the refrigerant liquid and the amount of heat to be transferred to the cooling water 302 in the condenser C can be reduced.

Figure 13:
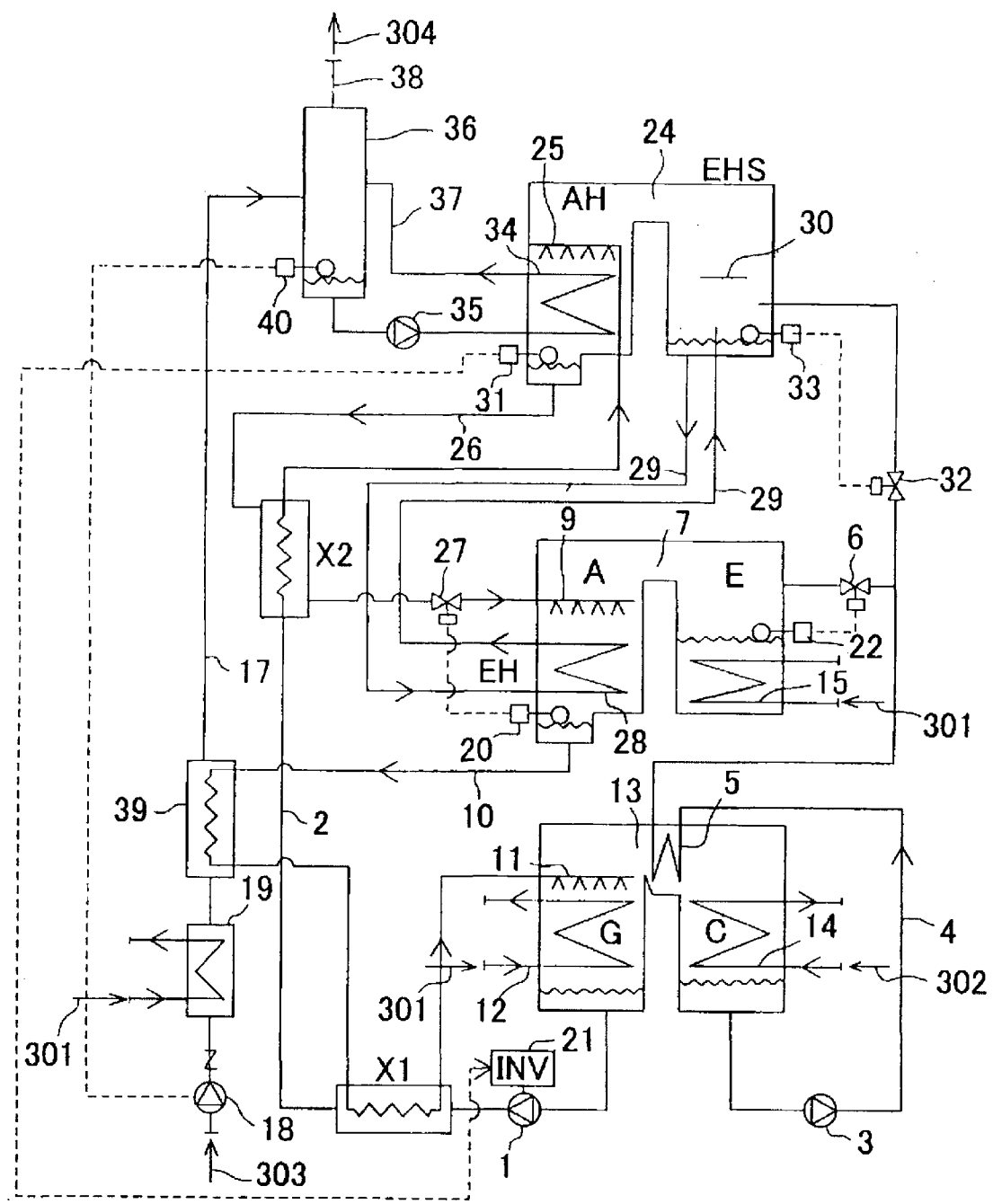
FIG. 13 is a view illustrating an example of the constitution of a two-stage absorption heat pump according to the present invention.

FIG. 13 is a view illustrating an example of the constitution of a two-stage absorption heat pump according to the present invention. As shown in the drawing, the absorption heat pump has a high-temperature absorber AH, a low-temperature absorber A, a high-temperature evaporator EH, a low-temperature evaporator E, a generator G, a condenser C, a high-temperature solution heat exchanger X2 and a low-temperature solution heat exchanger X1 as primary components. In FIG. 13, parts that are the same or equivalent to the components of FIG. 12 are identified with the same numerals. In FIG. 13 to FIG. 27, parts that are the same or equivalent to the components in the drawings are also identified with the same numerals.

Concentrated solution (working medium concentrated solution) in the generator G is introduced into the high-temperature absorber AH through a concentrated solution pipe 2, the heated side of the low-temperature solution heat exchanger X1, and the heated side of the high-temperature solution heat exchanger X2 by a solution pump 1. Refrigerant liquid (working medium refrigerant liquid) in the condenser C is introduced into a high-temperature vapor-liquid separator EHS through a refrigerant pipe 4, a refrigerant heat exchanger 5, and a control valve 32 by a refrigerant pump 3. Refrigerant vapor generated in the low-temperature evaporator E is introduced into the low-temperature absorber A through a passage 7, and refrigerant vapor separated in the high-temperature vapor-liquid separator EHS is introduced into the high-temperature absorber AH through a passage 24.

The high-temperature absorber AH is provided therein with a spray 25, and the concentrated solution supplied through the concentrated solution pipe 2 is sprayed into the high-temperature absorber AH from the spray 25. The refrigerant vapor from the high-temperature evaporator EH is absorbed into the sprayed concentrated solution, whereupon the concentrated solution turns into medium-concentration solution with a medium concentration. The medium-concentration solution flows through a medium-concentration solution pipe 26 and the heating side of the high-temperature solution heat exchanger X2 to heat the concentrated solution flowing through the concentrated solution pipe 2 and flows into the low-temperature absorber A through a control valve 27. The medium-concentration solution is sprayed from a spray 9 into the low-temperature absorber A. The refrigerant vapor from the low-temperature evaporator E is absorbed into the medium-concentration solution, whereupon the medium-concentration solution turns into dilute solution.

The dilute solution in the low-temperature absorber A is introduced into the generator G through a dilute solution pipe 10 and the heating side of the low-temperature solution heat exchanger X1, and sprayed from a spray 11 onto a hot water pipe 12 in the generator G. The sprayed dilute solution is heated by hot water 301 supplied to the hot water pipe 12, whereupon refrigerant vapor (working medium refrigerant vapor) is generated and the dilute solution is concentrated into concentrated solution. The generated refrigerant vapor flows to the condenser C through a passage 13 and is cooled by cooling water 302 flowing through a cooling water pipe 14 in the condenser C and condensed into refrigerant liquid.

A hot water pipe 15 is disposed in the low-temperature evaporator E, and the refrigerant liquid in the low-temperature evaporator E is heated by hot water 301 supplied to the hot water pipe 15. The generated refrigerant vapor is introduced into the low-temperature absorber A through a passage 7. A heat exchange pipe 28 is disposed in the low-temperature absorber A, and refrigerant liquid transporting pipes 29, 29 are connected to the heat exchange pipe 28. The refrigerant liquid in the high-temperature vapor-liquid separator EHS is directed into the heat exchange pipe 28 in the low-temperature absorber A through the refrigerant transporting pipes 29, and heated by the heat of absorption generated in the low-temperature absorber A and evaporated into refrigerant vapor. The refrigerant vapor is fed to the high-temperature vapor-liquid separator EHS through the refrigerant transporting pipe 29. The high-temperature vapor-liquid separator EHS has a baffle plate 30 for vapor-liquid separation. The high-temperature vapor-liquid separator EHS and the heat exchange pipe 28 in the low-temperature absorber A constitute a high-temperature evaporator EH.

The high-temperature absorber AH is provided with a liquid level sensor 31 for detecting the level of the medium-concentration solution therein. A detection signal from the liquid level sensor 31 is inputted into an inverter 21 to control the rotational speed of the solution pump 1 so that the liquid level at the outlet of the high-temperature absorber AH can be maintained at a predetermined level. The low-temperature absorber A is provided with a liquid level sensor 20 for detecting the liquid level at the outlet thereof. A detection signal from the liquid level sensor 20 is inputted into a control valve 27 to control the opening of the control valve 27 so that the liquid level at the outlet of the low-temperature absorber A can be maintained at a predetermined level.

The low-temperature evaporator E is provided with a liquid level sensor 22 for detecting the liquid level therein. A detection signal from the liquid level sensor 22 is inputted into a control valve 6 and controls the opening of the control valve 6 to maintain the liquid level in the low-temperature evaporator E at a predetermined level. The high-temperature vapor-liquid separator EHS is provided with a liquid level sensor 33 for detecting the liquid level therein. A detection signal from the liquid level sensor 33 is inputted into a control valve 32 and controls the opening of the control valve 32 to maintain the liquid level in the high-temperature vapor-liquid separator EHS at a predetermined level.

The high-temperature absorber AH has a pipe 34 as a heat receiving medium passage for supplying water as a heat receiving medium, and water is supplied to the pipe 34 from a vapor-liquid separator 36 by a pump 35 and heated therein. The generated steam is directed to the vapor-liquid separator 36 through a pipe 37, and steam 304 is discharged through a steam discharge pipe 38. Water 303 is supplied to the vapor-liquid separator 36 through a water supply pipe 17 by a water supply pump 18. The water 303 flowing through the water supply pipe 17 is heated in a supply water preheater 19 and a solution heat exchanger 39 and supplied to the vapor-liquid separator 36. The dilute solution from the low-temperature absorber A flowing through a dilute solution pipe 10 flows through the heating side of the solution heat exchanger 39. The vapor-liquid separator 36 is provided with a liquid level sensor 40. A detection signal from the liquid level sensor 40 is inputted into an inverter (not shown) for driving the water supply pump 18 to control the pump rotational speed so that the liquid level in the liquid level sensor 36 can be maintained at a predetermined level.

In the two-stage absorption heat pump constituted as described above, since the refrigerant liquid from the condenser C is preheated by the refrigerant vapor from the generator G in the refrigerant heat exchanger 5 and supplied to the low-temperature evaporator E, the efficiency can be improved as in the case with the absorption heat pump shown in FIG. 12. Although not illustrated, the refrigerant heat exchanger 5, which is disposed in the passage 13, through which refrigerant vapor flows from the generator G to the condenser C, in the above example, may be disposed at the inlet of the condenser C. Although a single-stage absorption heat pump is shown in FIG. 12 and a two-stage absorption heat pump is shown in FIG. 13, the present invention is not limited thereto. The present invention is applicable to a multi-stage absorption heat pump having a multiplicity of sets of absorbers and evaporators.

Figure 14:
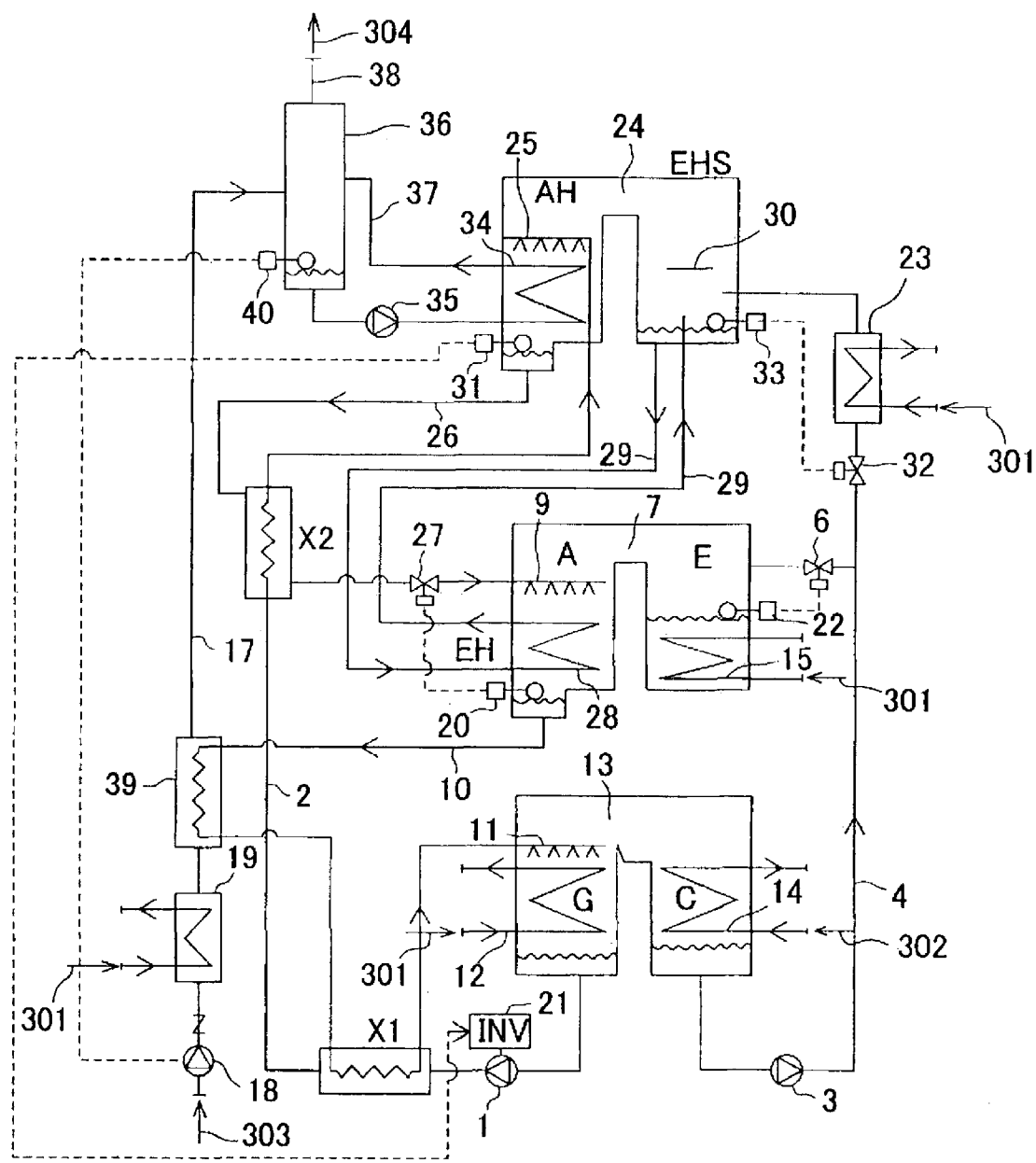
FIG. 14 is a view illustrating an example of the constitution of a two-stage absorption heat pump according to the present invention.

FIG. 14 is a view illustrating an example of the constitution of a two-stage absorption heat pump according to the present invention. As shown in the drawing, the absorption heat pump is the same as the absorption heat pump shown in FIG. 13 in having a high-temperature absorber AH, a low-temperature absorber A, a high-temperature evaporator EH, a low-temperature evaporator E, a generator G, a condenser C, a high-temperature solution heat exchanger X2 and a low-temperature solution heat exchanger X1 as primary components. The absorption heat pump is different from the absorption heat pump shown in FIG. 13 in the following respects: The refrigerant heat exchanger 5 for heating the refrigerant liquid from the condenser C with the refrigerant vapor from the generator G shown in FIG. 13 is omitted and a heat exchanger 23 to which hot water 301 is supplied is disposed on the heating side so that the condensed liquid from the condenser C can be heated in the heat exchanger 23 and supplied to the high-temperature vapor-liquid separator EHS.

The ideal COP in a two-stage absorption heat pump is 0.5 at a one stage temperature raising and 0.33 at a two stage temperature raising. When the heat exchanger 23 is provided to preheat the refrigerant liquid to be supplied to the high-temperature vapor-liquid separator EHS for the high-temperature evaporator EH with the hot water 301, the refrigerant liquid increases in temperature from the condensation temperature to the high-temperature evaporator temperature (which corresponds to the temperature in a single-stage heating heat pump) and boils. Since the refrigerant liquid is heated from the condensation temperature to a temperature close to the heat source temperature (the temperature of the hot water 301) by the hot water 301 in the heat exchanger 23, that is, heated at a COP of 1, the efficiency can be improved as a whole. In a conventional heat pump, however, the refrigerant liquid from the condenser C is directly introduced into the high-temperature evaporator EH (high-temperature vapor-liquid separator EHS). This means that the refrigerant liquid is heated from the condensation temperature to the boiling point at a COP of about 0.5, which corresponds to that in the temperature raising process in the high-temperature evaporator EH.

Figure 15:
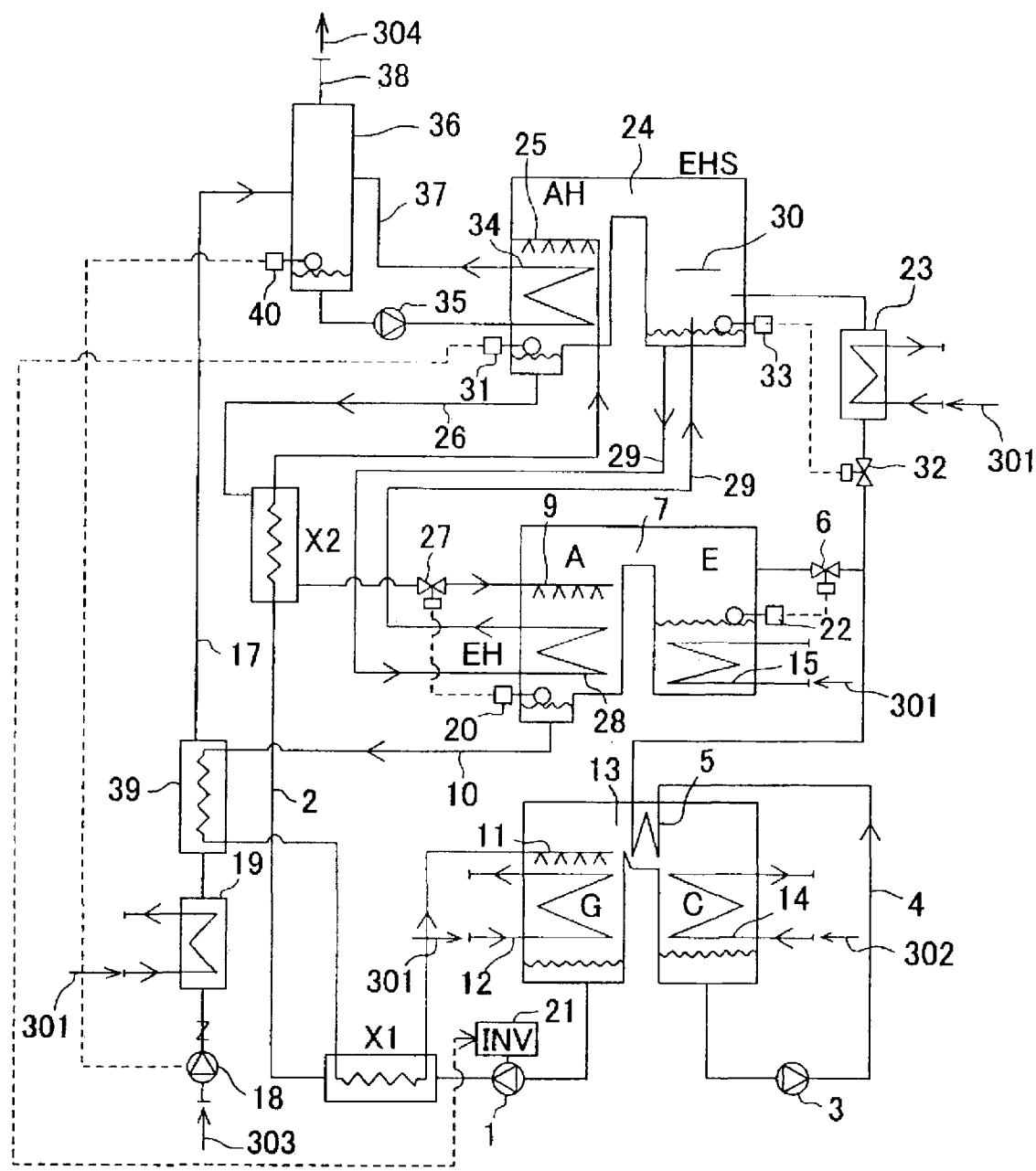
FIG. 15 is a view illustrating an example of the constitution of a two-stage absorption heat pump according to the present invention.

FIG. 15 is a view illustrating an example of the constitution of a two-stage absorption heat pump according to the present invention. As shown in the drawing, the absorption heat pump is the same as the absorption heat pump shown in FIG. 14 in having a high-temperature absorber AH, a low-temperature absorber A, a high-temperature evaporator EH, a low-temperature evaporator E, a generator G, a condenser C, a high-temperature solution heat exchanger X2 and a low-temperature solution heat exchanger X1 as primary components. The absorption heat pump is different from the absorption heat pump shown in FIG. 14 in the following respect: A refrigerant heat exchanger 5 is disposed in the passage 13, through which refrigerant vapor flows from the generator G to the condenser C, in the heat pump shown in FIG. 14.

The refrigerant liquid from the condenser C is fed to the refrigerant heat exchanger 5 through the refrigerant pipe 4 and heated by the refrigerant vapor from the generator G. Some of the refrigerant liquid is separated and introduced into the low-temperature evaporator E through the control valve 6. The remaining refrigerant liquid is fed to the heat exchanger 23 through the control valve 32, heated by the hot water 301, and introduced into the high-temperature vapor-liquid separator EHS for the high-temperature evaporator EH. Therefore, the amount of heat to be transferred from the refrigerant vapor to the cooling water 302 in the condenser C can be reduced and the efficiency can be further improved as a whole as compared to the absorption heat pump shown in FIG. 14.

Figure 16:
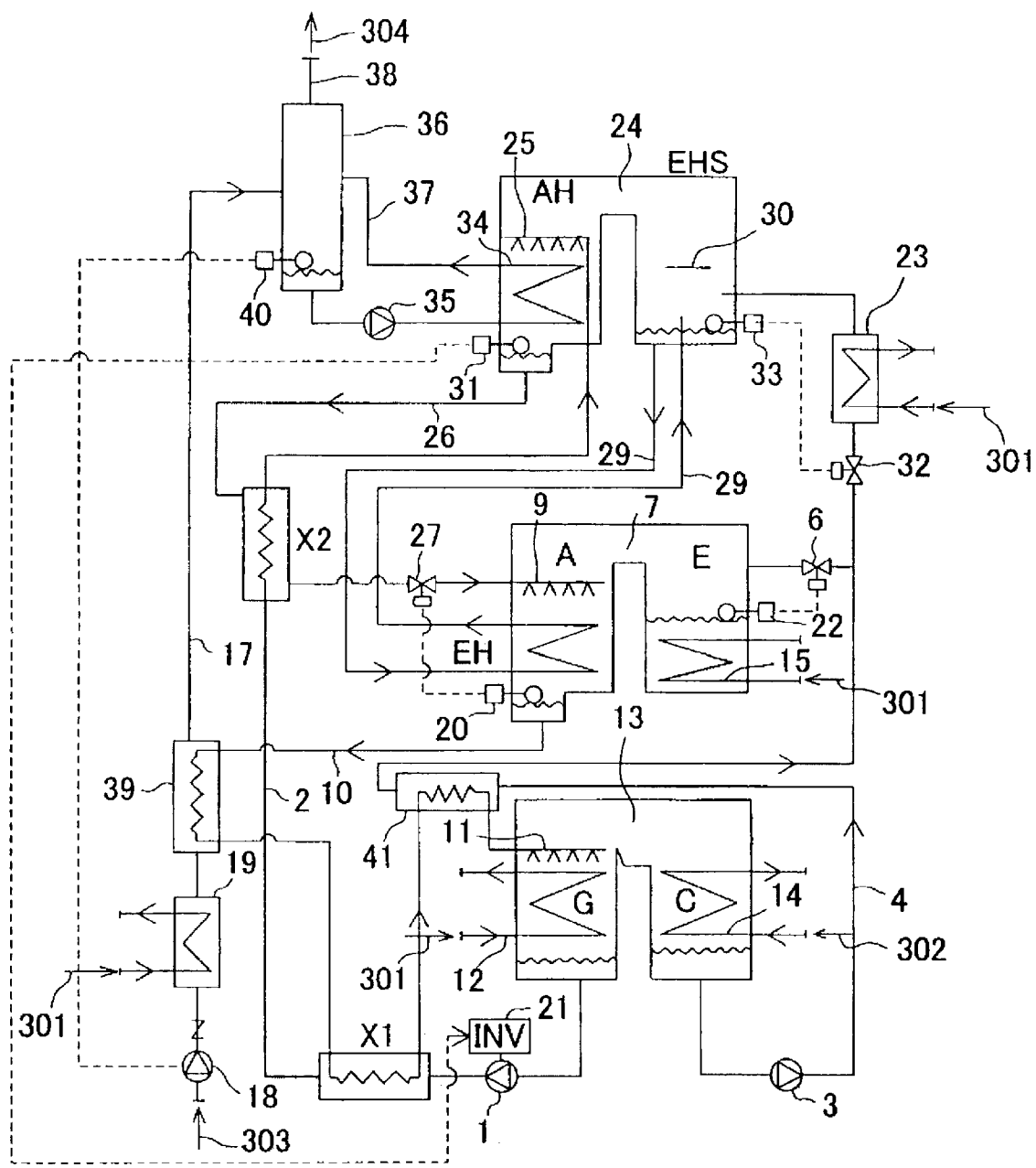
FIG. 16 is a view illustrating an example of the constitution of a two-stage absorption heat pump according to the present invention.

FIG. 16 is a view illustrating an example of the constitution of a two-stage absorption heat pump according to the present invention. As shown in the drawing, the absorption heat pump is the same as the absorption heat pump shown in FIG. 15 in having a high-temperature absorber AH, a low-temperature absorber A, a high-temperature evaporator EH, a low-temperature evaporator E, a generator G, a condenser C, a high-temperature solution heat exchanger X2 and a low-temperature solution heat exchanger X1 as primary components. The absorption heat pump is different from the absorption heat pump shown in FIG. 15 in having a refrigerant heater 41 for heating the refrigerant liquid from the condenser C with the dilute solution to be introduced into the generator G.

The refrigerant liquid from the condenser C is fed to the refrigerant heater 41 through the refrigerant pipe 4 and heated therein by the dilute solution to be introduced into the generator G. Some of the refrigerant liquid is separated and introduced into the low-temperature evaporator E through the control valve 6. The remaining refrigerant liquid is fed to the heat exchanger 23 through the control valve 32, heated and boiled by the hot water 301, and introduced into the high-temperature vapor-liquid separator EHS for the high-temperature evaporator EH. Therefore, the efficiency can be improved as a whole as in the absorption heat pump shown in FIG. 15. Although not illustrated, the refrigerant liquid to be fed from the condenser C to the low-temperature evaporator E and the high-temperature vapor-liquid separator EHS for the high-temperature evaporator EH may be heated by the concentrate solution in the generator G.

Figure 17:
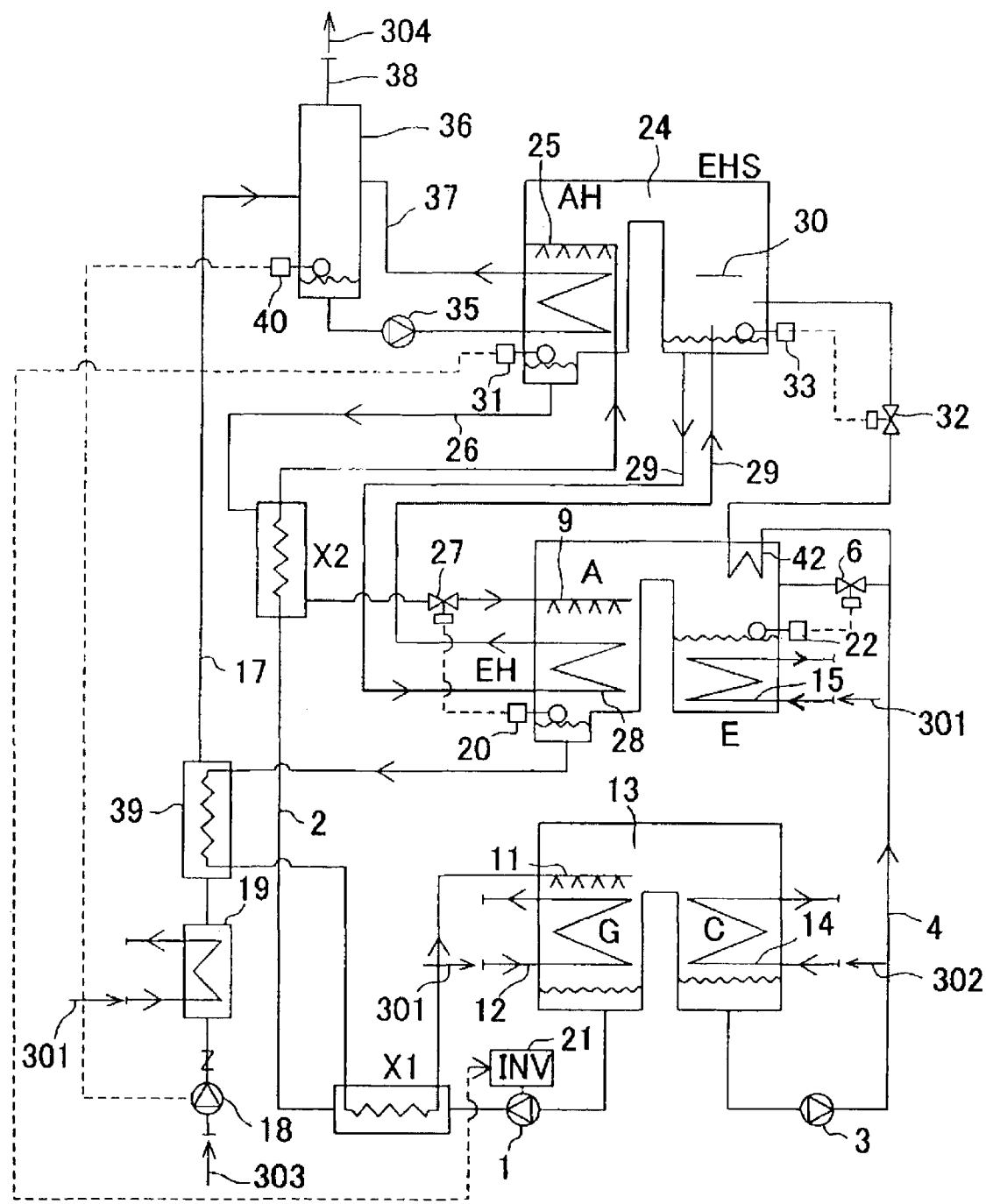
FIG. 17 is a view illustrating an example of the constitution of a two-stage absorption heat pump according to the present invention.

FIG. 17 is a view illustrating an example of the constitution of a two-stage absorption heat pump according to the present invention. As shown in the drawing, the absorption heat pump is the same as the absorption heat pump shown in FIG. 16 in having a high-temperature absorber AH, a low-temperature absorber A, a high-temperature evaporator EH, a low-temperature evaporator E, a generator G, a condenser C, a high-temperature solution heat exchanger X2 and a low-temperature solution heat exchanger X1 as primary components. The absorption heat pump is different from the absorption heat pump shown in FIG. 16 in the following respects: The refrigerant heat exchanger 41 for heating the refrigerant liquid shown in FIG. 16 with the dilute solution to be introduced into the generator G and the heat exchanger 23 for heating the refrigerant liquid with hot water are omitted and a refrigerant heater 42 for heating the refrigerant from the condenser C with the refrigerant vapor generated in the low-temperature evaporator E.

Some of the refrigerant liquid from the condenser C flowing through the refrigerant pipe 4 is separated and fed to the low-temperature evaporator E through the control valve 6. The remaining refrigerant liquid is introduced into the refrigerant heater 42, heated therein by the refrigerant vapor generated in the low-temperature evaporator E, and introduced into the high-temperature vapor-liquid separator EHS for the high-temperature evaporator EH through a control valve 32. Therefore, the efficiency can be further improved as a whole as in the absorption heat pump shown in FIG. 16.

Figure 18:
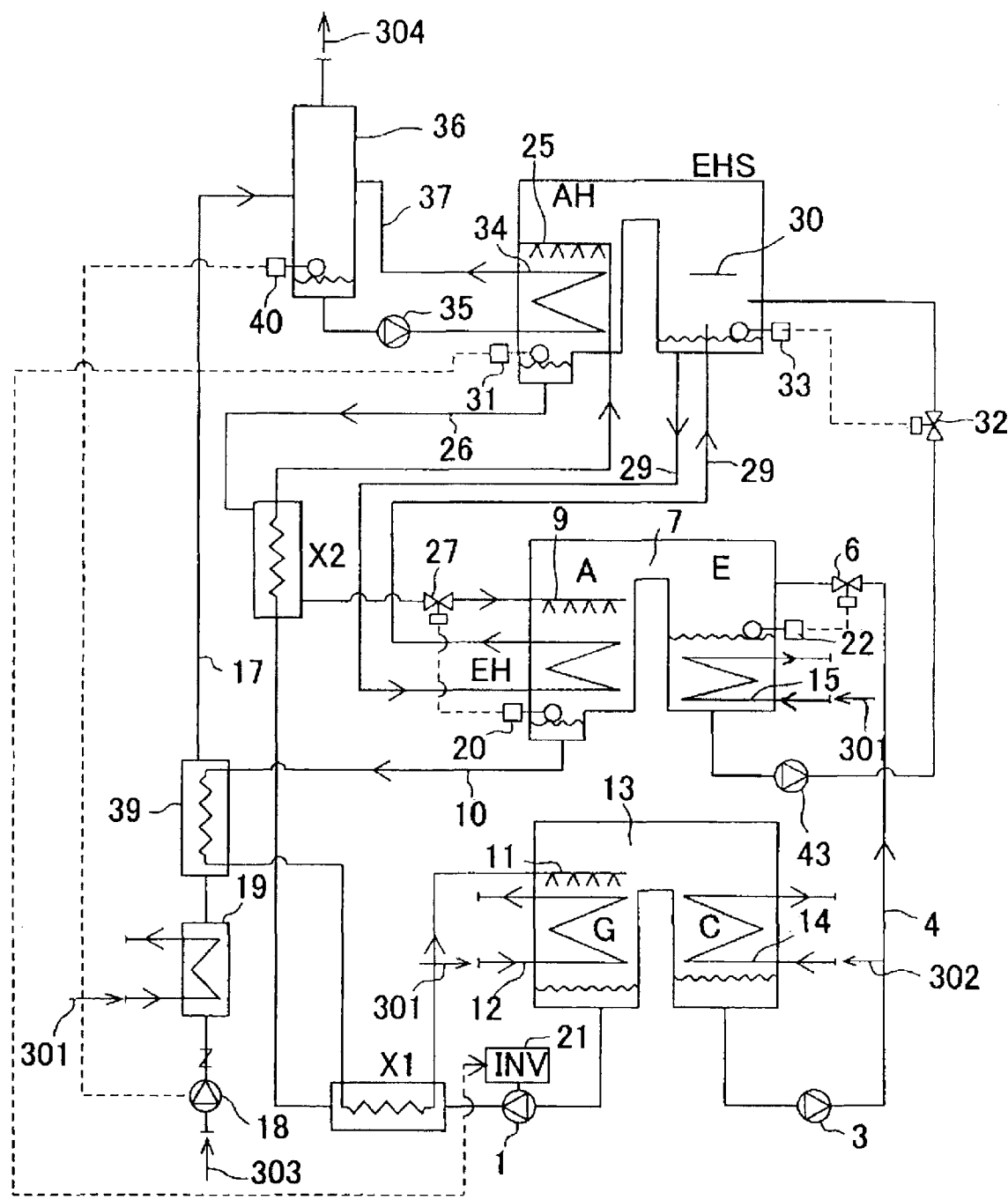
FIG. 18 is a view illustrating an example of the constitution of a two-stage absorption heat pump according to the present invention.

FIG. 18 is a view illustrating an example of the constitution of a two-stage absorption heat pump according to the present invention. As shown in the drawing, the absorption heat pump is the same as the absorption heat pump shown in FIG. 17 in having a high-temperature absorber AH, a low-temperature absorber A, a high-temperature evaporator EH, a low-temperature evaporator E, a generator G, a condenser C, a high-temperature solution heat exchanger X2 and a low-temperature solution heat exchanger X1 as primary components. The absorption heat pump is different from the absorption heat pump shown in FIG. 17 in the following respect: All the refrigerant liquid from the condenser C is introduced into the low-temperature evaporator E, and the refrigerant liquid heated by the hot water 301 in the low-temperature evaporator E is introduced into the high-temperature vapor-liquid separator EHS for the high-temperature evaporator EH through the control valve 32 by a pump 43. Therefore, the efficiency can be further improved as a whole as in the absorption heat pump shown in FIG. 17.

Although two-stage absorption heat pumps having a high-temperature absorber AH, a low-temperature absorber A, a high-temperature evaporator EH, a low-temperature evaporator E, and a generator G as primary components have been described in the examples shown in FIG. 13 to FIG. 18, the absorption heat pump according to the present invention is not limited thereto. It is needless to say that the present invention is applicable to a multi-stage absorption heat pump with three or more temperature raising stages having a high-temperature absorber, two or more low-temperature absorbers, a high-temperature evaporator and two or more low-temperature evaporators.

Figure 19A:
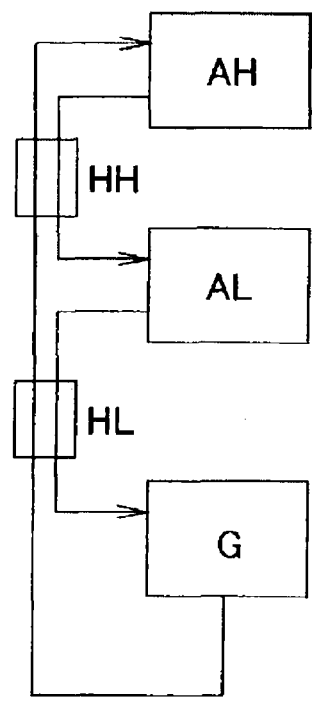
FIG. 19 is a view illustrating series flow patterns of solution in a two-stage absorption heat pump.
Figure 19B:
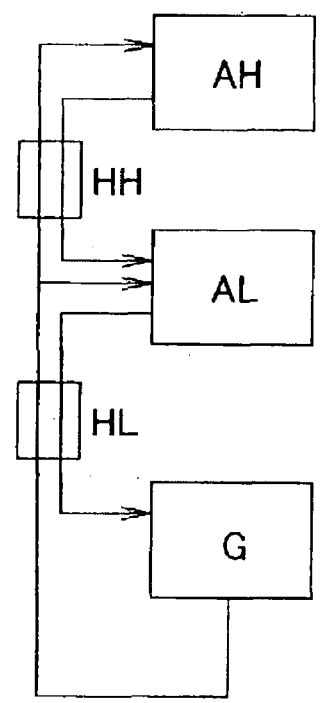
Figure 20A:
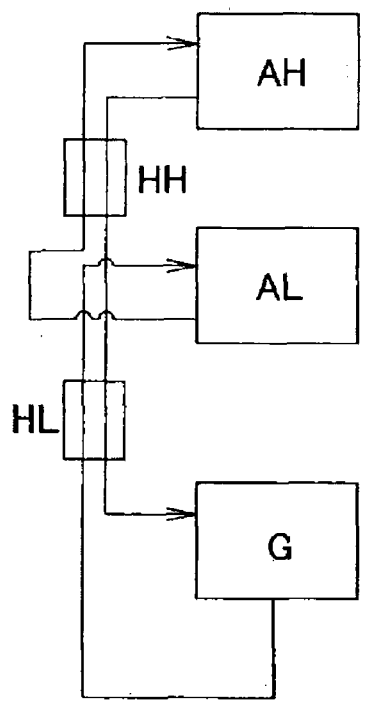
FIG. 20 is a view illustrating reverse flow patterns of solution in a two-stage absorption heat pump.

As the flow patterns of the working medium solution through the high-temperature absorber AH, the low-temperature absorber AL, and the generator G in the two-stage absorption heat pumps, there are series flow patterns as shown in FIG. 19, reverse flow patterns as shown in FIG. 20, and parallel flow patterns as shown in FIG. 21. In FIG. 19 to FIG. 21, the low-temperature absorber is designated as AL.

FIG. 19 is a view illustrating series flow patterns. In the case shown in FIG. 19(*a*), the concentrated solution from the generator G is supplied to the high-temperature absorber AH through the heated side of the low-temperature solution heat exchanger HL and the heated side of the high-temperature solution heat exchanger HH. The solution (medium-concentration solution) from the high-temperature absorber AH flows through the heating side of the high-temperature solution heat exchanger HH to heat the concentrated solution from the generator G flowing through the heated side of the high-temperature solution heat exchanger HH and is supplied to the low-temperature absorber AL. The solution (dilute solution) from the low-temperature absorber AL flows through the heating side of the low-temperature solution heat exchanger HL to heat the concentrated solution from the generator G flowing through the heated side of the low-temperature solution heat exchanger HL and is supplied to the generator G. In the case shown in FIG. 19(*b*), some of the concentrated solution from the generator G which has passed through the heated side of the low-temperature solution heat exchanger HL is supplied to the low-temperature absorber AL, and the remaining concentrated solution is supplied to the high-temperature absorber AH through the heated side of the high-temperature solution heat exchanger HH. The solution from the high-temperature absorber AH flows through the heating side of the high-temperature solution heat exchanger HH to heat the concentrated solution from the generator G flowing through the heated side of the high-temperature solution heat exchanger HH and is supplied to the low-temperature absorber AL. The solution from the low-temperature absorber AL flows through the heating side of the low-temperature solution heat exchanger HL to heat the concentrated solution from the generator G flowing through the heated side of the low-temperature solution heat exchanger HL and is supplied to the generator G.

Figure 20B:
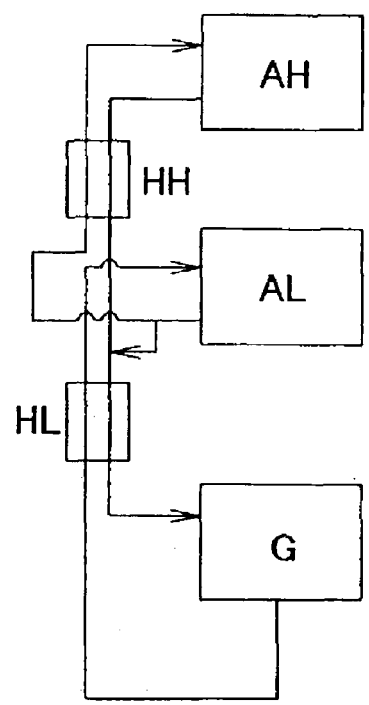

FIG. 20 is a view illustrating reverse flow patterns. In the case shown in FIG. 20(*a*), the concentrated solution from the generator G is supplied to the low-temperature absorber AL through the heated side of the low-temperature solution heat exchanger HL. The concentrated solution from the low-temperature absorber AL is supplied to the high-temperature absorber AH through the heated side of the high-temperature solution heat exchanger HH. The solution from the high-temperature absorber AH flows through the heating side of the high-temperature solution heat exchanger HH to heat the concentrated solution from the low-temperature absorber AL flowing through the heated side of the high-temperature solution heat exchanger HH, flows through the heating side of the low-temperature solution heat exchanger HL to heat the concentrated solution from the generator G flowing through the heated side of the low-temperature solution heat exchanger HL, and is supplied to the generator G. In the case shown in FIG. 20(b), the concentrated solution from the generator G is supplied to the low-temperature absorber AL through the heated side of the low-temperature solution heat exchanger HL. Some of the solution from the low-temperature absorber AL is supplied to the high-temperature absorber AH through the heated side of the high-temperature solution heat exchanger HH. The remaining solution and the solution from the high-temperature absorber AH having flowed through the heating side of the high-temperature solution heat exchanger HH to heat the solution from the low-temperature absorber AL join together, flows through the heating side of the low-temperature solution heat exchanger HL to heat the concentrated solution from the generator G flowing through the heated side of the low-temperature solution heat exchanger HL and flows into the generator G.

Figure 21A:
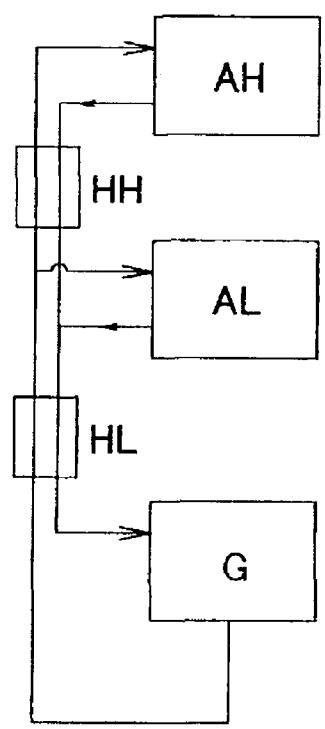
FIG. 21 is a view illustrating parallel flow patterns of solution in a two-stage absorption heat pump.
Figure 21B:
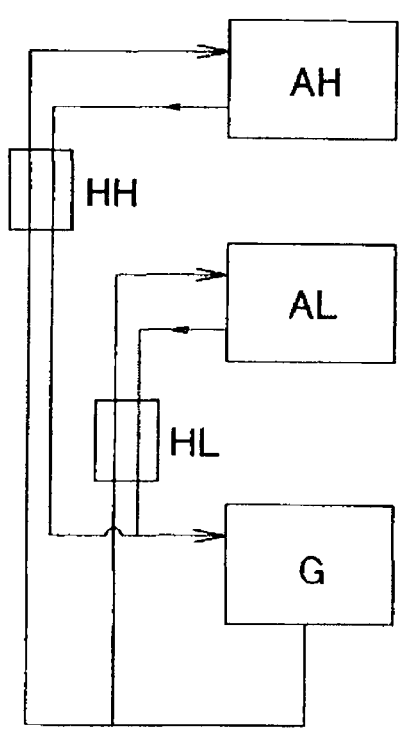

FIG. 21 is a view illustrating parallel flow patterns. In the case shown in FIG. 21(a), some of the concentrated solution from the generator G which has passed through the heated side of the low-temperature solution heat exchanger HL is supplied to the low-temperature absorber AL, and the remaining concentrated solution is supplied to the high-temperature absorber AH through the heated side of the high-temperature solution heat exchanger HH. The dilute solution from the high-temperature absorber AH flows through the heating side of the high-temperature solution heat exchanger HH to heat the concentrated solution from the generator G flowing through the heated side of the high-temperature solution heat exchanger HH. The dilute solution and the dilute solution from the low-temperature absorber AL joins together, flows through the heating side of the low-temperature solution heat exchanger HL to heat the concentrated solution from the generator G flowing through the heated side of the low-temperature solution heat exchanger HL, and flows into the generator G. In the case shown in FIG. 21(b), some of the concentrated solution from the generator G is supplied to the low-temperature absorber AL through the heated side of a low-temperature solution heat exchanger HL, and the remaining concentrated solution is supplied to the high-temperature absorber AH through the heated side of a high-temperature solution heat exchanger HH. The dilute solution from the high-temperature absorber AH flows through the heating side of the high-temperature solution heat exchanger HH to heat the concentrated solution from the generator G flowing through the heated side of the high-temperature solution heat exchanger HH, and is supplied to the generator G. The solution from the low-temperature absorber AL flows through the low-temperature solution heat exchanger HL to heat the concentrated solution from the generator G flowing through the heated side of the low-temperature solution heat exchanger HL, and is supplied to the generator G.

Figure 22A:
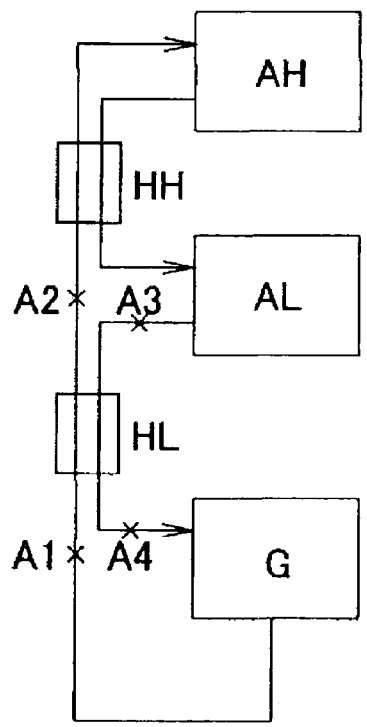
FIG. 22 is a view illustrating the locations of heating source solutions in the series flow patterns of solution in the two-stage absorption heat pump according to the present invention.
Figure 22B:
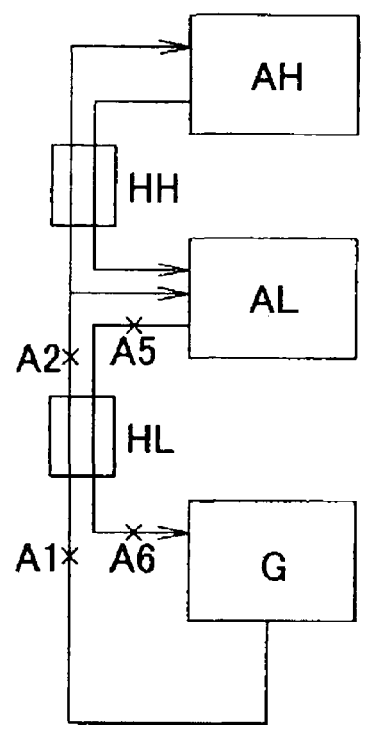

In the flow patterns of the working medium solution as shown in FIG. 19 to FIG. 21, the working medium solutions to be used as heating sources for the working medium refrigerant from the condenser are the working medium solutions flowing into or out of the low-temperature solution heat exchanger HL and the high-temperature solution heat exchanger HH. In the case of the series flow patterns, the working medium solutions are solutions A1 to A5 shown in FIG. 22. In the case of FIG. 22(a), the working medium solutions are concentrated solution A1 from the generator G flowing into the low-temperature solution heat exchanger HL, concentrated solution A2, which is the concentrated solution A1 having flowed through the heated side of the low-temperature solution heat exchanger HL, solution (dilute solution) A3 from the low-temperature absorber AL flowing into the heating side of the low-temperature solution heat exchanger HL, and solution A4, which is the solution A3 having flowed through the heating side of the low-temperature solution heat exchanger HL and flowing into the generator G. In the case of FIG. 22(b), the working medium solutions are concentrated solution A1 from the generator G flowing into the heated side of the low-temperature solution heat exchanger HL, concentrated solution A2, which is the concentrated solution A1 having flowed through the heated side of the low-temperature solution heat exchanger HL, solution A5 from the low-temperature absorber AL flowing into the heating side of the low-temperature solution heat exchanger HL, and solution A6, which is the solution A5 having flowed through the heating side of the low-temperature solution heat exchanger HL and flowing into the generator G.

Figure 23A:
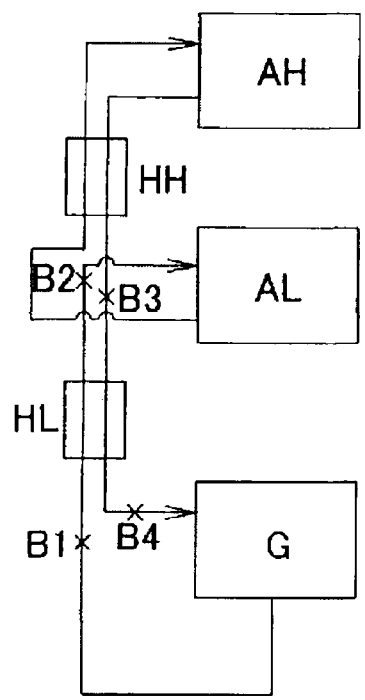
FIG. 23 is a view illustrating the locations of heating source solutions in the reverse flow patterns of solution in the two-stage absorption heat pump according to the present invention.
Figure 23B:
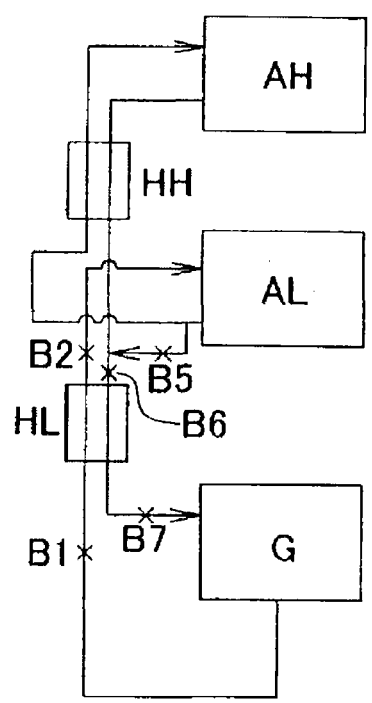

In the case of the reverse flow patterns, the working medium solutions are solutions B1 to B7 shown in FIG. 23. In the case of FIG. 23(a), the working medium solutions are concentrated solution B1 from the generator G flowing into the heated side of the low-temperature solution heat exchanger HL, concentrated solution B2, which is the concentrated solution B1 having flowed through the heated side of the low-temperature solution heat exchanger HL, solution B3 from the high-temperature absorber AH flowing through the heating side of the high-temperature solution heat exchanger HH and flowing into the heating side of the low-temperature solution heat exchanger HL, and solution B4, which is the solution B3 having flowed through the heating side of the low-temperature solution heat exchanger HL and flowing into the generator G. In the case of FIG. 23(b), the working medium solutions are concentrated solution B1 from the generator G flowing into the heated side of the low-temperature solution heat exchanger HL, concentrated solution B2, which is the concentrated solution B1 having flowed through the heated side of the low-temperature solution heat exchanger HL, solution B5, which is a portion of the solution flowing out of the low-temperature absorber AL, solution B6, which is the mixture of the solution B5 and the solution from the high-temperature absorber AH having flowed through the heating side of the high-temperature solution heat exchanger HH which is flowing into the heating side of the low-temperature solution heat exchanger HL, and solution B7, which is the solution B6 having flowed through the heating side of a low-temperature solution heat exchanger HL and flowing into the generator G.

Figure 24A:
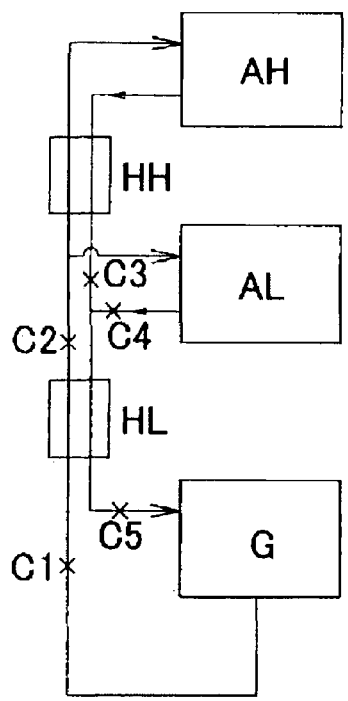
FIG. 24 is a view illustrating the locations of heating source solutions in the parallel flow patterns of solution in the two-stage absorption heat pump according to the present invention.
Figure 24B:
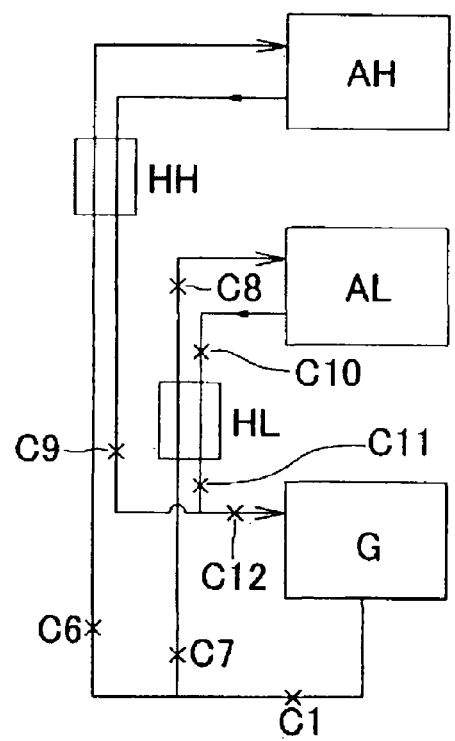

In the case of the parallel flow patterns, the working medium solutions are solutions C1 to C11 shown in FIG. 24. In the case of FIG. 24(a), the working medium solutions are concentrated solution C1 from the generator G flowing into the heated side of the low-temperature solution heat exchanger HL, concentrated solution C2, which is the concentrated solution C1 having flowed through the heated side of the low-temperature solution heat exchanger HL, solution C3 having flowed through the heating side of the high-temperature solution heat exchanger HH and flowing into the heating side of the low-temperature solution heat exchanger HL, solution C4 flowing from the low-temperature absorber AL into the heating side of the low-temperature solution heat exchanger HL, and solution C5, which is the mixture of the solutions C3 and C4 having flowed through the heating side of the low-temperature solution heat exchanger HL and flowing into the generator G. In the case of FIG. 24(b), the working medium solutions are concentrated solution C1 from the generator G, solution C6 separated from the solution C1 and flowing into the heated side of the high-temperature solution heat exchanger HH, solution C7 separated from the solution C1 and flowing into the heated side of the low-temperature solution heat exchanger HL, solution C8, which is the solution C7 having flowed through the heated side of the low-temperature solution heat exchanger HL, solution C9 from the high-temperature absorber AH having flowed through the heating side of the high-temperature solution heat exchanger HH and flowing into the generator G, solution C10 from the low-temperature absorber AL flowing into the heating side of the low-temperature solution heat exchanger HL, solution c11, which is the solution C10 having flowed through the heating side of the low-temperature solution heat exchanger HL and flowing into the generator G, and solution C12, which is the mixture of the solutions 9C and C11 flowing into the generator G.

Heating source solution heat exchangers D1 and D2, E1 and E2, and F1 and F2 through which heating source solution passes may be disposed in parallel to the low-temperature solution heat exchanger HL in the series flow patterns, reverse flow patterns and the parallel flow patterns, respectively, as shown in FIG. 25 to FIG. 27.

Figure 25A:
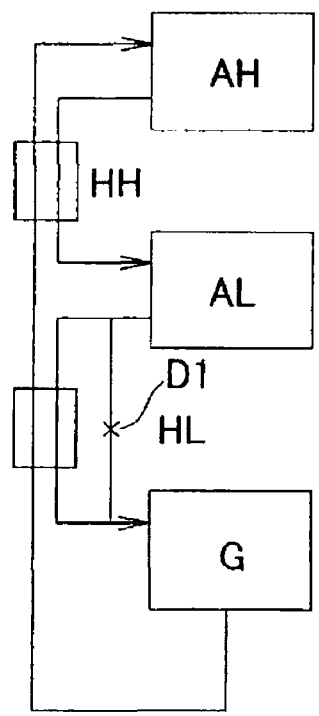
FIG. 25 is a view illustrating the location of a heating source solution heat exchanger in the series flow patterns of solution in the two-stage absorption heat pump according to the present invention.
Figure 25B:
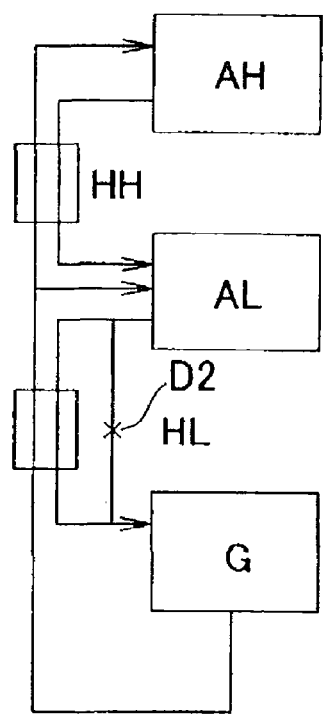
Figure 26A:
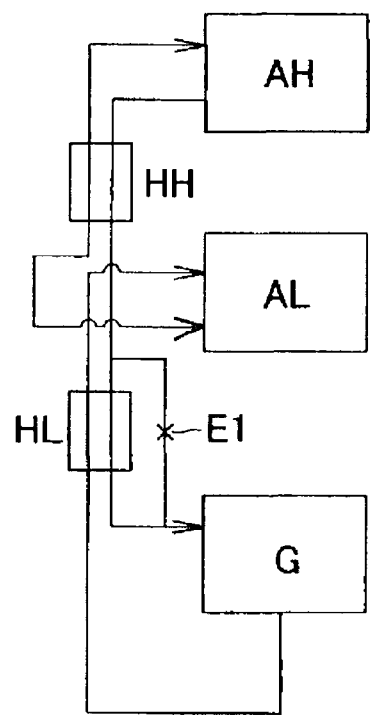
FIG. 26 is a view illustrating the location of a heating source solution heat exchanger in the reverse flow patterns of solution in the two-stage absorption heat pump according to the present invention.
Figure 26B:
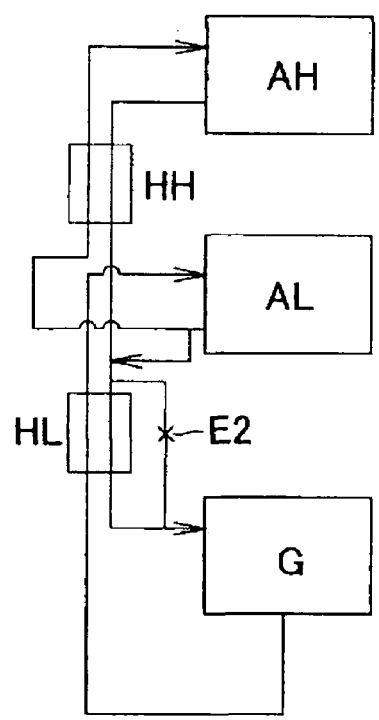

In the series flow patterns shown in FIG. 25(a) and FIG. 25(b), the solution from the low-temperature absorber AL is used as the heating source solution, and a heating source solution heat exchanger D1 or D2 through which the heating source solution passes are disposed in parallel to the low-temperature solution heat exchanger HL. In the reverse flow pattern shown in FIG. 26(a), the solution from the high-temperature absorber AH is used as the heating source solution, and a heating source solution heat exchanger E1 through which the heating source solution passes is disposed in parallel to the low-temperature solution heat exchanger HL. In the reverse flow pattern shown in FIG. 26(b), the solution from the high-temperature absorber AH and the solution from the low-temperature absorber AL are used as the heating source solution, and a heating source solution heat exchanger E2 through which the heating source solution passes is disposed in parallel to the low-temperature solution heat exchanger HL. In the parallel flow pattern shown in FIG. 27(a), the solution from the high-temperature absorber AH and the solution from the low-temperature absorber AL are used as the heating source solution, and a heating source solution heat exchanger F1 through which the heating source solution passes is disposed in parallel to the low-temperature solution heat exchanger HL. In the parallel flow pattern shown in FIG. 27(b), the solution from the low-temperature absorber AL is used as the heating source solution, and a heating source solution heat exchanger F2 through which the heating source solution passes is disposed in parallel to the low-temperature solution heat exchanger HL.

Although the solution flow patterns and the locations of the working medium solutions as the heat sources for the working medium refrigerant in a two-stage absorption heat pump are shown in FIG. 19 to FIG. 27, the solution flow patterns and the locations of the working medium solutions as the heat sources for the working medium refrigerant are generally the same in an absorption heat pump with three or more temperature raising stages.

Figure 28:
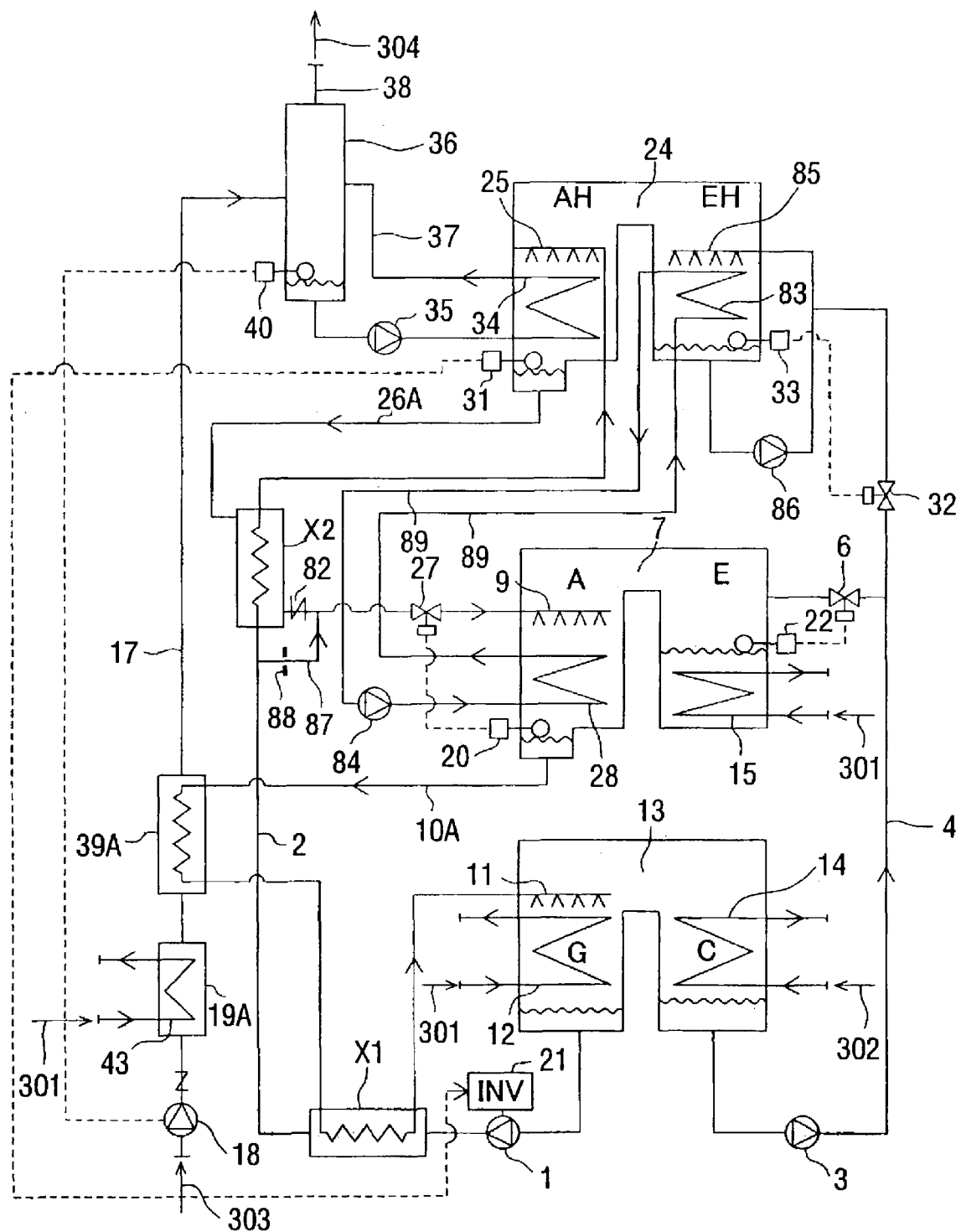
FIG. 28 is a view illustrating an example of the constitution of a two-stage absorption heat pump according to the present invention.

FIG. 28 is a view illustrating an example of the constitution of a two-stage absorption heat pump according to the present invention. As shown in the drawing, the absorption heat pump has a high-temperature absorber AH, a low-temperature absorber A, a high-temperature evaporator EH, a low-temperature evaporator E, a generator G, a condenser C, a high-temperature solution heat exchanger X2 and a low-temperature solution heat exchanger X1 as primary components.

Concentrated solution in the generator G is introduced into the high-temperature absorber AH through a concentrated solution pipe 2, the heated side of the low-temperature solution heat exchanger X1, and the heated side of the high-temperature solution heat exchanger X2 by a solution pump 1. Condensed refrigerant liquid in the condenser C is introduced into the low-temperature evaporator E through a refrigerant pipe 4 and a control valve 6 and into the high-temperature evaporator EH through the refrigerant pipe 4 and a control valve 32 by a refrigerant pump 3. Refrigerant vapor generated in the low-temperature evaporator E is introduced into the low-temperature absorber A through a passage 7, and refrigerant vapor generated in the high-temperature evaporator EH is introduced into the high-temperature absorber AH through a passage 24.

The high-temperature absorber AH is provided therein with a spray 25, and the concentrated solution supplied through the concentrated solution pipe 2 is sprayed into the high-temperature absorber AH from the spray 25. The refrigerant vapor from the high-temperature evaporator EH is absorbed into the sprayed concentrated solution, whereupon the concentrated solution turns into medium-concentration solution with a medium concentration. The medium-concentration solution flows through a medium-concentration solution pipe 26A and the heating side of the high-temperature solution heat exchanger X2 to heat the concentrated solution flowing through the concentrated solution pipe 2 and is introduced into the low-temperature absorber A through a check valve 82 and a control valve 27. The introduced medium-concentration solution is sprayed from a spray 9 disposed in the low-temperature absorber A. The refrigerant vapor from the low-temperature evaporator E is absorbed into the medium-concentration solution, whereupon the medium-concentration solution turns into dilute solution.

The dilute solution in the low-temperature absorber A is introduced into the generator G through a dilute solution pipe 10A and the heating side of the low-temperature solution heat exchanger X1, and sprayed from a spray 11 onto a hot water pipe 12 in the generator G. The sprayed dilute solution is heated by hot water 301 supplied to the hot water pipe 12, whereupon refrigerant vapor is generated and the dilute solution is concentrated into concentrated solution. The generated refrigerant vapor flows to the condenser C through a passage 13, and is cooled by cooling water 302 flowing through a cooling water pipe 14 in the condenser C and condensed into refrigerant liquid.

Heat exchange pipes 28 and 83 are disposed in the low-temperature absorber A and the high-temperature evaporator EH, respectively, and the heat exchange pipes 28 and 83 are connected to working medium transporting pipes 89 and 89. The working medium is circulated through the heat exchange pipes 28 and 83 by a circulation pump 84. By the circulation of the working medium, the heat generated in the low-temperature absorber A is transmitted to the high-temperature evaporator EH. The high-temperature evaporator EH is provided therein with a spray 85, and the refrigerant liquid introduced through the control valve 32 is supplied to the spray 85 and circulated. The refrigerant liquid in the high-temperature evaporator EH is also supplied to the spray 85 by a refrigerant pump 86. When the refrigerant liquid is sprayed onto the heat exchange pipe 83 from the spray 85, the refrigerant liquid is heated and evaporated by the working medium circulating through the heat exchange pipe 83, and the generated refrigerant vapor is introduced into the high-temperature absorber AH through the passage 24 as described before.

A hot water pipe 15 is disposed in the low-temperature evaporator E, and the refrigerant liquid in the low-temperature evaporator E is heated by hot water supplied to the hot water pipe. The generated refrigerant vapor is introduced into the low-temperature absorber A as described before. The concentrated solution fed through the concentrated solution pipe 2 flows through the heated side of the low-temperature solution heat exchanger X1 and heated therein. After that, some of the concentrated solution is divided into a branch pipe 87 and introduced into the low-temperature absorber A. The flow rate of the concentrated solution to be introduced into the low-temperature absorber A is restricted by an orifice 88.

The high-temperature absorber AH is provided with a liquid level sensor 31 for detecting the liquid level therein. A detection signal from the liquid level sensor 31 is inputted into an inverter 21 to control the rotational speed of the solution pump 1. The low-temperature absorber A is provided with a liquid level sensor 20 for detecting the liquid level at the outlet thereof. A detection signal from the liquid level sensor 20 is inputted into a control valve 27 and controls the opening of the control valve 27. The low-temperature evaporator E is provided with a liquid level sensor 22 for detecting the liquid level therein. A detection signal from the liquid level sensor 22 is inputted into a control valve 6 and controls the opening of the control valve 6. The high-temperature evaporator EH is provided with a liquid level sensor 33 for detecting the liquid level therein. A detection signal from the liquid level sensor 33 is inputted into a control valve 32 and controls the opening of the control valve 32.

The high-temperature absorber AH has a pipe 34 for supplying water as a heat receiving medium, and water is supplied to the pipe 34 from a vapor-liquid separator 36 by a pump 35 and heated therein. The generated steam is directed to the vapor-liquid separator 36 through a pipe 37, and steam 304 is discharged through a steam discharge pipe 38. Water 303 as a heat receiving medium is supplied to the vapor-liquid separator 36 through a water supply pipe 17 by a water supply pump 18. The water 303 flowing through the water supply pipe 17 is heated by hot water 301 flowing through a hot water pipe 43 in a heat exchanger 19A and then by the dilute solution flowing through a dilute solution pipe 10A in a heat exchanger 39A, and introduced into the vapor-liquid separator 36. The vapor-liquid separator 36 is provided with a liquid level sensor 40 for detecting the liquid level therein. A detection signal from the liquid level sensor 40 is inputted into an inverter (not shown) for driving the water supply pump 18 to control the pump rotational speed.

In the two-stage absorption heat pump constituted as described above, hot water 301 as a heat source is supplied to the hot water pipe 12 in the generator G and the hot water pipe 15 in the low-temperature evaporator E, and cooling water 302 is supplied to the cooling water pipe in the condenser C. The concentrated solution in the generator G is delivered by the solution pump 1 and heated in the low-temperature solution heat exchanger X1. After that, some of the concentrated solution is divided into the branch pipe 87 and introduced into the low-temperature absorber A, and the remaining concentrated solution is directed to the high-temperature absorber AH through the heated side of the high-temperature solution heat exchanger X2. In the high-temperature absorber AH, the concentrated solution is sprayed from the spray 25, absorbs the vapor from the high-temperature evaporator EH to generate heat of absorption and is diluted into a medium-concentration solution with a medium concentration. The medium-concentration solution is directed to the low-temperature absorber A through the heating side of the high-temperature solution heat exchanger X2. In the low-temperature absorber A, the concentrated solution divided into the branch pipe 87 and the medium-concentration solution from the high-temperature absorber AH are mixed together. The mixed solution is sprayed from the spray 9, absorbs the refrigerant vapor from the low-temperature evaporator E to generate heat of absorption, and is diluted into a dilute solution. The dilute solution is returned to the generator G through the heating side of the low-temperature solution heat exchanger X1.

The cooling side of the low-temperature absorber A functions as a heat supplying section for the high-temperature evaporator EH. The working medium flowing through the heat exchange pipe 28 is heated by the heat of absorption generated when the refrigerant vapor from the low-temperature evaporator E is absorbed into the mixed solution sprayed from the absorber spray 9. The heated working medium is fed to the heat exchange pipe 83 in the high-temperature evaporator EH and supplies the heat of absorption generated in the low-temperature absorber A to the high-temperature evaporator EH to heat the refrigerant liquid sprayed from the spray 85 onto the heat exchange pipe 83. In the low-temperature evaporator E, the refrigerant liquid is heated by the hot water flowing through the hot water pipe 15 and refrigerant vapor is generated.

As described above, some of the concentrated solution is supplied to the low-temperature absorber A at start-up and absorbs the refrigerant vapor from the low-temperature evaporator E. Thus, the temperature of the dilute solution increases and the working medium flowing through the heat exchange pipe 28 is heated. Since the temperature of the working medium becomes higher than that of the vapor in the low-temperature evaporator E, the temperature of the refrigerant vapor generated from the refrigerant liquid sprayed onto the heat exchange pipe 83 from the spray 85 in the high-temperature evaporator EH becomes higher than that of the vapor in the low-temperature evaporator E and the vapor pressure in the high-temperature evaporator EH becomes higher than that in the low-temperature evaporator E. The vapor pressure in the high-temperature absorber AH is generally equal to that in the high-temperature evaporator EH, and the vapor pressure in the low-temperature absorber A is generally equal to that in the low-temperature evaporator E. Thus, the vapor pressure in the high-temperature absorber AH is higher than that in the low-temperature absorber A, and ensures the flow of the solution from the high-temperature absorber AH to the low-temperature absorber A.

Figure 29:
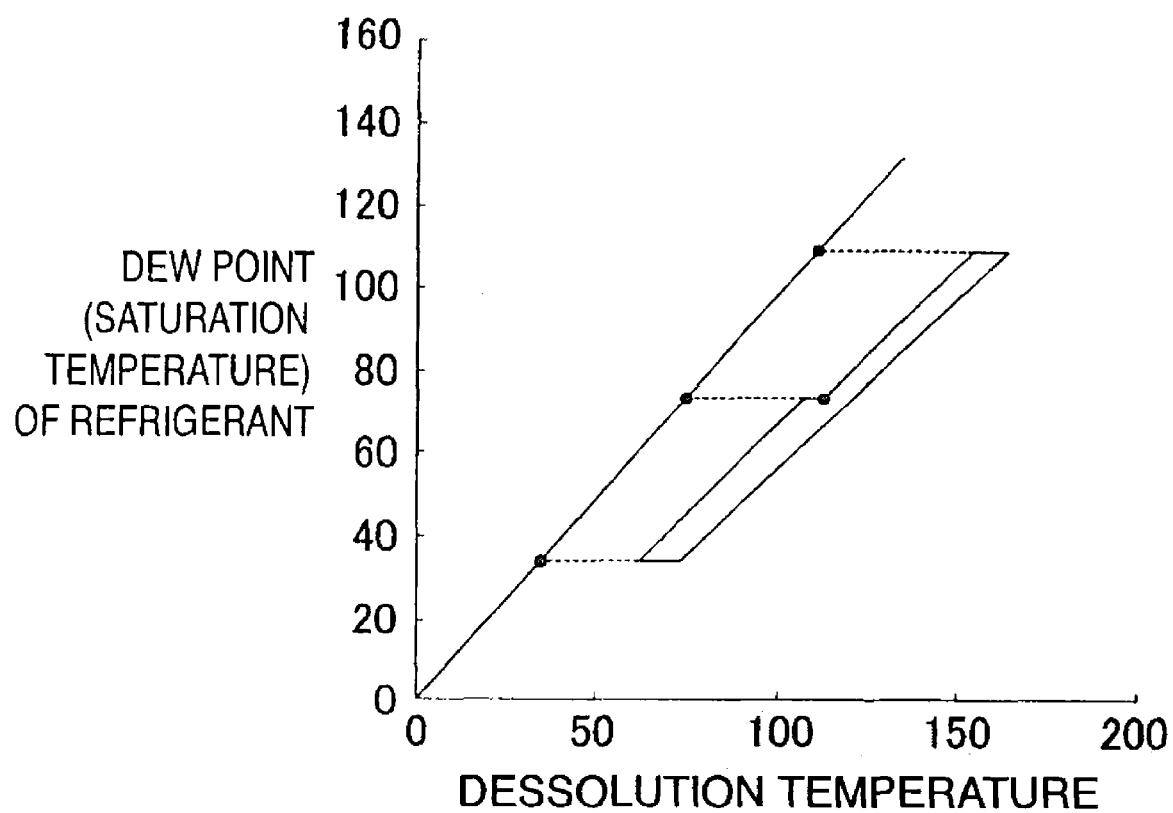
FIG. 29 is an example of the graph of the absorption cycle on the solution side in the two-stage absorption heat pump according to the present invention.
Figure 33:
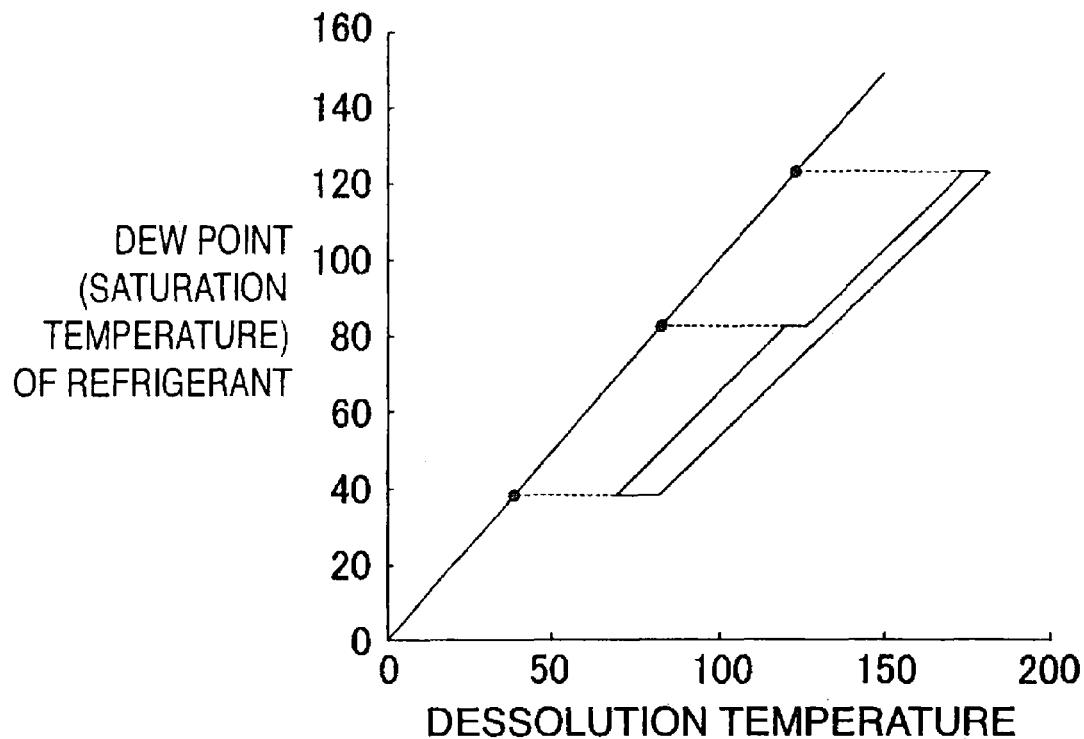
FIG. 33 is an example of the graph of the absorption cycle on the solution side in a two-stage absorption heat pump.
Figure 34:
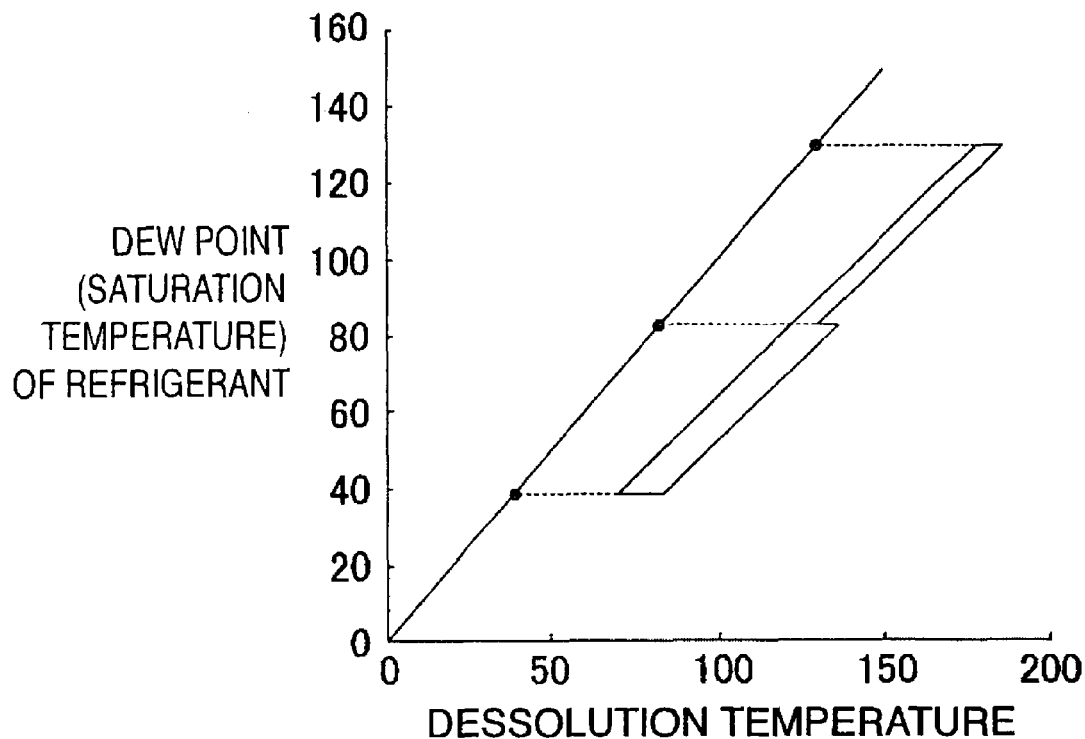
FIG. 34 is an example of the graph of the absorption cycle on the solution side in a two-stage absorption heat pump.

The flow rate of concentrated solution to be divided into the branch pipe 87 and introduced into the low-temperature absorber A is approximately 5 to 50% of the concentrated solution supplied from the generator G through the concentrated solution pipe 2. When the flow rate of the concentrated solution is small, the start-up takes a long time but the decrease of the temperature raising performance can be negligible even if the introduction of concentrated solution is still continued after the completion of the start-up. FIG. 29 is a graph of absorption cycle obtained when the introduction of concentrated solution is still continued after the completion of the start-up (which is the same as the graph of absorption cycle shown in FIG. 33). When the flow rate of the concentrated solution is large, the introduction of concentrated solution must to be stopped after the completion of the start-up.

Figure 35:
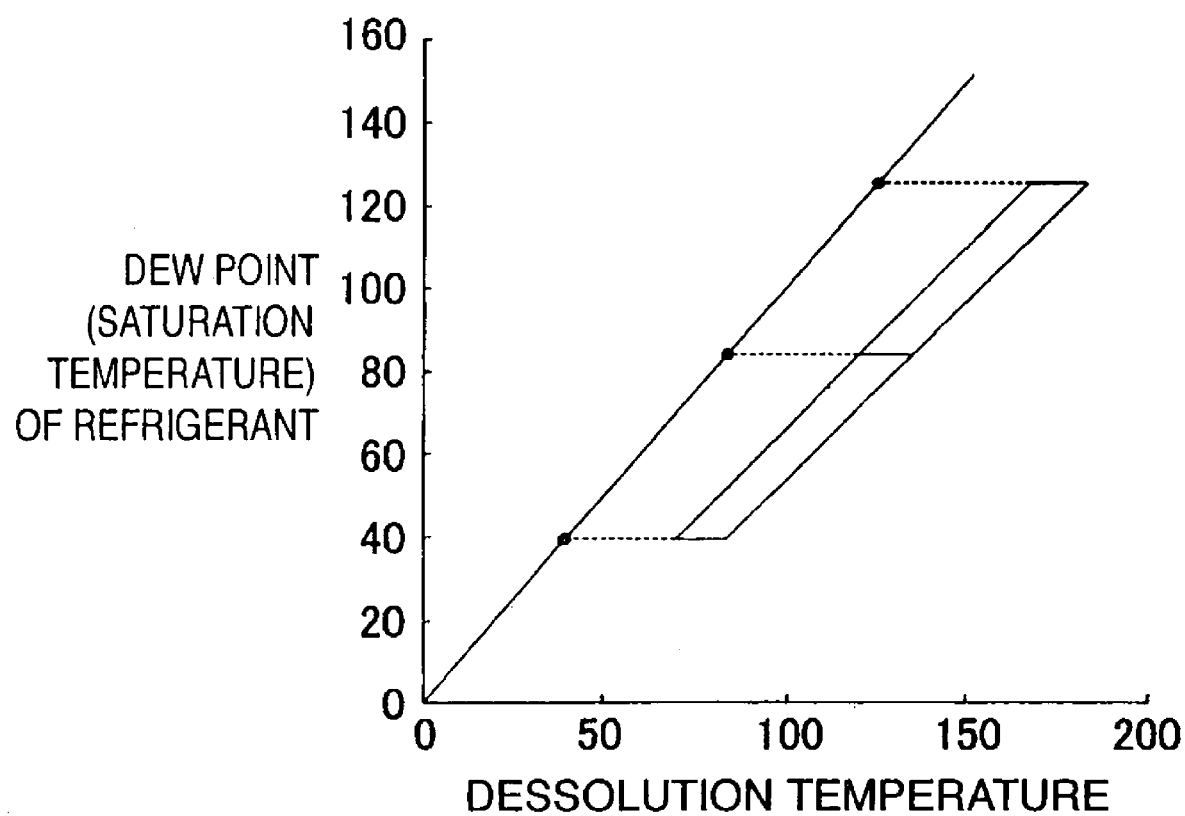
FIG. 35 is an example of the graph of the absorption cycle on the solution side in a two-stage absorption heat pump.

When the introduction of concentrated solution is continued, the temperature raising performance decreases significantly to be the same level as that of a parallel flow (see FIG. 35).

Although the concentrated solution separated from the concentrated solution flowing through the concentrated solution pipe 2 and introduced into the low-temperature absorber A is mixed with the medium-concentration solution from the high-temperature absorber AH and the mixed solution is introduced into the low-temperature absorber A in the above two-stage absorption heat pump, the concentrated solution and the medium-concentration solution may be separately introduced into the low-temperature absorber A at different points. For example, the concentrated solution may be first introduced from the inlet of the low-temperature absorber A and the medium-concentration solution may be introduced from an intermediate portion of the low-temperature absorber A.

The flow of the concentrated solution is controlled by controlling the rotational speed of the solution pump 1 based on the output from a liquid level sensor and the concentrated solution is fed from the outlet of the generator G to the high-temperature absorber AH so that the liquid level at the outlet of the high-temperature absorber AH can be generally constant. The flow rate of the medium-concentration solution from the high-temperature absorber AH to the low-temperature absorber A is adjusted by controlling the opening of the control valve 27 at the inlet of the low-temperature absorber A based on the detection output from the liquid level sensor 20 so that the liquid level at the outlet of the high-temperature absorber AH can be generally constant.

Figure 30:
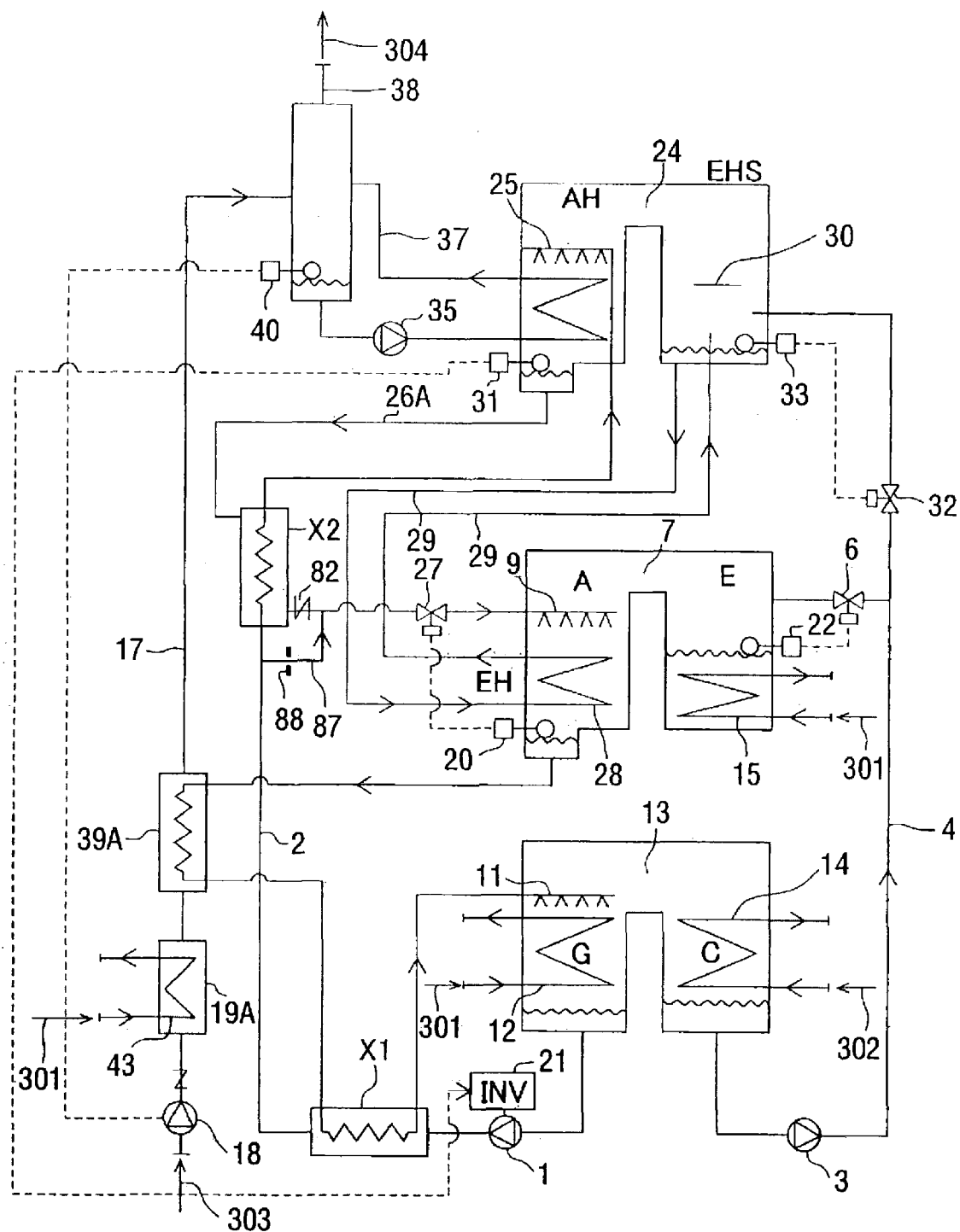
FIG. 30 is a view illustrating an example of the constitution of a two-stage absorption heat pump according to the present invention.
Figure 31:
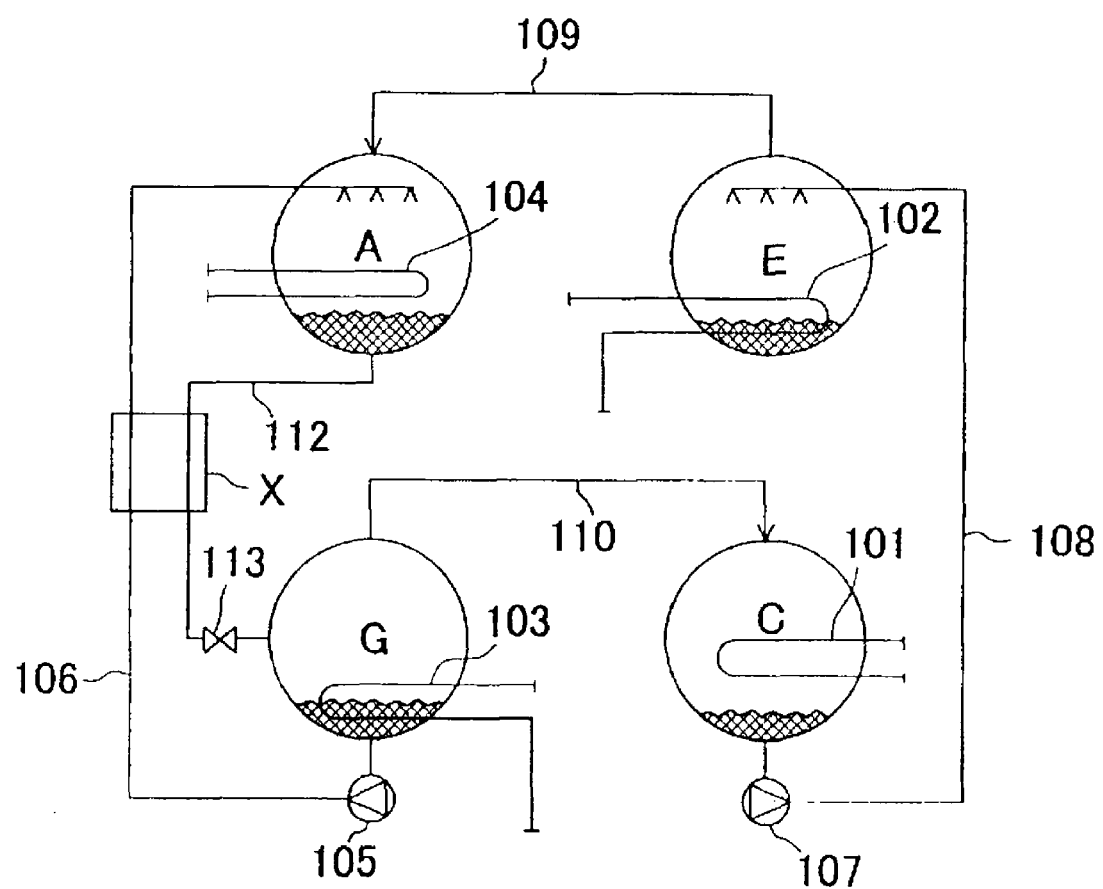
FIG. 31 is a view illustrating an example of the constitution of a conventional single-stage absorption heat pump.
Figure 32:
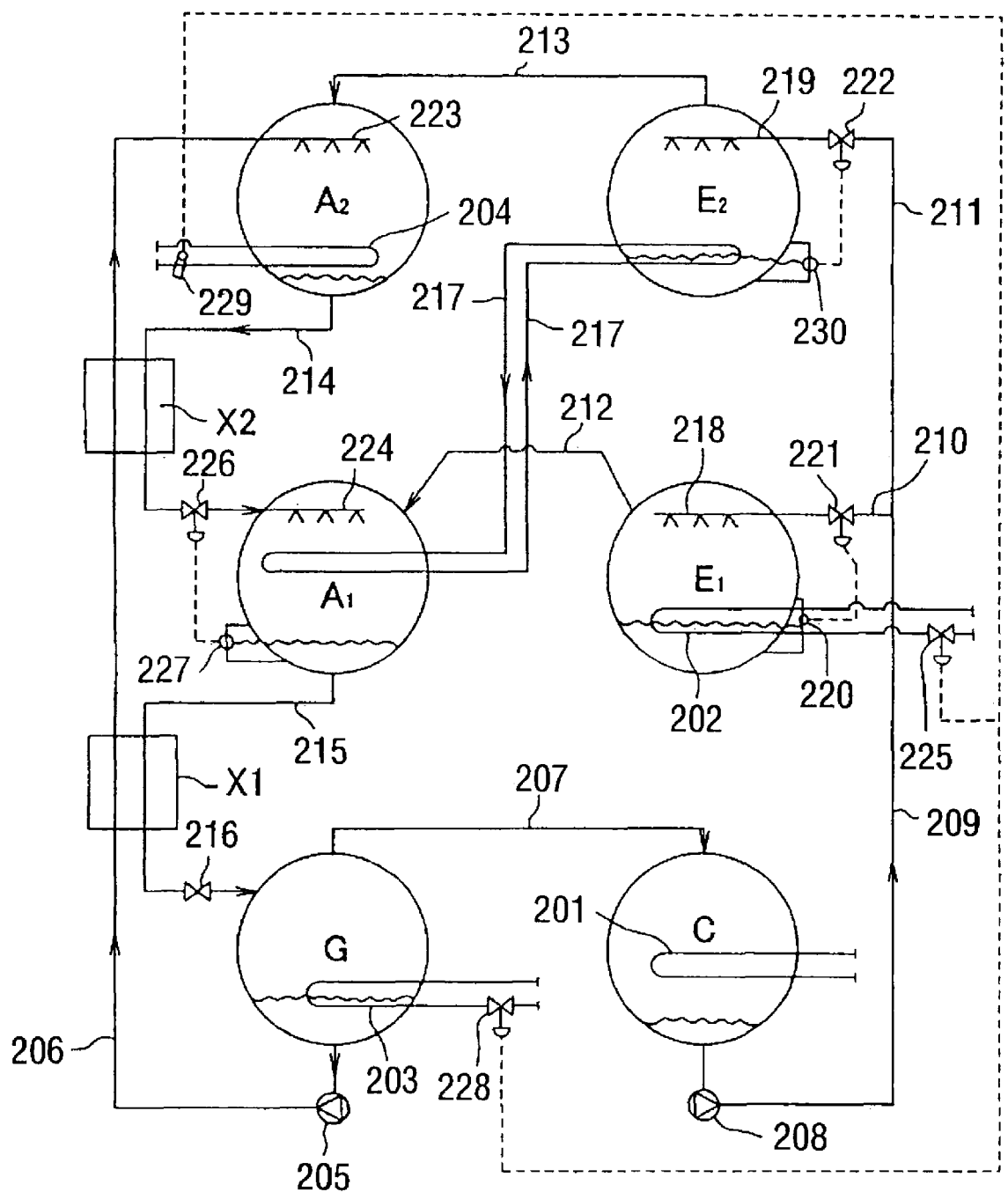
FIG. 32 is a view illustrating an example of the constitution of a conventional two-stage absorption heat pump.

FIG. 30 is a view illustrating another example of the constitution of a two-stage absorption heat pump according to the present invention. In FIG. 30, parts that are the same or equivalent to the components of FIG. 28 are identified with the same numerals. The two-stage absorption heat pump shown in FIG. 30 is different from the two-stage absorption heat pump shown in FIG. 28 in the following respects: The high-temperature evaporator EH and the low-temperature absorber A are constituted separately and the heat is transferred from the low-temperature absorber A to the high-temperature evaporator EH with the working medium circulating between the heat exchange pipe 28 and the heat exchange pipe 83 through the working medium transporting pipes 89 and 89 in the two-stage absorption heat pump shown in FIG. 28 whereas the high-temperature evaporator EH and the low-temperature absorber A are integrated with each other, and the refrigerant liquid in a high-temperature vapor-liquid separator EHS is fed to the heat exchange pipe 28 (high-temperature evaporator EH) in the low-temperature absorber A through a refrigerant transporting pipe 29, heated and evaporated therein, and the generated refrigerant vapor is fed to the high-temperature vapor-liquid separator EHS through a refrigerant transporting pipe 29 in the two-stage absorption heat pump shown in FIG. 30. Designated as 30 is a baffle disposed in the high-temperature vapor-liquid separator EHS.

In the two-stage absorption heat pump shown in FIG. 30, some of the concentrated solution is supplied to the low-temperature absorber A at start-up and absorbs the refrigerant vapor from the low-temperature evaporator E. Thus, the temperature of the dilute solution increases and the working medium flowing through the heat exchange pipe 28 is heated. Since the temperature of the working medium becomes higher than that of the steam in the low-temperature evaporator E, the temperature of the evaporated refrigerant becomes higher than that of the steam in the low-temperature evaporator E and the vapor pressure in the high-temperature evaporator EH becomes higher than that in the low-temperature evaporator E. The vapor pressure in the high-temperature absorber AH is generally equal to that in the high-temperature evaporator EH, and the vapor pressure in the low-temperature absorber A is generally equal to that in the low-temperature evaporator E. Thus, the vapor pressure in the high-temperature absorber AH is higher than that in the low-temperature absorber A, and ensures the flow of the solution from the high-temperature absorber AH to the low-temperature absorber A.

The flow rate of concentrated solution to be divided into the branch pipe 87 and introduced into the low-temperature absorber A is approximately 5 to 50% of the concentrated solution supplied from the generator G through the concentrated solution pipe 2. When the flow rate of the concentrated solution is small, the start-up takes a long time but the decrease of the temperature raising performance can be negligible even if the introduction of concentrated solution is still continued after the completion of the start-up. The graph of absorption cycle which can be obtained when the introduction of concentrated solution is still continued after the completion of the start-up is the same as the graph of absorption cycle shown in FIG. 29. When the flow rate of the concentrated solution is large, a valve must be disposed in the branch pipe 87 for stopping the introduction of concentrated solution after the completion of the start-up.

The level of the refrigerant liquid in the high-temperature vapor-liquid separator EHS is detected by a liquid level sensor 33, and a detection signal from the liquid level sensor 33 is inputted into the control valve 32 to control the opening of the control valve 32 so that the level of the refrigerant liquid in the high-temperature vapor-liquid separator EHS can be a preset value. When the two-stage absorption heat pump is constituted as shown in FIG. 30, the structure can be simplified and the production cost and running cost can be reduced as compared with the two-stage absorption heat pump shown in FIG. 28 since the circulation pump 84 for circulating the working medium to transfer the heat from the low-temperature absorber A to the high-temperature evaporator EH and the refrigerant pump 86 for circulating the refrigerant in the high-temperature evaporator EH are not necessary. Also, the heat loss at the time when the working medium exchanges heat with the refrigerant in the high-temperature evaporator EH can be eliminated.

Although the embodiments of the present invention have been described, it should be understood that the present invention is not limited to the above embodiments and various modifications can be made to the embodiments within the scope of the claims and within the scope of the technical ideas described in the specification and drawings. For example, the case where the refrigerant liquid to be introduced from the condenser C to the evaporator E, the low-temperature evaporator E, and the high-temperature evaporator EH is preheated (heated) with an working medium (the concentrated solution, dilute solution, refrigerant vapor or refrigerant liquid) or a heating source other than the operating media (such as hot water) is included in the present invention. Also, although steam generated by heating water as a heat receiving medium in the high-temperature absorber AH is introduced into a vapor-liquid separator and undergoes vapor-liquid separation, and steam 304 separated from the steam-water mixture is discharged in the above embodiments, the vapor-liquid separator may not be disposed in addition, the heat receiving medium is not necessarily heated into steam but may be obtained in the form of hot water.

The list of the reference numerals for the primary elements used in the above description is shown below; 5: heat exchanger, 13: passage, 23: heat exchanger, 36: vapor-liquid separator, 46: control valve (heat receiving medium liquid introduction flow rate control means), 301: heat source, 302: cooling source, 303: heat receiving medium liquid, 304: heat receiving medium, A: absorber, AH: high-temperature absorber, E: evaporator, EH: high-temperature evaporator, C: condenser, G: generator, X: solution heat exchanger, X1: low-temperature solution heat exchanger, and X2: high-temperature solution heat exchanger.

What is claimed is:

1. An absorption heat pump comprising:
   a high-temperature evaporator for heating and evaporating working medium refrigerant liquid into working medium refrigerant vapor;
   a low-temperature evaporator for heating and evaporating working medium refrigerant liquid into working medium refrigerant vapor;
   a high-temperature absorber for heating heat receiving medium with the heat of absorption which is generated when working medium concentrated solution absorbs the working medium refrigerant vapor generated in the high-temperature evaporator and turns into solution with a concentration lower than that of the working medium concentrated solution;
   a low-temperature absorber which takes in solution with a concentration lower than that of the working medium concentrated solution and heats working medium refrigerant liquid of an evaporator with an operation temperature higher than that of the low-temperature evaporator with the heat of absorption which is generated when the solution absorbs the working medium refrigerant vapor generated in the low-temperature evaporator and turns into a dilute solution with a concentration lower than that of the solution;
   a generator which takes in and heats the dilute solution and evaporates the working medium refrigerant to convert the dilute solution into working medium concentrated solution; and
   a condenser which takes in the working medium refrigerant vapor generated in the generator and cools to condense the working medium refrigerant vapor into working medium refrigerant liquid;
   wherein the working medium refrigerant liquid from the condenser is introduced into the low-temperature evaporator and heated therein, and a portion of the working medium refrigerant liquid from the low-temperature evaporator is introduced into an evaporator on the high-temperature side from the low-temperature evaporator.

2. An absorption heat pump, comprising:
   a generator for generating refrigerant vapor;
   a condenser for taking in the refrigerant vapor generated in the generator;
   a high-temperature evaporator for taking in condensed refrigerant liquid from the condenser;
   a low-temperature evaporator for taking in condensed refrigerant liquid from the condenser;
   a high-temperature absorber for taking in concentrated solution from the generator through the heated side of a low-temperature solution heat exchanger and the heated side of a high-temperature solution heat exchanger and taking in refrigerant vapor generated in the high-temperature evaporator; and
   a low-temperature absorber for taking in medium-concentration solution with a medium concentration into which the concentrated solution turns upon absorption of the refrigerant vapor in the high-temperature absorber through the heating side of the high-temperature solution heat exchanger and taking in refrigerant vapor generated in the low-temperature evaporator,
   wherein the generator takes in dilute solution into which the medium-concentration solution turns upon absorption of the refrigerant vapor in the low-temperature absorber through the heating side of the low-temperature heat exchanger, and
   a portion of the concentrated solution from the generator heated in the low-temperature heat exchanger and to be introduced into the high-temperature absorber is separated and introduced into the low-temperature absorber.

3. The absorption heat pump of claim 2, wherein the low-temperature absorber and the high-temperature evaporator are integrated with each other so that the refrigerant in the high-temperature evaporator can be directly heated by the solution in the low-temperature absorber.

4. The absorption heat pump of claim 2, wherein the heat receiving medium is heated by the solution in the high-temperature absorber and converted into vapor.

5. The absorption heat pump of claim 2, wherein the flow rate of concentrated solution to be separated and introduced into the low-temperature absorber is 5 to 50% of a total flow rate of the concentrated solution from the generator.

* * * * *